United States Patent
Chen et al.

(10) Patent No.: US 9,690,145 B2
(45) Date of Patent: Jun. 27, 2017

(54) DISPLAY DEVICE

(71) Applicant: InnoLux Corporation, Miao-Li County (TW)

(72) Inventors: Hung-Kun Chen, Miao-Li County (TW); Fang-Jin Lee, Miao-Li County (TW); Yi-Chin Lee, Miao-Li County (TW); Kuan-Hung Kuo, Miao-Li County (TW); Chao-Yu Cheng, Miao-Li County (TW); Chi-Han Hsieh, Miao-Li County (TW); Hong-Kang Chang, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/297,651

(22) Filed: Oct. 19, 2016

(65) Prior Publication Data
US 2017/0038630 A1    Feb. 9, 2017

Related U.S. Application Data

(63) Continuation of application No. 14/656,461, filed on Mar. 12, 2015, now Pat. No. 9,507,222.
(Continued)

(30) Foreign Application Priority Data

Sep. 24, 2014    (TW) .............................. 103132928 A
Sep. 25, 2014    (TW) .............................. 103133162 A
(Continued)

(51) Int. Cl.
*G02F 1/1339*    (2006.01)
*G02F 1/1335*    (2006.01)

(52) U.S. Cl.
CPC .... *G02F 1/13394* (2013.01); *G02F 1/133512* (2013.01); *G02F 1/133514* (2013.01); *G02F 2001/13396* (2013.01)

(58) Field of Classification Search
CPC ........... G02F 1/13394; G02F 1/133512; G02F 1/133514
(Continued)

(56) References Cited

U.S. PATENT DOCUMENTS 6,683,671 B1    1/2004    Morimoto
6,870,591 B2    3/2005    Lee et al.
(Continued)

FOREIGN PATENT DOCUMENTS

CN    102346339    2/2012
CN    102749731    10/2012
(Continued)

OTHER PUBLICATIONS

Chinese language office action dated Oct. 15, 2015, issued in application No. TW 103141941.
(Continued)

*Primary Examiner* — Lucy Chien
(74) *Attorney, Agent, or Firm* — McClure, Qualey & Rodack, LLP

(57) ABSTRACT

A display device is provided. The display device includes a pixel-displaying region, including: at least two pixels including a plurality of sub-pixels; and a light-shielding layer including a matrix portion and an enlarged portion, wherein the enlarged portion is disposed at an intersection of two of the adjacent sub-pixels and is adjacent to the matrix portion; wherein the matrix portion defines the sub-pixels, and a total area of the sub-pixels is defined as a first area and a ratio of an area of the enlarged portion to the first area is about 1.5% to 6%.

18 Claims, 48 Drawing Sheets

Related U.S. Application Data

(60) Provisional application No. 61/952,929, filed on Mar. 14, 2014, provisional application No. 61/989,046, filed on May 6, 2014, provisional application No. 62/019,993, filed on Jul. 2, 2014, provisional application No. 61/976,203, filed on Apr. 7, 2014, provisional application No. 61/976,810, filed on Apr. 8, 2014.

(30) Foreign Application Priority Data

| Oct. 28, 2014 | (TW) | 103137140 A |
|---|---|---|
| Oct. 28, 2014 | (TW) | 103137142 A |
| Nov. 24, 2014 | (TW) | 103140591 A |

(58) Field of Classification Search
USPC ............................................................ 349/155
See application file for complete search history.

(56) References Cited

U.S. PATENT DOCUMENTS

| 7,379,142 | B2 | 5/2008 | Tak et al. |
|---|---|---|---|
| 7,508,481 | B2 | 3/2009 | Whitehead, Jr. et al. |
| 7,924,393 | B2 | 4/2011 | Fukuoka et al. |
| 9,151,994 | B2 | 10/2015 | Chang et al. |
| 9,176,339 | B2 | 11/2015 | Kim et al. |
| 2002/0140887 | A1 | 10/2002 | Maeda |
| 2005/0157245 | A1 | 7/2005 | Lin et al. |
| 2006/0209235 | A1 | 9/2006 | Kim |
| 2006/0284643 | A1 | 12/2006 | Yamamoto et al. |
| 2008/0170195 | A1 | 7/2008 | Kwon et al. |
| 2009/0273749 | A1 | 11/2009 | Miyamoto et al. |
| 2009/0310051 | A1 | 12/2009 | Kim |
| 2011/0025940 | A1 | 2/2011 | Liu et al. |
| 2012/0019748 | A1* | 1/2012 | Kim .................. G02F 1/133512 349/106 |
| 2012/0268078 | A1 | 10/2012 | Chida |
| 2012/0327338 | A1 | 12/2012 | Kobayashi et al. |
| 2013/0342795 | A1 | 12/2013 | Park et al. |
| 2014/0029230 | A1 | 1/2014 | Oh et al. |
| 2014/0225849 | A1 | 8/2014 | Anno et al. |

FOREIGN PATENT DOCUMENTS

| CN | 103513470 | 1/2014 |
|---|---|---|
| JP | 2003-66467 | 3/2003 |
| JP | 2006-171386 | 6/2006 |
| JP | 3946498 | 7/2007 |
| TW | 200527679 | 8/2005 |
| TW | 200712614 | 4/2007 |
| TW | 201005360 | 2/2010 |
| TW | I335482 | 1/2011 |
| TW | 201202812 | 1/2012 |
| TW | 201307945 | 2/2013 |
| TW | 201321851 | 6/2013 |
| TW | I408471 | 9/2013 |

OTHER PUBLICATIONS

Chinese language office action dated Nov. 10, 2015, issued in application No. TW 103133162.
Chinese language office action dated Dec. 10, 2015, issued in application No. TW 103140591.
Chinese language office action dated Dec. 16, 2015, issued in application No. TW 103137142.
Chinese language office action dated Dec. 28, 2015, issued in application No. TW 103137140.
Chinese language office action dated Mar. 1, 2016, issued in application No. TW 103132928.
Office Action dated Apr. 12, 2016, issued in U.S. Appl. No. 14/643,169.
Office Action dated Apr. 13, 2016, issued in U.S. Appl. No. 14/656,363.

* cited by examiner

DISPLAY DEVICE

CROSS REFERENCE TO RELATED APPLICATIONS

This application claims the benefit of priority from, and is a continuation application of, U.S. patent application Ser. No. 14/656,461 filed on Mar. 12, 2015, entitled "Display device", which claims priority of Taiwan Patent Application No. 103132928, filed on Sep. 24, 2014, which claims the benefit of priority from a provisional application of U.S. Patent Application No. 61/952,929, filed on Mar. 14, 2014, and a provisional application of U.S. Patent Application No. 61/989,046, filed on May 6, 2014; Taiwan Patent Application No. 103133162, filed on Sep. 25, 2014, which claims the benefit of priority from a provisional application of U.S. Patent Application No. 61/952,929, filed on Mar. 14, 2014; Taiwan Patent Application No. 103137140, filed on Oct. 28, 2014, which claims the benefit of priority from a provisional application of U.S. Patent Application No. 61/952,929, filed on Mar. 14, 2014, and a provisional application of U.S. Patent Application No. 62/019,993, filed on Jul. 2, 2014; Taiwan Patent Application No. 103137142, filed on Oct. 28, 2014, which claims the benefit of priority from a provisional application of U.S. Patent Application No. 61/952,929, filed on Mar. 14, 2014, a provisional application of U.S. Patent Application No. 61/976,203, filed on Apr. 7, 2014, and a provisional application of U.S. Patent Application No. 62/019,993, filed on Jul. 2, 2014; Taiwan Patent Application No. 103140591, filed on Nov. 24, 2014, which claims the benefit of priority from a provisional application of U.S. Patent Application No. 61/952,929 filed on Mar. 14, 2014, a provisional application of U.S. Patent Application No. 62/019,993, filed on Jul. 2, 2014; and a provisional application of U.S. Patent Application No. 61/976,810, filed on Apr. 8, 2014, the entirety of which is incorporated by reference herein.

BACKGROUND

Technical Field

The disclosure relates to a display device, and in particular to a display device having a light-shielding layer.

Description of the Related Art

Display devices are becoming more widely used in the display elements of various products. Liquid-crystal molecules have different light polarization or light refraction effects at different alignment configurations, and the liquid-crystal display devices utilize this characteristic to control light penetration to generate images. Conditional twisted nematic liquid-crystal display devices have good light penetration characteristics. However, when applied in a high-resolution display device, they cannot provide sufficient aperture ratio and view angle due to pixel design and structure, and the optical characteristics of the liquid-crystal molecules.

In order to solve this problem, various liquid-crystal display devices with wide-angle and high aperture ratio are developed, such as an in-plane switching liquid-crystal display device or a fringe-field switching liquid-crystal display device. However, those liquid-crystal display devices may have light leakage problems or mura issues, which can deteriorate the quality of the display.

Therefore, a display device which may further reduce light leakage problems and mura issues is needed.

SUMMARY

The present disclosure provides a display device, including: a pixel-displaying region, including: at least two pixels including a plurality of sub-pixels; and a light-shielding layer including a matrix portion and an enlarged portion, wherein the enlarged portion is disposed at an intersection of two of the adjacent sub-pixels and is adjacent to the matrix portion; wherein the matrix portion defines the sub-pixels, and a total area of the sub-pixels is defined as a first area and a ratio of an area of the enlarged portion to the first area is about 1.5% to 6%.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION

Figure 1A:
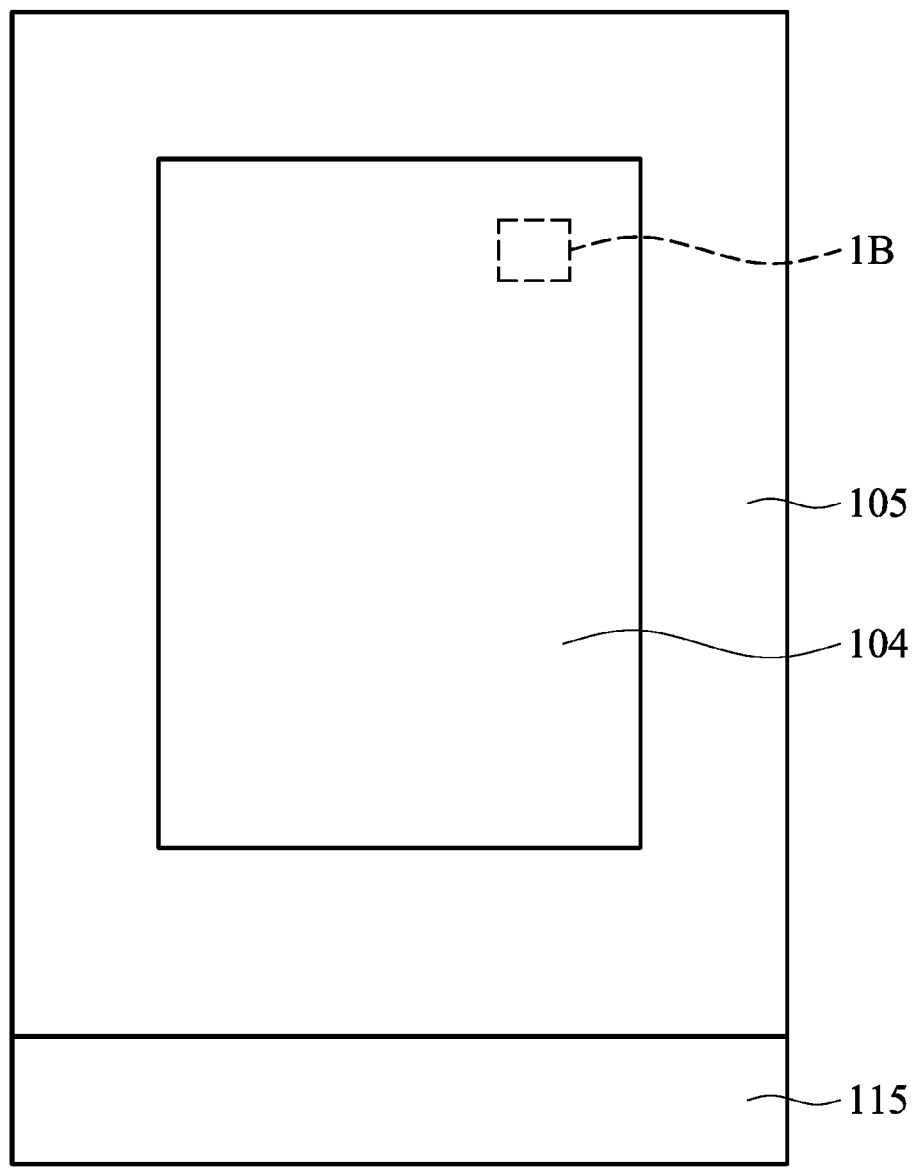
FIG. 1A is a top view of a display device in accordance with some embodiments of the present disclosure.

The display device of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. In addition, in this specification, expressions such as "first insulating bump disposed on/over a second material layer", may indicate not only the direct contact of the first insulating bump and the second material layer, but also, a non-contact state with one or more intermediate layers between the first insulating bump and the second material layer. In the above situation, the first insulating bump may not directly contact the second material layer.

It should be noted that the elements or devices in the drawings of the present disclosure may be present in any form or configuration known to those skilled in the art. In addition, the expression "a layer overlying another layer", "a layer is disposed above another layer", "a layer is disposed on another layer" and "a layer is disposed over another layer" may indicate that the layer directly contacts the other layer, but it may also indicate that the layer does not directly contact the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

The terms "about" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

It should be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Unless defined otherwise, all technical and scientific terms used herein have the same meaning as commonly understood to one of ordinary skill in the art to which this invention belongs. It should be appreciated that, in each case, the term, which is defined in a commonly used dictionary, should be interpreted as having a meaning that conforms to the relative skills and the background or the context of the present disclosure, and should not be interpreted in an idealized or overly formal manner unless so defined.

The term "substrate" is meant to include devices formed within a semiconductor wafer and the layers overlying the wafer. The term "substrate surface" is meant to include the uppermost exposed layers on a semiconductor wafer, such as silicon surface, and insulating layer and metallurgy lines.

The present disclosure utilizes an enlarge portion of the light-shielding layer to further shield the region of the display device which may have light leakage problems to further improve the contrast of the display device. In addition, the enlarged portion may prevent the mura issue and further improve the display quality.

FIG. 1A is a top view of a display device 100 in accordance with some embodiments of the present disclosure. As shown in FIG. 1A, the display device 100 includes a pixel-displaying region 104 and a non-display region 105 adjacent to the pixel-displaying region 104. In this embodiment, the non-display region 105 surrounds or encloses the pixel-displaying region 104. The pixel-displaying region 104 refers to the region in the display device 100 in which the pixel including transistor is disposed and displays. The transistor may include, but is not limited to, a thin film transistor. In addition, the non-display region 105 may include an out lead bonding (OLB) region 115, as shown in FIG. 1A.

The display device 100 may include, but is not limited to, a liquid-crystal display such as a thin film transistor liquid-crystal display. Alternatively, the liquid-crystal display may include, but is not limited to, a twisted nematic (TN) liquid-crystal display, a super twisted nematic (STN) liquid-crystal display, a double layer super twisted nematic (DSTN) liquid-crystal display, a vertical alignment (VA) liquid-crystal display, an in-plane switching (IPS) liquid-crystal display, a cholesteric liquid-crystal display, a blue phase liquid-crystal display, or any other suitable liquid-crystal display.

Figure 1B:
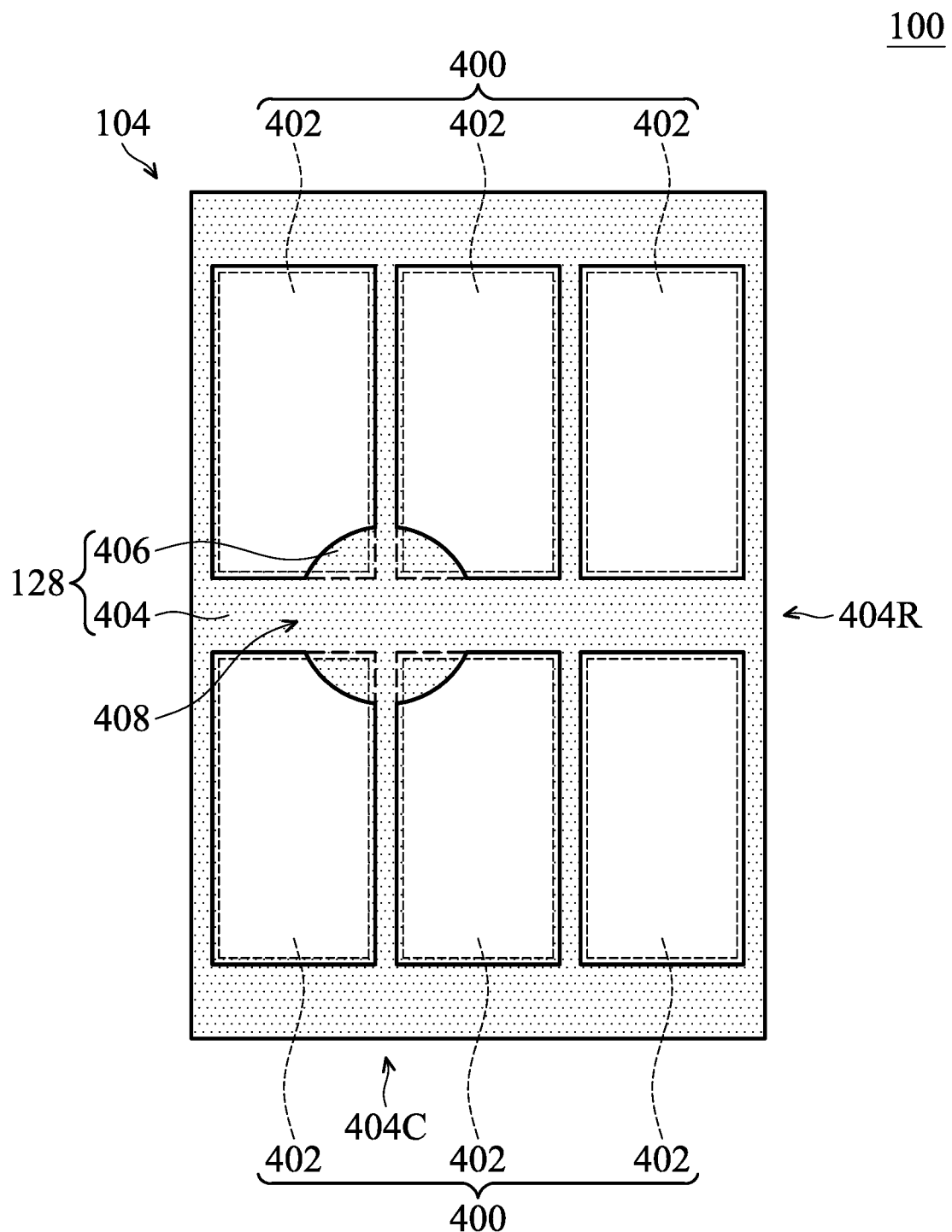
FIG. 1B is an enlarged figure of a portion of the display device in FIG. 1A.

Next, referring to FIG. 1B, which is an enlarged figure of a portion 1B of the display device 100 in FIG. 1A. As shown in FIG. 1B, the pixel-displaying region 104 includes at least two pixels 400 and a light-shielding layer 128. The pixel 400 includes a plurality of sub-pixels 402. For example, in the embodiment shown in FIG. 1B, each of the pixels 400 includes three sub-pixels 402. The light-shielding layer 128 may include, but is not limited to, black photoresist, black printing ink, black resin or any other suitable light-shielding materials of various colors. In addition, the light-shielding layer 128 includes a matrix portion 404 and an enlarged portion 406. This matrix portion 404 defines the sub-pixels 402. The enlarged portion 406 is disposed at an intersection 408 of two of the adjacent sub-pixels 402 and is adjacent to the matrix portion 404. The matrix portion 404 of the light-shielding layer 128 is used to shield the non-display region 105 and the elements in the pixel-displaying region 104 other than the pixels. The enlarged portion 406 is used to shield the region of the sub-pixels 402 which may have light leakage problems in the display device 100.

As shown in FIG. 1B, the matrix portion 404 of the light-shielding layer 128 includes a plurality of columns of matrix portion 404C and a plurality of rows of matrix portion 404R. The columns of matrix portion 404C and rows of matrix portion 404R defines the plurality of sub-pixels 402. The enlarged portion 406 of the light-shielding layer 128 is disposed at an intersection 408 of the column of matrix portion 404C and row of matrix portion 404R. The enlarged portion 406 covers a portion of the sub-pixel 402. For example, as shown in FIG. 1B, the enlarged portion 406 covers a portion of the four sub-pixels 402 adjacent to the intersection 408. In other words, all of the four sub-pixels 402 adjacent to the intersection 408 are partially covered by the enlarged portion 406. In one embodiment, the edge of the enlarged portion 406 has a circular arc shape.

Figure 1C:
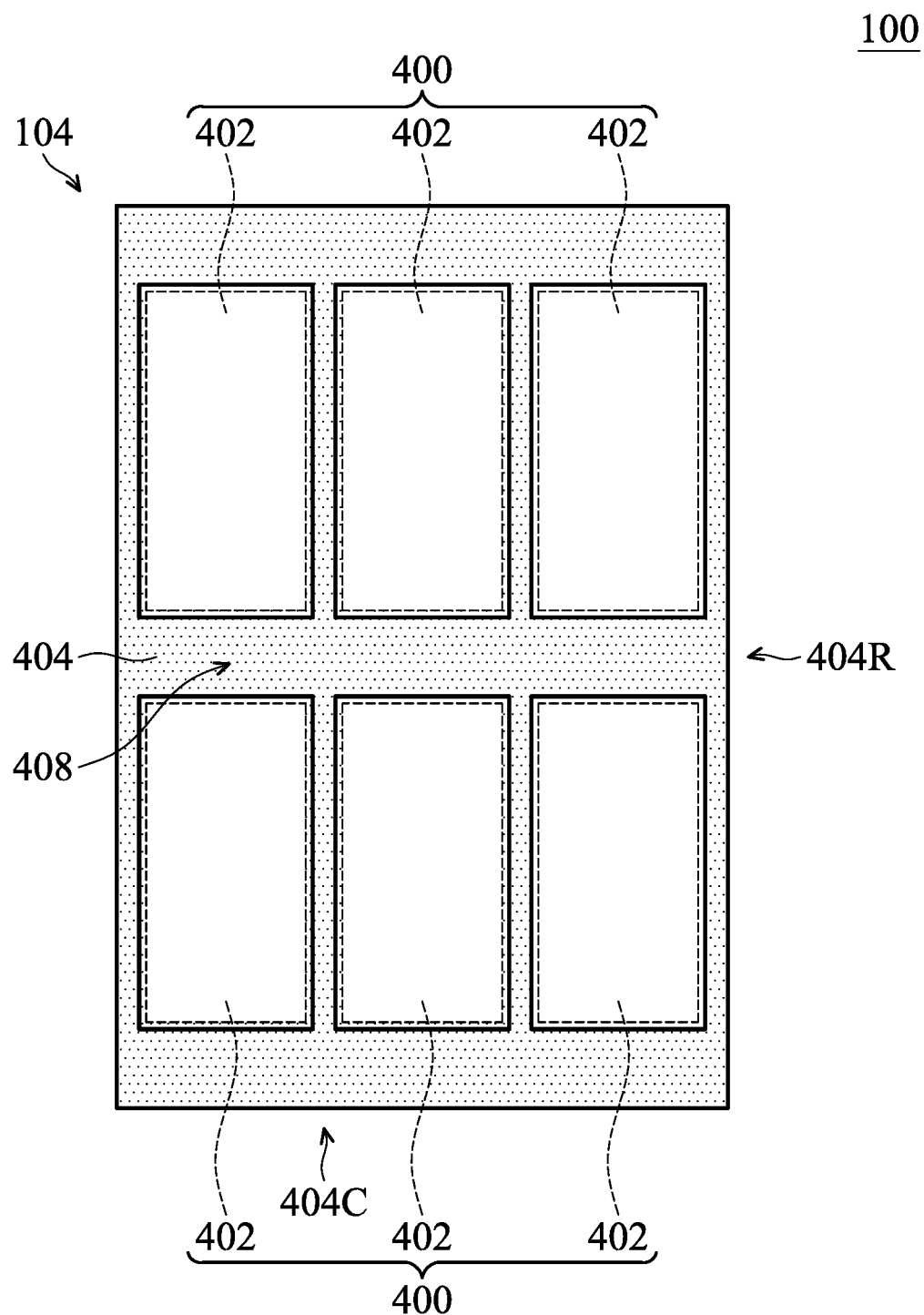
FIG. 1C is a top view of the display device in FIG. 1B without the enlarged portion.

FIG. 1C is a top view of the display device 100 in FIG. 1B without the enlarged portion 406. In FIG. 1C, the total area of the six sub-pixels 402 is defined as a first area. The ratio of the area of the enlarged portion 406 in FIG. 1B to this first area may range from about 1.5% to 6%, preferably from about 2.5% to 5%. In particular, as shown in FIGS. 1B and 1C, the enlarged portion 406 may include the four fan-shaped regions (or circular sector regions) of the light-shielding layer 128 disposed around the intersection 408. The four fan-shaped regions (or circular sector regions) are disposed completely in the sub-pixels 402 and shield portions of the corresponding sub-pixels 402. In addition, the two adjacent pixels 400 in FIG. 1B include six sub-pixels 402. Four of the sub-pixels 402 which are adjacent to the intersection 408 are partially covered by the enlarged portion 406 (namely the four fan-shaped regions or circular sector regions), and the other two sub-pixels 402 are not covered by the enlarged portion 406. The ratio of the area of the enlarged portion 406 (namely the four fan-shaped regions or circular sector regions) disposed between the two adjacent pixels 400 to the area of the six sub-pixels 402 of the two adjacent pixels 400 when not being covered by the enlarged portion 406 (namely the area of the six sub-pixels 402 shown in FIG. 1C) may range from about 1.5% to 6%, preferably from about 2.5% to 5%.

The enlarged portion 406 with the specific area ratio may shield the region of the display device where the light leakage issue may occur to further improve the contrast of the display device. In addition, the enlarged portion 406 may prevent the mura issue and further improve the display quality.

In particular, light leakage often occurs at the intersection 408 (namely the intersection 408 of the column of matrix portion 404C and row of matrix portion 404R) of the two adjacent sub-pixels 402 in the display device 100 due to the spacer disposed at the intersection 408. Therefore, the enlarged portion 406 disposed at the intersection 408 may shield the alignment light leakage or the scrub light leakage due to the spacer to improve the contrast of the display device. However, if the area of the enlarged portion 406 is too large, for example if the area ratio is larger than 6%, the display device 100 would have the mura issue. However, if the area ratio is too small, for example if the area ratio is smaller than 1.5%, the area of the enlarged portion 406 would be too small to effectively shield against light leakage.

Figure 2A:
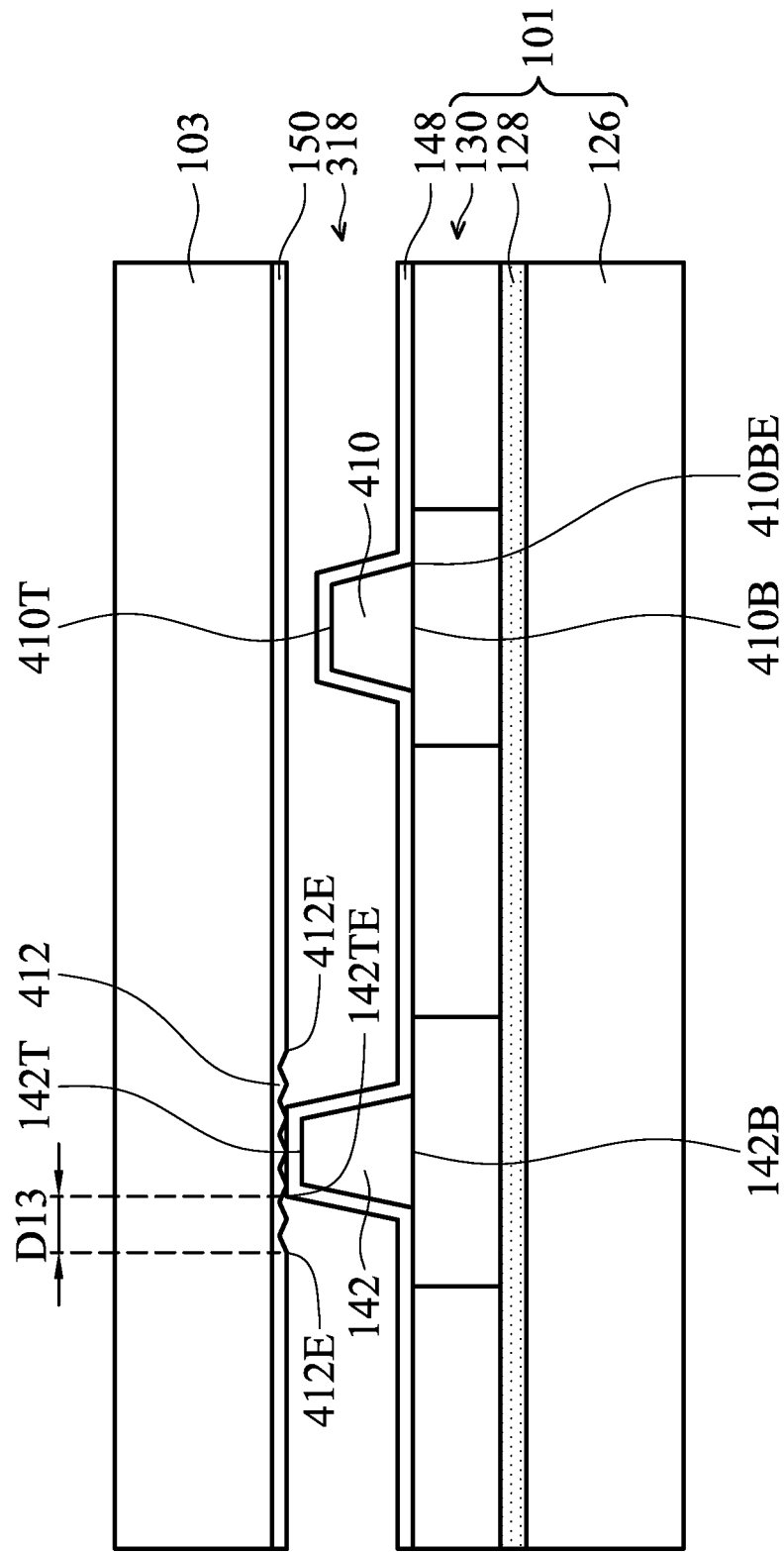
FIG. 2A is a cross-sectional view of a display device in accordance with some embodiments of the present disclosure.

FIG. 2A is a cross-sectional view of a display device 100 in accordance with some embodiments of the present disclosure. As shown in FIG. 2A, the display device 100 further include a first substrate 101, a second substrate 103 disposed opposite to the first substrate 101 and a main spacer 142 and a sub-spacer 410 disposed over the first substrate 101. In addition, the display device 100 further includes a first alignment layer 148 disposed over the first substrate 101 and a second alignment layer 150 disposed over the second substrate 103.

In the embodiment shown in FIG. 2A, the first substrate 101 is a color filter substrate, and the second substrate 103 is a transistor substrate. In particular, the first substrate 101, which serves as a color filter substrate, may include a first transparent substrate 126, a light-shielding layer 128 disposed over the first transparent substrate 126 and a color filter layer 130 disposed over the light-shielding layer 128. The first transparent substrate 126 may include, but is not limited to, a glass substrate, a ceramic substrate, a plastic substrate, or any other suitable transparent substrate. The color filter layer 130 may include, but is not limited to, a red color filter layer, a green color filter layer, a blue color filter layer, or any other suitable color filter layer. In addition, the second substrate 103, which serves as a transistor substrate, may include a transparent substrate. The material of the transparent substrate may include the aforementioned material of the first transparent substrate 126. The material of the first transparent substrate 126 may be the same as or different from that of the transparent substrate of the second substrate 103. In addition, a transistor such as a thin film transistor (not shown) is disposed in or over the transparent substrate of the second substrate 103. This transistor is used to control the pixels.

The main spacer 142 and the sub-spacer 410 disposed over the first substrate 101 are used to space the first substrate 101 apart from the second substrate 103. Therefore, the liquid-crystal material 138 may be disposed between the first substrate 101 and second substrate 103. Since the main spacer 142 is the main structure used to space the first substrate 101 apart from the second substrate 103, whereas the sub-spacer 410 is the structure used to prevent the first substrate 101 from touching the second substrate 103 when the display device 100 is pressed or touched, the height of the main spacer 142 is higher than the height of the sub-spacer 410. In addition, the main spacer 142 has a top surface 142T far from the first substrate 101 and a bottom surface 142B adjacent to the first substrate 101. The sub-spacer 410 also has a top surface 410T far from the first substrate 101 and a bottom surface 410B adjacent to the first substrate 101. The material of the main spacer 142 and sub-spacer 410 may independently include, but is not limited to, a resist such as a positive resist or a negative resist. The main spacer 142 and the sub-spacer 410 may be formed by the same photolithography and/or etching steps. However, the main spacer 142 and the sub-spacer 410 may be formed by different photolithography and/or etching steps. In one embodiment, the photolithography steps may include resist patterning. The resist patterning may include steps such as resist coating, soft baking, mask alignment, pattern exposure, post-exposure baking, resist developing and hard baking. The etching step may include reactive ion etch (ME), plasma etch, or any other suitable etching step.

The first alignment layer 148 and second alignment layer 150 are layers used to induce the liquid-crystal molecules to align in a specific direction. The materials of each of the first alignment layer 148 and second alignment layer 150 may independently include, but are not limited to, polyimide, or any other suitable alignment material. The first alignment layer 148 is disposed over the first substrate 101, the main spacer 142 and the sub-spacer 410. In addition, the first alignment layer 148 disposed over the top surface 142T of the main spacer 142 may directly contact the second alignment layer 150.

Figure 2B:
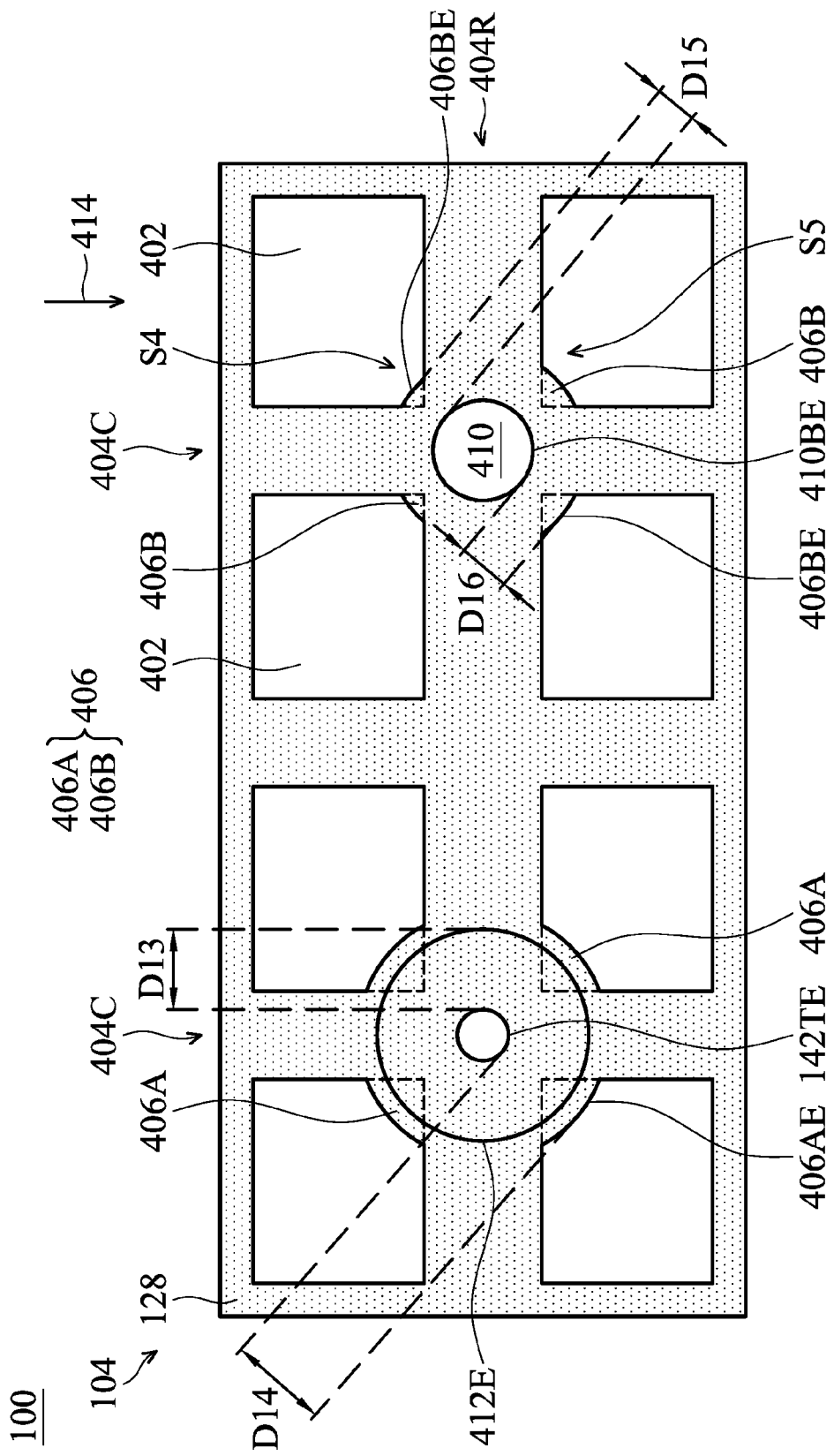
FIG. 2B is a top view of a display device in accordance with some embodiments of the present disclosure.
Figure 2C:
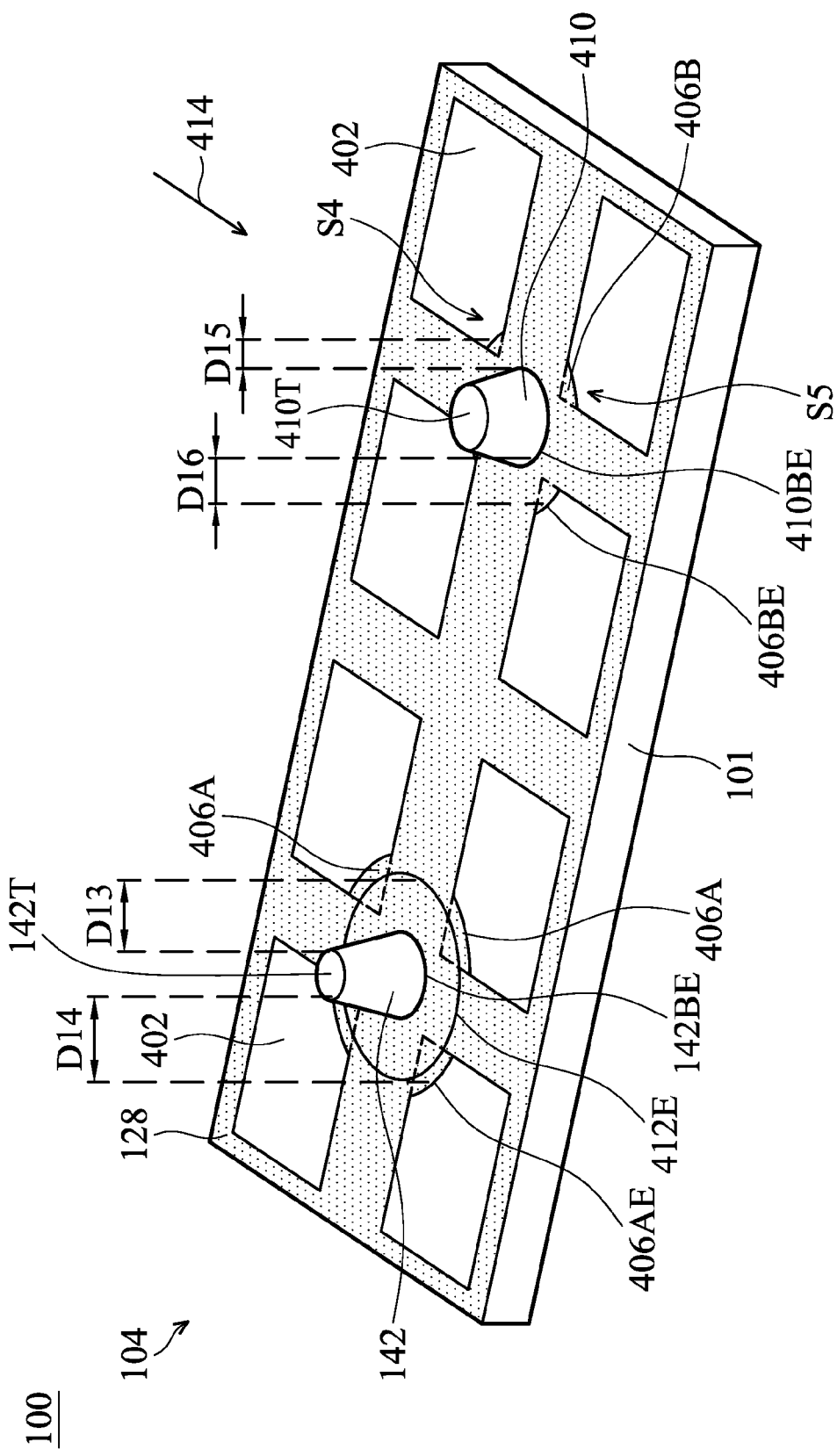
FIG. 2C is a side view of a display device in accordance with some embodiments of the present disclosure.

In FIGS. 2A-2C, FIG. 2B is a top view of a display device 100 in accordance with some embodiments of the present disclosure and FIG. 2C is a side view of this display device 100. As shown in FIGS. 2A-2C, in the process of alignment or transportation, since the first alignment layer 148 disposed over the top surface 142T of the main spacer 142 may directly contact the second alignment layer 150, a rough region 412 would be formed in the region of the second alignment layer 150 corresponding to the top surface 142T of the main spacer 142. The area of the rough region 412 may be larger than the area of the top surface 142T of the main spacer 142. In other words, the second alignment layer 150 includes a rough region 412 corresponding to the main spacer 142. The roughness of the rough region 412 of the second alignment layer 150 is different from the roughness of other regions of the second alignment layer 150. In addition, the distance D13 between a top surface 142T of the main spacer 142 to the edge of the rough region 412 ranges from about 0 μm to 12 μm, for example less than about 11.5 μm. In particular, the distance D13 is the distance between the projection edge 142TE of the top surface 142T of the main spacer 142 on the first substrate 101 to the edge 142E of the rough region 412.

Since the alignment degree of the rough region 412 of the second alignment layer 150 is different from the alignment degree of other regions of the second alignment layer 150, the arrangement of the liquid-crystal molecules corresponding to the rough region 412 is different from the arrangement of the liquid-crystal molecules corresponding to other regions of the second alignment layer 150, which in turn results in light leakage in the display device 100 and a decrease of the contrast. Therefore, the present disclosure utilizes the enlarged portion 406 of the light-shielding layer 128 disposed at the region corresponding to the rough region 412 in the display device 100 to shield the region in the display device 100 where light leakage may occur to further improve the contrast of the display device.

As shown in FIGS. 2B-2C, the enlarged portion 406 of the light-shielding layer 128 may include a main enlarged portion 406A and a sub-enlarged portion 406B. The main spacer 142 is disposed corresponding to the main enlarged portion 406A, and the sub-spacer 410 is disposed corresponding to the sub-enlarged portion 406B. In addition, the main enlarged portion 406A and the sub-enlarged portion 406B are both disposed at the intersection 408 of two of the adjacent sub-pixels 402. In other words, the main enlarged portion 406A and the sub-enlarged portion 406B are both disposed at the intersection 408 of the column of matrix portion 404C and row of matrix portion 404R.

By disposing the main spacer 142 corresponding to the main enlarged portion 406A, the main enlarged portion 406A may shield against light leakage in the rough region 412, which corresponds to the main spacer 142. In one embodiment, the light-shielding layer 128 including the main enlarged portion 406A may completely shield the rough region 412.

In addition, in order to make the main enlarged portion 406A be able to effectively shield against light leakage, the distance D14 between the projection edge 142BE of the bottom surface 142B of the main spacer 142 on the first substrate 101 to the edge 406AE of the main enlarged portion 406A may range from about 5 μm to 15 μm, preferably from about 11.5 μm to 12.5 μm. It should be noted that, if the distance D14 is too great, for example greater than 15 μm, the pixel aperture region of the display device 100 would be too small and the mura issue would be the result. However, if the distance D14 is too small, for example smaller than 5 μm, the area of the main enlarged portion 406A would be too small to effectively shield against light leakage. In addition, as shown in FIG. 2B, the distance D14 is greater than the distance D13 such that the light-shielding layer 128 including the main enlarged portion 406A may completely shield the rough region 412.

The sub-enlarged portion 406B may shield against light leakage in of the display device 100 to further improve the contrast of the display device 100. For example, in one embodiment, the distance D15 corresponding to the first side S4 of the sub-spacer 410 in the display device 100 is 5.5 μm, and the distance D16 corresponding to the second side S5, which is opposite to the first side S4, of the sub-spacer 410 in the display device 100 is 8.5 μm. If the distance D15, which corresponds to the first side S4 of the sub-spacer 410 in the display device 100, is increased to 8.75 μm, and the distance D16, which corresponds to the second side S5 of the sub-spacer 410, is increased to 10.75 μm, the contrast of the display device 100 would be increased from 881 to 994.

As illustrated in FIGS. 2A-2C, in one embodiment, the first alignment layer 148 and the second alignment layer 150 are aligned by a rubbing process. However, when aligning the first alignment layer 148 by the rubbing process, it is hard to effectively align the portion of the first alignment layer 148 around the bottom edge 142BE of the main spacer 142 and the bottom edge 410BE of the sub-spacer 410. Therefore, the alignment degree of the first alignment layer 148 around the bottom edge 142BE and the bottom edge 410BE is different from the alignment degree of other regions of the first alignment layer 148.

The difference in the alignment degree would make the arrangements of the liquid-crystal molecules corresponding to the bottom edge 142BE of the main spacer 142 and the bottom edge 410BE of the sub-spacer 410 different from the arrangement of the liquid-crystal molecules corresponding to other region of the first alignment layer 148, which in turn results in light leakage issue of the display device 100 and decreases the contrast. Therefore, in addition to the main enlarged portion 406A disposed corresponding to the main spacer 142 in the display device 100, the present disclosure utilizes the sub-enlarged portion 406B of the light-shielding layer 128 disposed at the region corresponding to the bottom edge 410BE of the sub-spacer 410 and around the bottom edge 410BE to shield the region in the display device 100 where the light leakage issue may occur to further improve the contrast of the display device.

As seen in FIGS. 2B and 2C, the sub-spacer 410 is disposed corresponding to a sub-enlarged portion 406B such that the sub-enlarged portion 406B may shield against light leakage that occurs at the region corresponding to the bottom edge 410BE of the sub-spacer 410 and around the bottom edge 410BE.

The sub-spacer 410 includes a bottom surface 410B adjacent to the first substrate 101, as shown in FIG. 2A. In addition, FIGS. 2B and 2C show that in order to make the sub-enlarged portion 406B be able to effectively shield against light leakage, the distances D15 or D16 between the edge 410BE of the bottom surface 410B of the sub-spacer 410 to the edge 406BE of the sub-enlarged portion 406B may range from about 5 μm to 10 μm. In particular, the distances D15 or D16 is the maximum distance between the projection edge 410BE of the bottom surface 410B of the sub-spacer 410 on the first substrate 101 to the projection edge 406BE of the sub-enlarged portion 406B on the first substrate 101. It should be noted that, if the distances D15 or D16 are too great, for example greater than 10 μm, the pixel aperture region of the display device 100 would be too small and the mura issue would result. However, if the distances D15 or D16 are too small, for example smaller than 5 μm, the area of the sub-enlarged portion 406B would be too small to effectively shield against light leakage.

In addition, the rubbing process would result in different alignment degrees of the first alignment layer 148 around the bottom edge 142BE of the main spacer 142 and the bottom edge 410BE of the sub-spacer 410 at the opposite side of the main spacer 142 and the sub-spacer 410. In particular, if the rubbing process includes a plurality of rubbing steps, the following discussion is based on the rubbing direction of the last rubbing step (for example the rubbing direction 414 in FIGS. 2B-2C). The side of the sub-spacer 410 facing the rubbing direction 414 is the first side S4 (also referred to as the windward side). The side of the sub-spacer 410 that backs on to the rubbing direction 414 is the second side S5 (also referred to as the leeward side). The first side S4 (windward side) is opposite to the second side S5 (leeward side). Since the first alignment layer 148 around the bottom edge 410BE at the first side S4 (windward side) faces the rubbing direction 414, and the first alignment layer 148 around the bottom edge 410BE at the second side S5 (leeward side) backs on to the rubbing direction 414, the alignment degree of the first alignment layer 148 at the first side S4 (windward side) is greater than the alignment degree of the first alignment layer 148 at the second side S5 (leeward side). The difference in the alignment degree would result in a different degree of light leakage at the first side S4 (windward side) and the second side S5 (leeward side) around the bottom edge 410BE of the sub-spacer 410 in the display device 100.

Therefore, the distances D15 or D16 between the edge 410BE of the bottom surface 410B of the sub-spacer 410 to the edge 406BE of the sub-enlarged portion 406B may be different at the first side S4 (windward side) and the second side S5 (leeward side) to correspond the different degree of light leakage. In one embodiment, the distance D15 between the edge 410BE of the bottom surface 410B of the sub-spacer 410 to the edge 406BE of the sub-enlarged portion 406B at the first side S4 (windward side) may range from about 5 μm to 8 μm, and the distance D16 between the edge 410BE of the bottom surface 410B of the sub-spacer 410 to the edge 406BE of the sub-enlarged portion 406B at the second side S5 (leeward side) may range from about 5 μm to 10 μm. It should be noted that, if the distances D15 or D16 are too great, for example greater than 10 μm, the pixel aperture region of the display device 100 would be too small and the mura issue would result. However, if the distances D15 or D16 are too small, for example smaller than 5 μm, the area of the sub-enlarged portion 406B would be too small to effectively shield against light leakage.

The sub-enlarged portion 406B may shield against light leakage in the display device 100 to further improve the contrast of the display device 100. For example, in one embodiment, the distance D15 corresponding to the first side S4 of the sub-spacer 410 in the display device 100 is 5 μm, and the distance D16 corresponding to the second side S5, which is opposite to the first side S4, of the sub-spacer 410 in the display device 100 is also 5 μm. If the distance D15, which corresponds to the first side S4 of the sub-spacer 410 in the display device 100, is increased to 5.5 μm, and the distance D16, which corresponds to the second side S5 of the sub-spacer 410, is also increased to 5.5 μm, the contrast of the display device 100 would be greatly increased from 393 to 847.

Figure 3A:
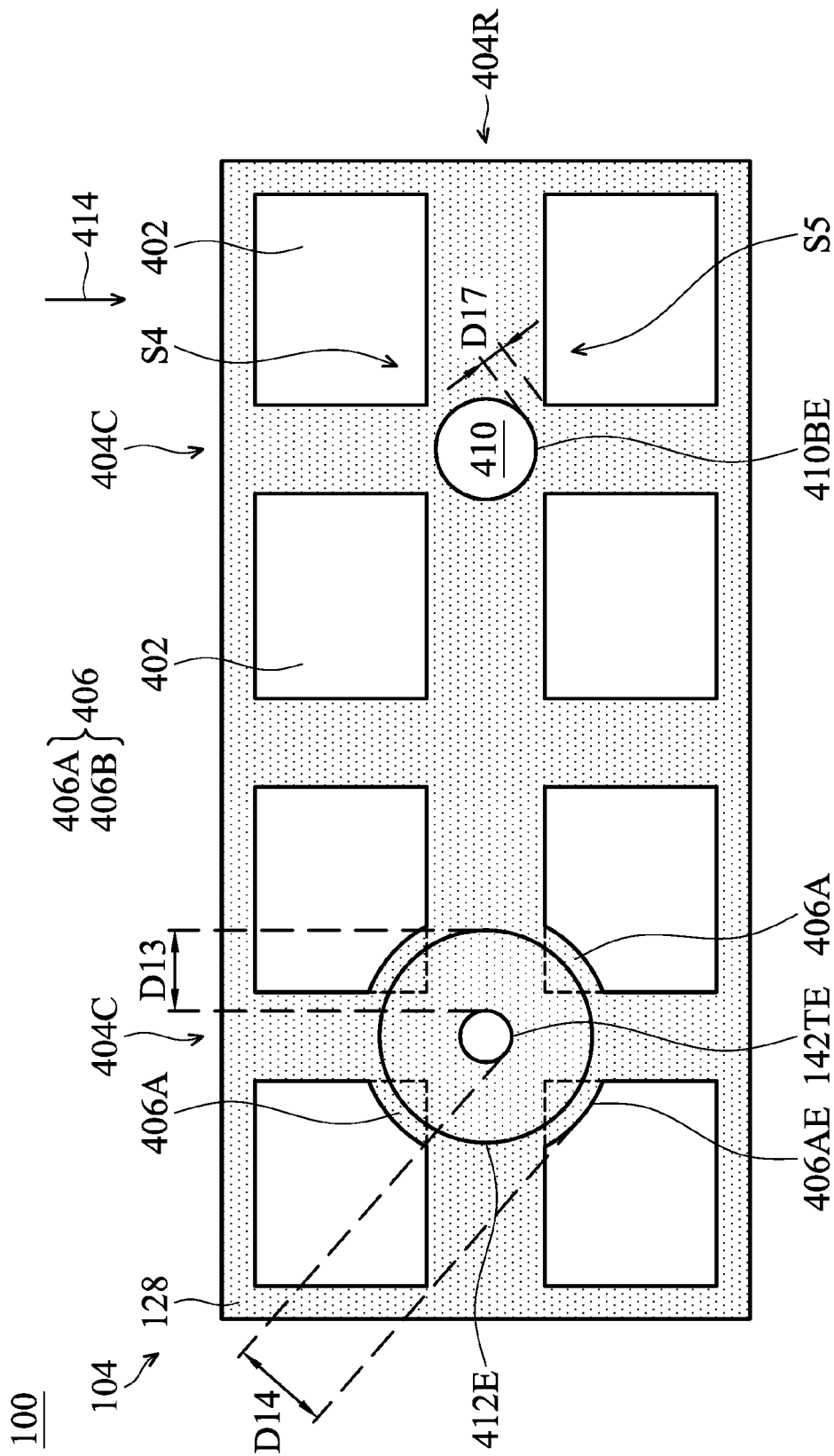
FIG. 3A is a top view of a display device in accordance with another embodiment of the present disclosure.
Figure 3B:
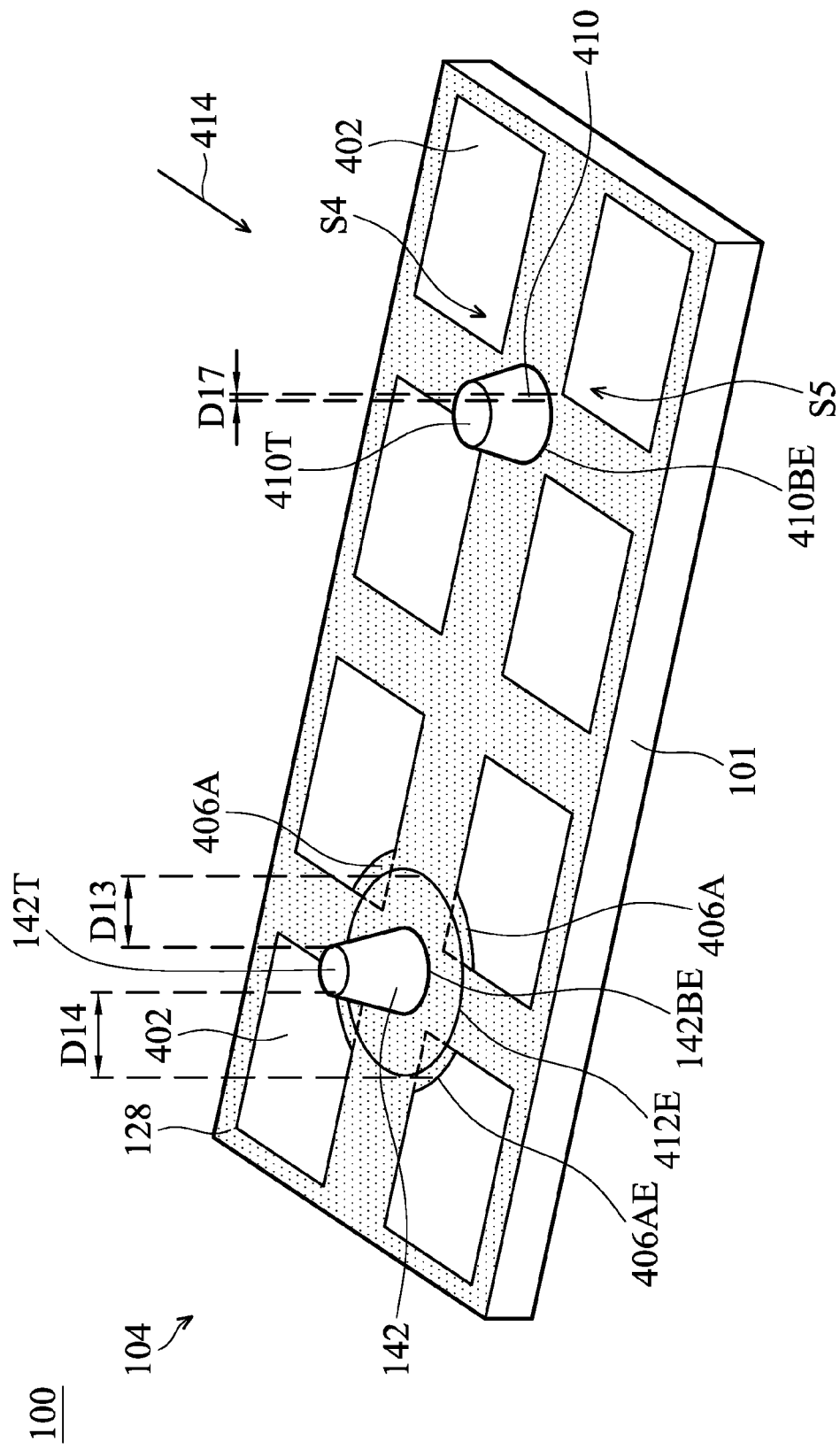
FIG. 3B is a side view of a display device in accordance with another embodiment of the present disclosure.

FIGS. 3A-3B present a top view and a side view of a display device 100 in accordance with another embodiment of the present disclosure. In this embodiment, the first alignment layer 148 and the second alignment layer 150 may be aligned by a photo-alignment process. Alternatively, the first alignment layer 148 may be aligned by the photo-alignment process, whereas the second alignment layer 150 may be aligned by the rubbing process. In other words, the first alignment layer 148 and the second alignment layer 150 are not both aligned by the rubbing process as previously described. In the photo-alignment process, the alignment layer is aligned by being irradiated by a polarized light. The incident direction of the linear polarized light would determine the alignment direction of the alignment layer. The angle between the incident direction of the linear polarized light and the alignment layer would affect the pre-tilt angle of the liquid-crystal molecules when being aligned.

Since the alignment degree of the first alignment layer 148 around the bottom edge 142BE of the main spacer 142 and the bottom edge 410BE of the sub-spacer 410 would not be different from the alignment degree of other regions of the first alignment layer 148 in the photo-alignment process, the light-shielding layer 128 disposed at the region corresponding to the sub-spacer 410 in the pixel-displaying region 104 does not include the sub-enlarged portion 406B or any enlarged portion 406, as shown in FIGS. 3A and 3B.

However, since the size and the position of the sub-spacer 410 may vary between different manufacturing batches, and the position may also shift when assembling the first substrate 101 and the second substrate 103, the sub-spacer 410 should be spaced apart from the adjacent sub-pixels 402 by a certain distance. For example, in one embodiment, the minimum distance D17 between the projection edge 410BE of the bottom surface 410B of the sub-spacer 410 on the first substrate 101 to the sub-pixels 402 may range from about 3 μm to 8 μm. It should be noted that, if the distance D17 is too great, for example greater than 8 μm, the pixel aperture region of the display device 100 would be too small and the mura issue would result. However, if the distance D17 is too small, for example smaller than 3 μm, the sub-spacer 410 may be exposed due to the variation in the manufacturing, which in turn may deteriorate the display quality.

Figure 4:
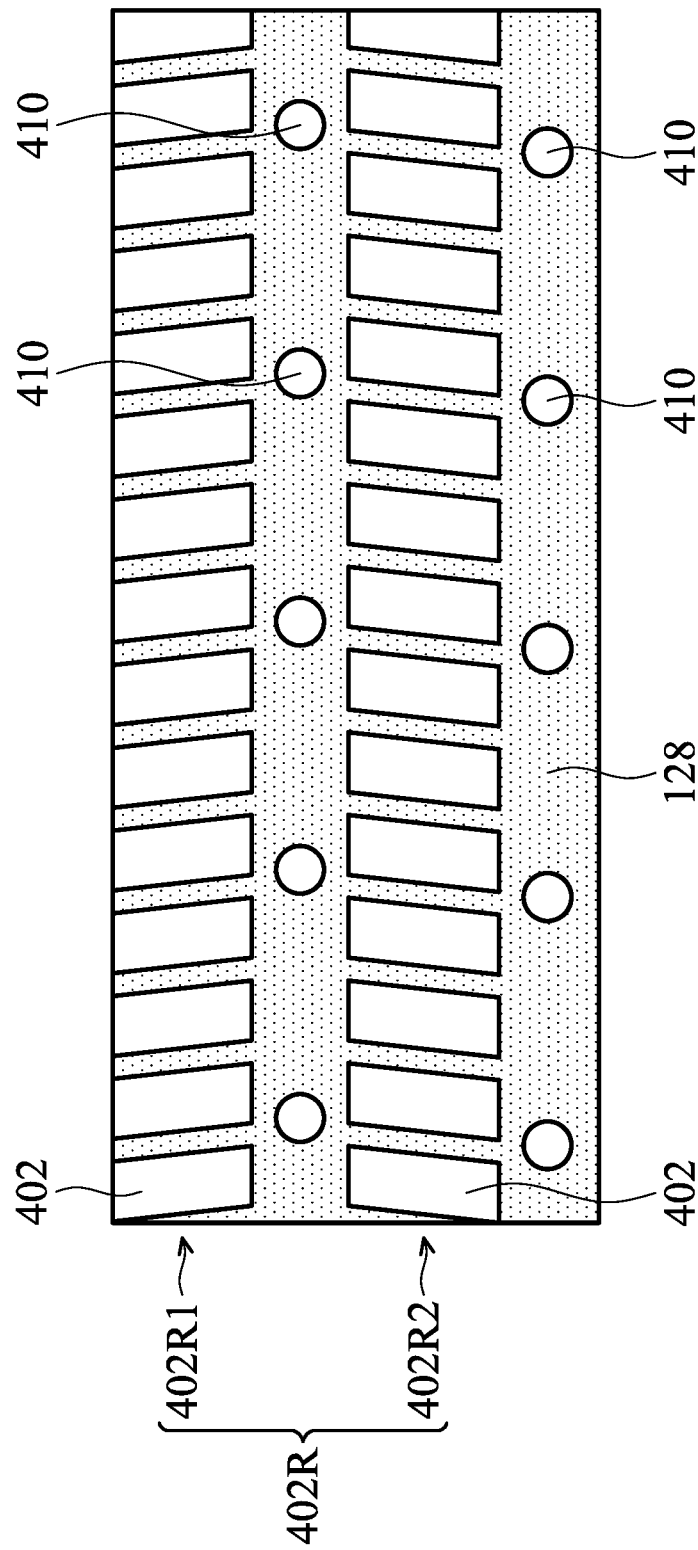
FIG. 4 is a top view of a display device in accordance with another embodiment of the present disclosure.

In addition, the excess sub-spacer 410 may hinder the improvement of the aperture ratio of the pixel 400 of the display device 100, which in turn hinders the improvement of the transparency of the display device 100. Therefore, in one embodiment of the present disclosure, as shown in FIG. 4, each of the pixels 400 in the display device 100 includes three sub-pixels 402, and the ratio of the amount of the plurality of sub-spacers 410 to the amount of the sub-pixels 402 is 1:3. It should be noted that, if the amount of the sub-spacers 410 is too large, for example if the ratio of the amount of the sub-spacers 410 to the amount of the sub-pixels 402 is larger than 1:3 (namely more than one sub-spacers 410 per three sub-pixels 402), it would be hard to improve the aperture ratio of the pixel 400 of the display device 100, and it would also be hard to improve the transparency of the display device 100. However, if the amount of the sub-spacers 410 is too small, for example if the ratio of the amount of the sub-spacers 410 to the amount of the sub-pixels 402 is smaller than 1:3 (namely less than one sub-spacers 410 per three sub-pixels 402), the sub-pixels 402 cannot provide good structural stability of the display device 100.

In addition, the ratio of the amount of the sub-spacers 410 to the amount of the sub-pixels 402 would affect the contrast and transparency of the display device 100. For example, in one embodiment, if the ratio of the amount of the sub-spacers 410 to the amount of the sub-pixels 402 is altered from 1:1 to 1:3, the contrast of the display device 100 would be increased from 909 to 998, and the transparency of the display device 100 would be increased from 2.8% to 3.1. Accordingly, the specific ratio of the amount of the sub-spacers 410 to the amount of the sub-pixels 402 in the present disclosure (namely 1:3) has the unexpected effects compared to the ratio of the amount of the sub-spacers 410 to the amount of the sub-pixels 402 in the conventional display device (namely 1:1).

As illustrated in FIG. 4, any one of the sub-spacers 410 is spaced apart from another most-adjacent sub-spacer 410 by three sub-pixel columns, and this configuration may prevent the mura issue.

In addition, the difference between the embodiment shown in FIG. 4 and the embodiments shown in FIG. 1A-3B is that the adjacent sub-pixel rows 402R have different incline direction. In particular, as shown in FIG. 4, all of the sub-pixels 402 in the sub-pixel row 402R1 incline toward the left side of FIG. 4, whereas all of the sub-pixels 402 in the sub-pixel row 402R2, which is adjacent to the sub-pixel row 402R1, incline toward the right side of FIG. 4. This configuration may further reduce the parallax of the display device 100.

In addition, by adjusting the specific amount ratio or the specific configuration of the enlarged portion 406, the present disclosure may further prevent the mura issue of visible stripe resulted from the enlarged portion 406 to further improve the display quality. In particular, in one embodiment, each of the pixels in the display device includes three sub-pixels, and the light-shielding layer includes a plurality of enlarged portions. The ratio of the amount of the enlarged portions to the amount of the sub-pixels may range from about 1:12 to 1:18. This specific amount ratio may further prevent the mura issue.

It should be noted that, if the amount of the enlarged portion is too large, for example if the ratio of the amount of the enlarged portion to the amount of the sub-pixels is larger than 1:12 (namely more than one enlarged portion per twelve sub-pixels), the display device 100 would have insufficient transparency. However, if the amount of the enlarged portion is too small, for example if the ratio of the amount of the enlarged portion to the amount of the sub-pixels is smaller than 1:18 (namely less than one enlarged portion per eighteen sub-pixels), the enlarged portion may result in the mura issue of visible stripe.

Figure 5:
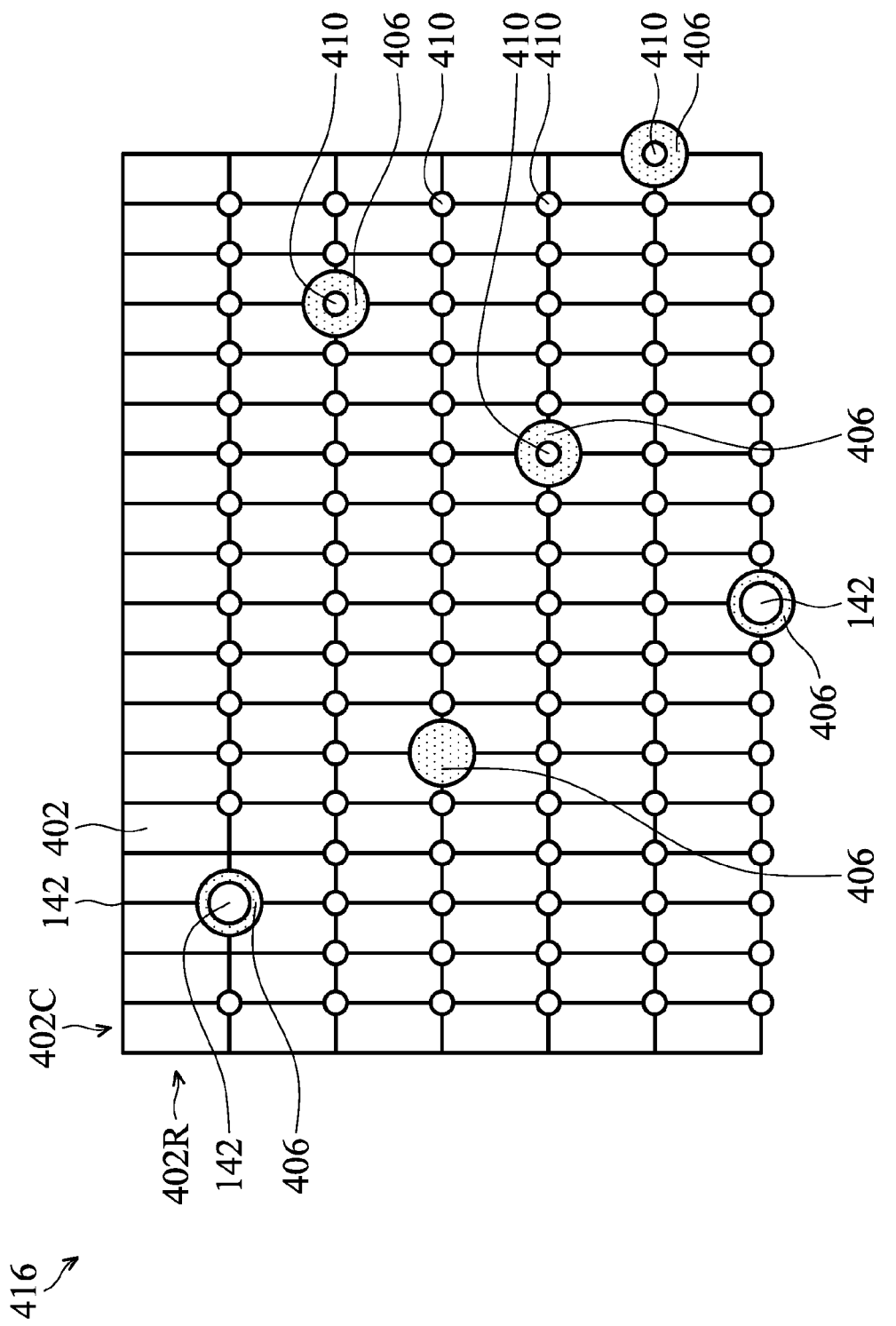
FIG. 5 is a top view of a display device in accordance with another embodiment of the present disclosure.

The present disclosure will provide two embodiments in the following description to describe the enlarged portion with the specific amount ratio and the specific configurations in more detail. FIG. 5 is a top view of a display device 100 in accordance with another embodiment of the present disclosure. FIG. 5 shows a sub-pixel region 416 which consists of 108 sub-pixels 402. In addition, the sub-pixel region 416 has 18 sub-pixel columns 402C and 6 sub-pixel rows 402R. In this sub-pixel region 416, the ratio of the amount of the enlarged portions 406 to the amount of the sub-pixels 402 is 1:18. In addition, the enlarged portion 406 is disposed between two of the sub-pixel columns 402C and is disposed between two of the sub-pixel rows 402R.

In addition, in the sub-pixel region 416, the amount of the enlarged portion 406 between two of the adjacent sub-pixel columns 402C is one or less, and the amount of the enlarged portion 406 between two of the adjacent sub-pixel rows 402R is one or less. In other words, there is only one enlarged portion 406 between every two adjacent sub-pixel columns 402C, and there is only one enlarged portion 406 between every two adjacent sub-pixel rows 402R. In addition, any one of the enlarged portions 406 is spaced apart from another most-adjacent enlarged portion 406 by three sub-pixel columns 402C.

Furthermore, the display device 100 in FIG. 5 includes at least one main spacer 142, and all the region corresponding to the main spacer 142 has the enlarged portion 406. In addition, the display device 100 in FIG. 5 further includes at least one sub-spacer 410, and a portion of the regions corresponding to the enlarged portions 406 has the sub-spacer 410. However, another portion of the regions corresponding to the enlarged portions 406 does not have the main spacer 142 and the sub-spacer 410. In addition, a portion of the region corresponding to the sub-spacers 410 does not have the enlarged portions 406.

The enlarged portion 406 with the specific amount ratio and the specific configurations in FIG. 5 may further prevent the mura issue and may improve the display quality.

Figure 6:
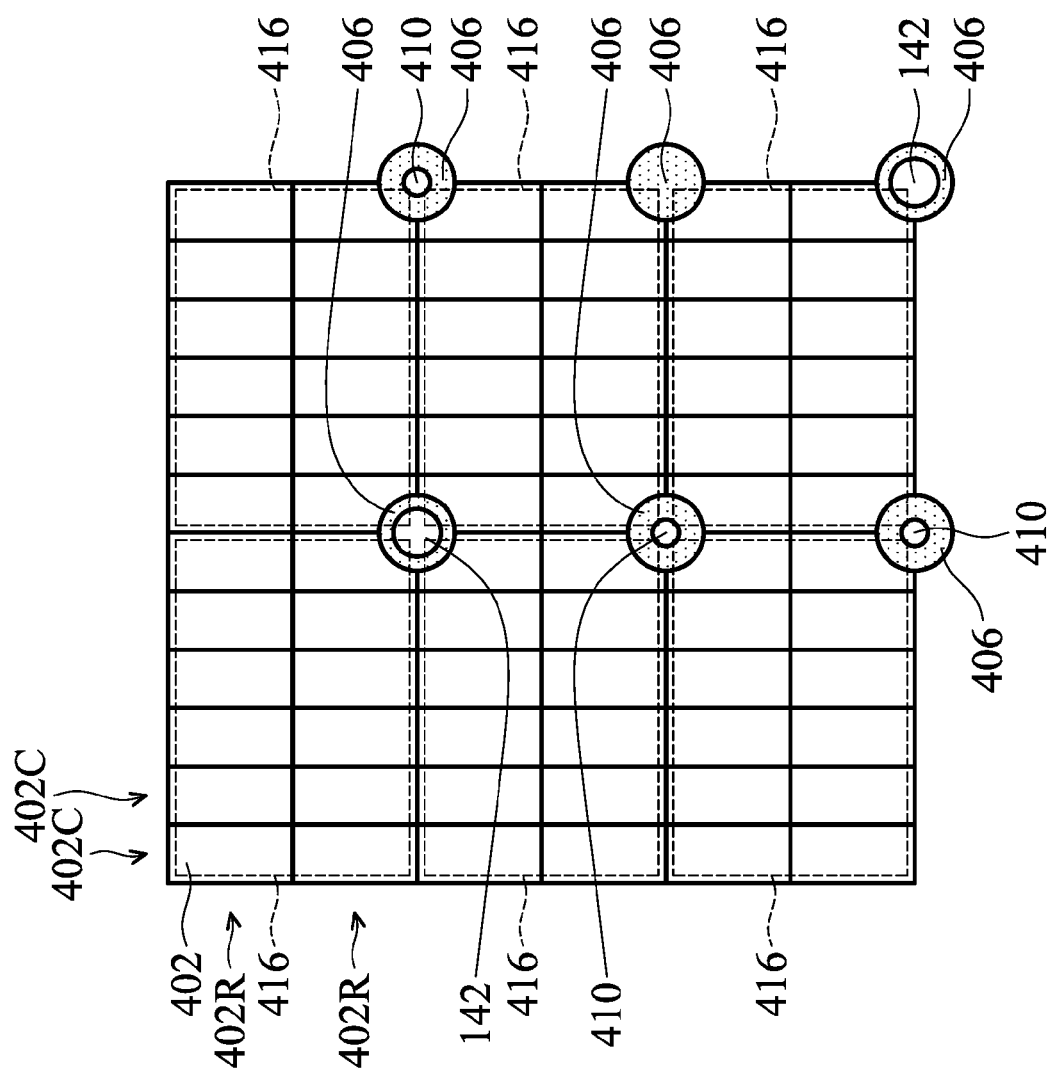
FIG. 6 is a top view of a display device in accordance with another embodiment of the present disclosure.

FIG. 6 is a top view of a display device 100 in accordance with another embodiment of the present disclosure. FIG. 6 shows a sub-pixel region 416 which consists of 12 sub-pixels 402. In addition, the sub-pixel region 416 has 6 sub-pixel columns 402C and 2 sub-pixel rows 402R. In this sub-pixel region 416, the ratio of the amount of the enlarged portions 406 to the amount of the sub-pixels 402 is 1:12. The enlarged portion 406 is disposed at one of the corners in each of the sub-pixel region 416.

Furthermore, the display device 100 in FIG. 6 includes at least one main spacer 142, and all the region corresponding to the main spacer 142 has the enlarged portion 406. In addition, the display device 100 in FIG. 6 further includes at least one sub-spacer 410, and a portion of the regions corresponding to the enlarged portions 406 has the sub-spacer 410. However, another portion of the regions corresponding to the enlarged portions 406 does not have the main spacer 142 and the sub-spacer 410. In addition, a portion of the region corresponding to the sub-spacers 410 does not have the enlarged portions 406 (not shown in FIG. 6).

The enlarged portion 406 with the specific amount ratio and the specific configurations in FIG. 6 may further prevent the mura issue and may improve the display quality.

It should be noted that, although all the sub-pixels in the adjacent sub-pixel rows are arranged with the same direction in the embodiments shown in FIGS. 1A-3B and 5-6, those skilled in the art will appreciate that the sub-pixels in the display device of the present disclosure may be arranged by the configuration shown in FIG. 4. In other words, the adjacent sub-pixel rows may have different incline direction. Therefore, the exemplary embodiments put forth in FIGS. 1A-3B and 5-6 are merely for the purpose of illustration, and the inventive concept may be embodied in various forms without being limited to the exemplary embodiments as shown in FIGS. 1A-3B and 5-6.

Figure 7:
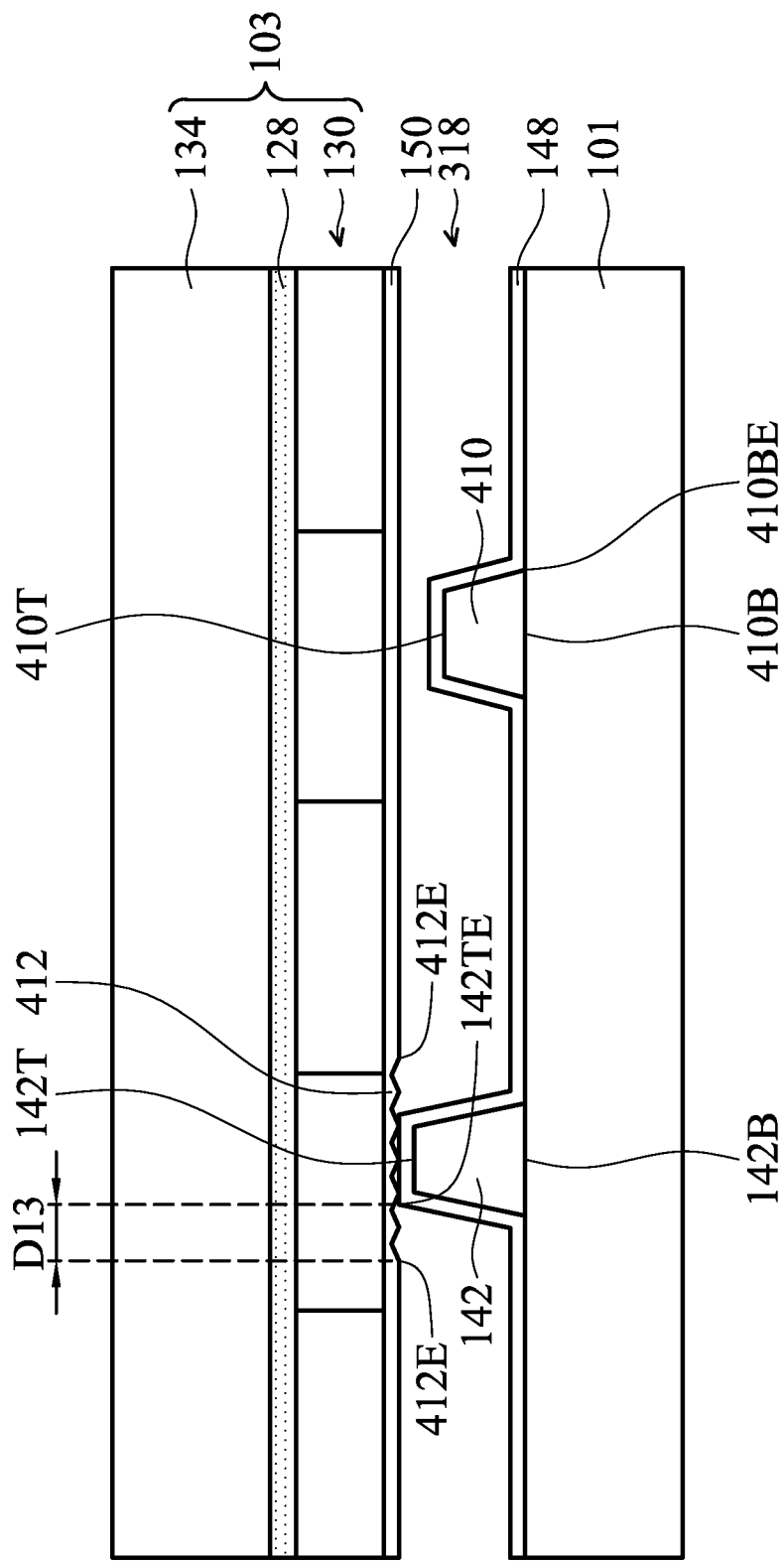
FIG. 7 is a cross-sectional view of a display device in accordance with another embodiment of the present disclosure.

In addition, although the above description merely illustrates embodiments with the first substrate being a color filter substrate and the second substrate being a transistor substrate such as the embodiments shown in FIGS. 1A-6, those skilled in the art will appreciate that the first substrate may be a transistor substrate with the second substrate being a color filter substrate, as shown in FIG. 7. Therefore, the exemplary embodiments put forth in FIGS. 1A-6 are merely for the purpose of illustration, and the inventive concept may be embodied in various forms without being limited to the exemplary embodiments as shown in FIGS. 1A-6.

As illustrated by FIG. 7, the first substrate 101 of the display device 100 is a transistor substrate, and the second substrate 103 is a color filter substrate. The main spacer 142 and the sub-spacer 410 disposed over the first substrate 101, which serves as a transistor substrate. The first alignment layer 148 is disposed over the first substrate 101, the main spacer 142 and the sub-spacer 410. The second substrate 103, which serves as a color filter substrate, may include a second transparent substrate 134, a light-shielding layer 128 disposed over the second transparent substrate 134 and a color filter layer 130 disposed over the light-shielding layer 128. The second alignment layer 150 is disposed over the color filter layer 130. The material of the second transparent substrate 134 may include the same material of the aforementioned first transparent substrate 126.

The embodiments of the present disclosure change the configuration of the wire in the display device to reduce the area occupied by the wire in the integrated circuit. In addition, the present disclosure also utilizes a patterned test pad to improve the reliability and yield of the display device.

First, a display device comprises a driving unit, a gate-driving circuit, a test pad and wires. The gate-driving circuit, a driving unit, the test pad and the wires are disposed on a substrate. The driving unit may be, but is not limited to, a driving unit. The driving unit includes the gate-signal output bump. The gate-signal output bump is electrically connected to the gate-driving circuit through one wire and is electrically connected to the test pad through another wire. Accordingly, the two wires mentioned above occupy two regions of the driving unit (corresponding to region 113A and region 113B in FIG. 8B). When the amount of signal output contacts of the output bump increases as the resolution of the display panel is enhanced, not only the area used to accommodate the wire electrically connecting to the signal output contacts of the output bump would be insufficient, but also the portion of the substrate below the chip in which the wires pass through would be insufficient.

Figure 8A:
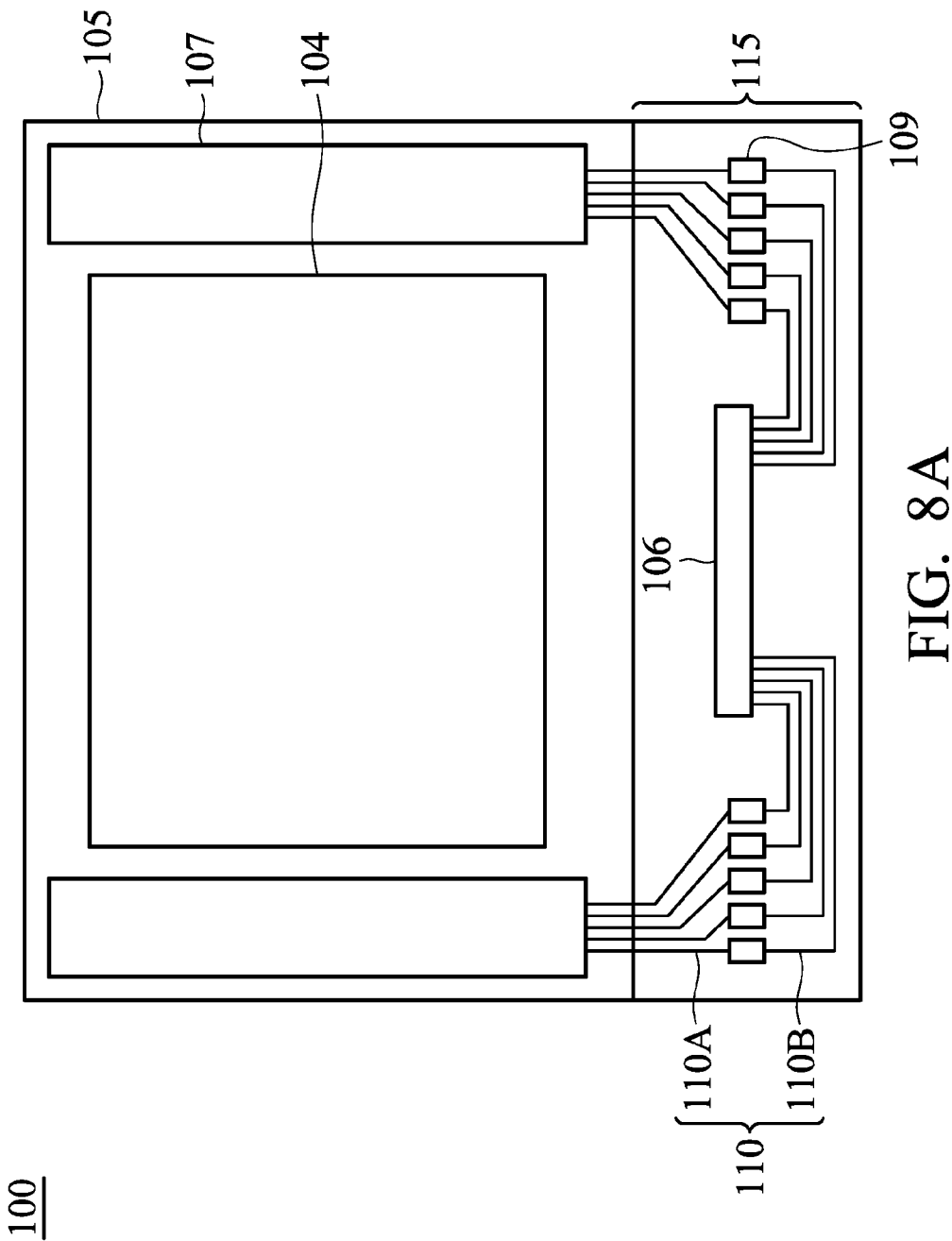
FIG. 8A is a top view of a display device in accordance with some embodiments of the present disclosure.

Therefore, in order to reduce the area occupied by the wire, another configuration of the wire in the display device is provided by the present disclosure. FIG. 8A is a top view of a display device in accordance with some embodiments of the present disclosure. As shown in FIG. 8A, the display device 100 includes a display region 104 and a non-display region 105 adjacent to the display region 104. The display region 104 is the region in the display device 100 in which the pixels including transistors display an image. The transistor may include, but is not limited to, an amorphous silicon thin film transistor or an LTPS thin film transistor. Therefore, the display region 104 is also referred to as a pixel-displaying region 104. The non-display region 105 is the region in the display device 100 except or other than the display region 104. In this embodiment, the non-display region 105 surrounds or encloses the display region 104. In addition, the non-display region 105 includes a gate-driving circuit (such as gate driver on panel, GOP) 107 disposed at the two opposite sides of the display region 104, a driving unit 106 and a test pad 109 disposed in the out lead bonding (OLB) region 115. In addition, the non-display region 105 further comprises a wire 110, and a portion of the wire 110 is disposed in the out lead bonding region 115. In other embodiments, the gate-driving circuit 107 may be disposed only at one side of the display region 104.

The display device 100 may include, but is not limited to, a liquid-crystal display, such as a thin film transistor liquid-crystal display. The driving unit 106 may provide a source signal to the pixels (not shown) in the display region 104 and/or provide a gate signal to the gate-driving circuit 107. The gate-driving circuit 107 may provide a scanning pulse signal to the pixels in the display region 104 and control the pixels (not shown) disposed in the display region 104 cooperating with the aforementioned source signal to display an image in the display device 100. The gate-driving circuit 107 may comprise, but is not limited to, a gate-on-panel (GOP) or any other suitable gate-driving circuit.

In addition, the driving unit 106 is electrically connected to the gate-driving circuit 107 through the test pad 109. The test pad 109 may be electrically connected to the gate-driving circuit 107 and the driving unit 106 by any suitable method. For example, In one embodiment, as shown in FIG. 8A, the test pad 109 is electrically connected to the gate-driving circuit 107 and the driving unit 106 through the wire 110.

Figure 8B:
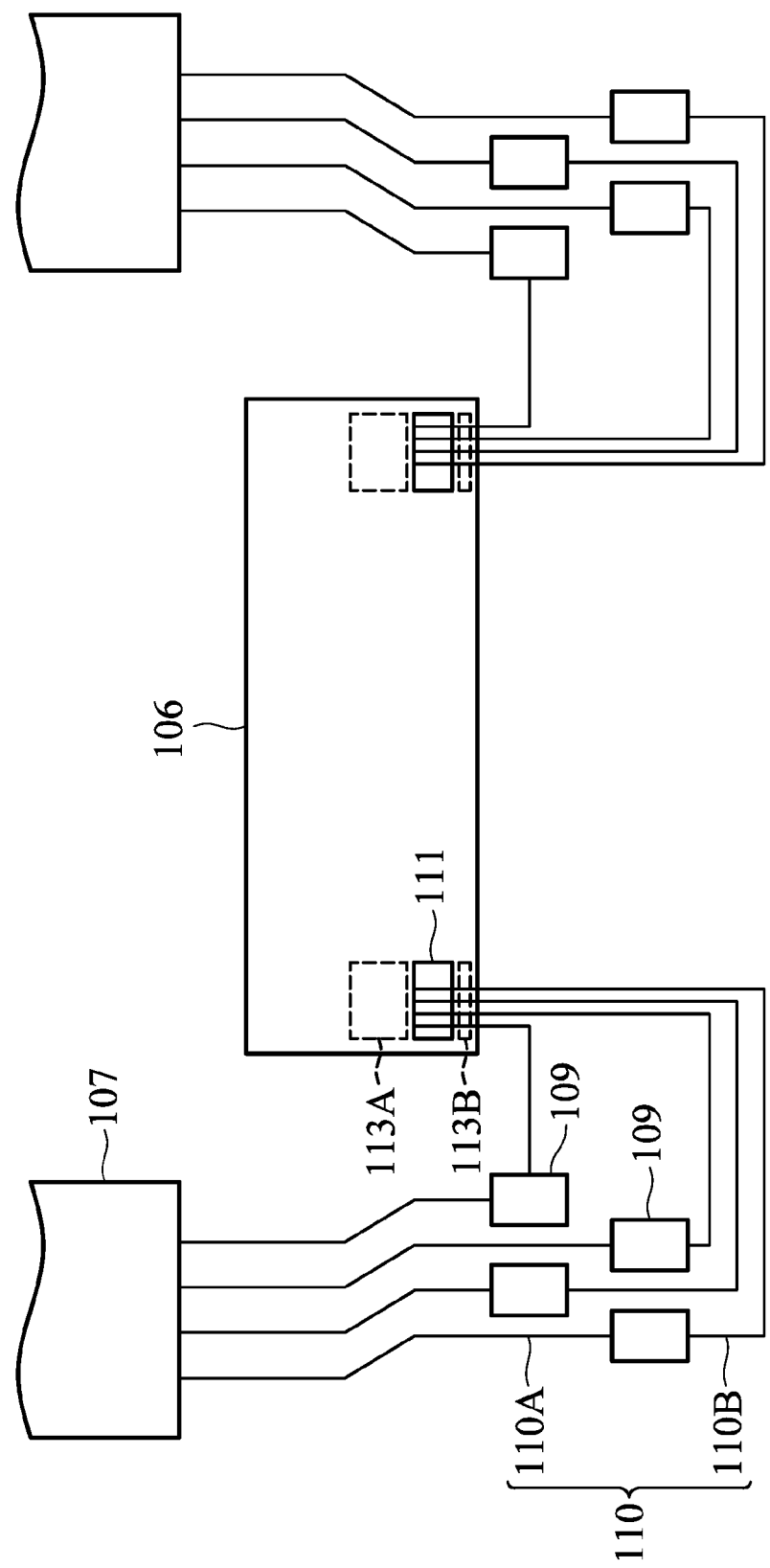
FIG. 8B is an enlarged figure of a portion of the display device in FIG. 8A.

By electrically connecting the driving unit 106 to the gate-driving circuit 107 through the test pad 109, the present disclosure may reduce the area occupied by the wire 110 in the driving unit 106, particular as illustrated in FIG. 8B, which is an enlarged figure of a portion of the display device 100 in FIG. 8A. As shown in FIG. 8B, the gate-signal output bump 111 of the driving unit 106 is electrically connected to the test pad 109 through the wire 110B. Then the test pad 109 is electrically connected to the gate-driving circuit 107 through another wire 110A. Compared to the aforementioned display device known to the applicant, the wires 110A and 110B in the known display device pass through the regions 113A and 113B respectively. Therefore, the area of the regions 113A and 113B must be occupied at the lower portion of the driving unit 106. However, the wire 110 of the present disclosure only occupies the area of the region 113B in the driving unit 106 and does not occupy the area of the region 113A. As the amount of signal output wire of the driving unit 106 increases when the resolution of the display panel is enhanced, the region 113A may be used to dispose other output wire. Therefore, the problem of there being insufficient area for the output wire in the chip such as the driving unit may be solved.

Furthermore, in order to improve the reliability and yield of the display device 100 in FIG. 8A, the test pad 109 of the display device 100 in the present disclosure may be a patterned test pad. In particular, in the testing step for testing the function of the display device 100, the test pad 109 must be touched by a probe, which would result in a hole in the conductive layer of the test pad 109 when the probe contacts the test pad 109. The hole in the conductive layer would be corroded and damaged by water and oxygen as time goes by, resulting in an open circuit or a malfunction of the wire between the driving unit 106 and the gate-driving circuit 107, which in turn would lower the reliability and yield of the display device 100. In order to solve the above technical problem, the test pad of the present disclosure may be patterned to be divided into a plurality of functional regions and sections which are separated apart from each other, and these functional regions and sections are electrically connected to each other through a connecting layer.

Figure 9:
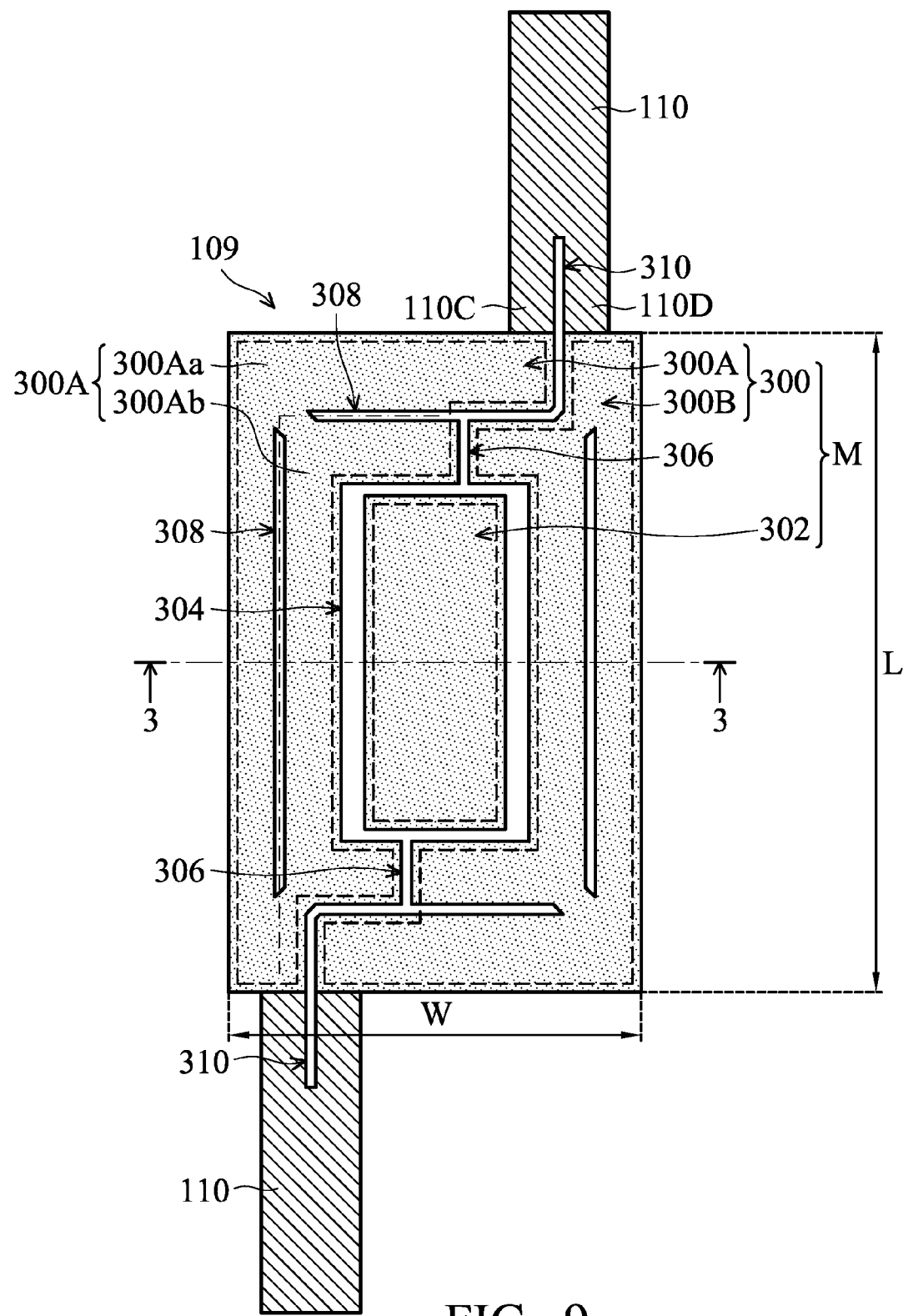
FIG. 9 is a top view of a test pad in accordance with some embodiments of the present disclosure.
Figure 10A:
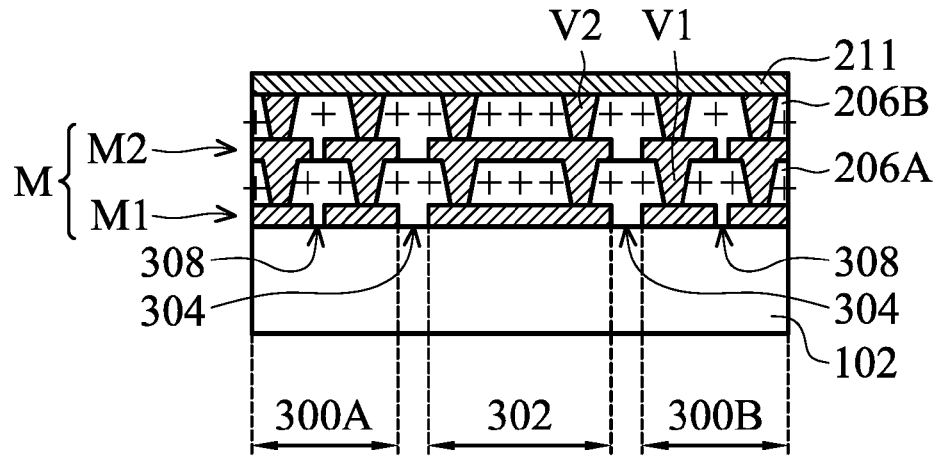
FIGS. 10A-10B are cross-sectional views of the test pad along line 3-3 in FIG. 9.

Referring to FIG. 9 and FIG. 10A, FIG. 9 is a top view of a test pad 109 in accordance with some embodiments of the present disclosure and FIG. 10A is a cross-sectional view of the test pad 109 along line 3-3 in FIG. 9. As shown in FIGS. 9 and 10A, the test pad 109 includes a conductive layer M disposed over a substrate 102, and the conductive layer M comprises a first region 300 and a second region 302. The first region 300 of the conductive layer M is used to transmit the signal between two wires 110. The second region 302 of the conductive layer M is used to contact the probe in the testing step. The first region 300 of the conductive layer M directly contacts the wire 110, whereas the second region 302 of the conductive layer M is separated apart from the first region 300 of the conductive layer M. In other words, the first region 300 of the conductive layer M does not connect or contact the second region 302 of the conductive layer M. For example, the first region 300 of the conductive layer M is separated apart from the second region 302 of the conductive layer M by a main gap 304. In addition, the second region 302 of the conductive layer M is separated apart from the wire 110. In other words, the second region 302 of the conductive layer M does not connect or contact the first region 300 of the conductive layer M and the wire 110. The first region 300 is electrically connected to the second region 302 by another connecting layer through a contact via.

Since the second region 302 of the conductive layer M, which is used to contact the probe in the testing step, is separated apart from the first region 300 of the conductive layer M, which is used to transmit the signal, and the wire 110, the corrosion after the testing step is limited to the second region 302 of the conductive layer M. Therefore, the first region 300 of the conductive layer M and the wire 110 would not be corroded. Accordingly, even if the corrosion happens after the testing step, the patterned test pad 109 of the present disclosure may still transmit signals through the first region 300 of the conductive layer M and the wire 110. Therefore, the patterned test pad 109 may improve the reliability and yield of the display device 100.

In addition, the ratio of the area of the first region 300 to that of the second region 302 of the conductive layer M ranges from about 2 to 1000, for example from about 4 to 10. If the area ratio of the first region 300 to the second region 302 is too large, for example greater than 1000, the area of the second region 302 of the conductive layer M which is used to contact the probe would be too small, such that it would be difficult to perform the testing step. However, if the area ratio of the first region 300 to the second region 302 is too small, for example smaller than 2, the area of the first region 300 of the conductive layer M which is used to transmit the signal would be too small, which in turn increases the resistance. In addition, the size of the test pad 109 may range from about 100 µm to 1000 µm, for example from about 500 µm to 800 µm. The size of the test pad 109 refers to the length L or width W of the test pad 109.

Referring to FIG. 10A, the conductive layer M is disposed over the substrate 102. The conductive layer M may comprise, but is not limited to, a metal layer. The material of the metal layer may include, but is not limited to, a single layer or multiple layers of copper, aluminum, tungsten, gold, chromium, nickel, platinum, titanium, iridium, rhodium, a combination thereof, an alloy thereof, or other metal materials with good conductivity. In other embodiments, the conductive layer M includes a nonmetal material. The conductive layer M may include any conductive material and would suffer a corrosion expansion after being corroded, and the conductive material could be used as the conductive layer M of the embodiments mentioned above. For example, in the embodiment shown in FIG. 10A, the conductive layer M is a double-layer conductive layer, which includes the first conductive layer M1 and the second conductive layer M2. In one embodiment, the materials of the first conductive layer M1 and the second conductive layer M2 are the same. However, in other embodiments, the materials of the first conductive layer M1 and the second conductive layer M2 may be different. An interlayer dielectric (ILD) layer 206A is disposed between the first conductive layer M1 and the second conductive layer M2. The first conductive layer M1 and the second conductive layer M2 have the same pattern, and the corresponding patterns are electrically connected to each other through the via V1 in the interlayer dielectric layer 206A. The material of the interlayer dielectric layer 206A may include, but is not limited to, silicon oxide, silicon nitride, silicon oxynitride, boron phosphorus silicate glass (BPSG), phosphorus silicate glass (PSG), spin-on glass (SOG), or any other suitable dielectric material, or a combination thereof. The material which electrically connects the first conductive layer M1 and the second conductive layer M2 through the via V1 may include, but is not limited to, the material of the first conductive layer M1, the material of the second conductive layer M2, a combination thereof, copper, aluminum, tungsten, doped poly-silicon, or any other suitable conductive material, or a combination thereof.

In addition, in the embodiment shown in FIG. 10A, the first region 300 of the conductive layer M may be electrically connected to the second region 302 of the conductive layer M by a connecting layer 211. Since the connecting layer 211 has a higher anticorrosive ability than the conductive layer, and the first region 300 and the second region 302 are electrically connect by a connecting layer 211 rather than by direct contact, the connecting layer 211 would protect the conductive layer from being corroded by water and oxygen. The material of the connecting layer 211 may include, but is not limited to, transparent conductive material such as indium tin oxide (ITO), tin oxide (TO), indium zinc oxide (IZO), indium gallium zinc oxide (IGZO), indium tin zinc oxide (ITZO), antimony tin oxide (ATO), antimony zinc oxide (AZO), a combination thereof, or any other suitable transparent conductive oxides with higher anticorrosive ability. The connecting layer 211 may be electrically connected to the conductive layer M1 or the conductive layer M2 by the via V2 in the interlayer dielectric layer 206B to electrically connect the first region 300 of the conductive layer M to the second region 302 of the conductive layer M.

Figure 10B:
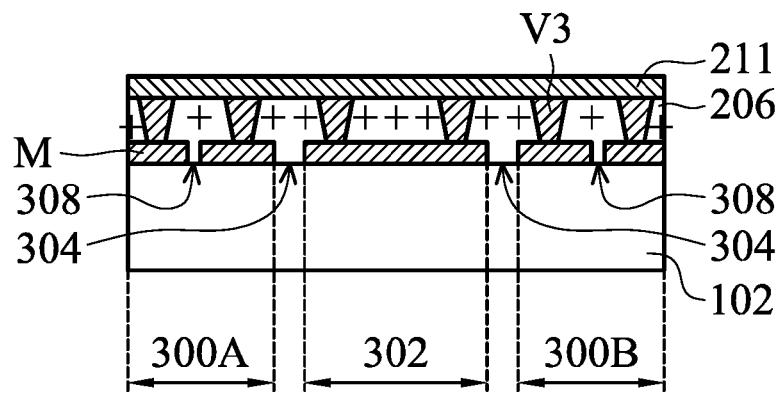

In addition, the conductive layer M may also be a single-layer conductive layer. As shown in FIG. 10B, only one single conductive layer M is disposed over the substrate 102, and the first region 300 of the conductive layer M may be electrically connected to the second region 302 of the conductive layer M by the connecting layer 211 through the via. For example, the connecting layer 211 may be electrically connected to the conductive layer M by the via V3 in the interlayer dielectric layer 206 to electrically connect the first region 300 of the conductive layer M to the second region 302 of the conductive layer M.

Referring to FIG. 9, in the embodiment shown in FIG. 9, the main gap 304 may surround the second region 302 of the conductive layer M. The width of the main gap 304 may range from about 10 μm to 100 μm, for example from about 20 μm to 40 μm. Alternatively, the ratio of the width of the main gap 304 to the width W of the test pad 109 may range from about 0.01 to 0.25, for example from about 0.025 to 0.1. If the width of the main gap 304 is too large, for example if the width of the main gap 304 is larger than 100 μm or the ratio of the width of the main gap 304 to the width W of the test pad 109 is larger than 0.25, the main gap 304 would occupy too much area of the test pad 109, which in turn reduces the area of the conductive layer M and increases the resistance. However, if the width of the main gap 304 is too small, for example if the width of the main gap 304 is smaller than 10 μm or the ratio of the width of the main gap 304 to the width W of the test pad 109 is smaller than 0.01, the main gap 304 could not effectively prevent the first region 300 of the conductive layer M from being corroded. For example, when the width of the main gap 304 is too small, if the probe contacts the main gap 304 due to shifting, the first region 300 of the conductive layer M would probably be exposed such that the first region 300 of the conductive layer M would be corroded.

In addition, the first region 300 of the conductive layer M also surrounds or encloses the second region 302 of the conductive layer M. The first region 300 of the conductive layer M may be divided into a plurality of sections which are separated apart from each other by one or more first gaps 306. In other words, the plurality of sections such as the sections 300A and 300B shown in FIG. 9 does not contact each other. The plurality of sections 300A and 300B which are separated apart from each other may further improve the reliability and yield of the display device 100. In particular, in the testing step, the probe may contact the first region 300 of the conductive layer M due to shifting. Therefore, the first region 300 of the conductive layer M may also be corroded after the testing step. The plurality of sections 300A and 300B which are separated apart from each other may limit the corrosion in the section touched by the probe, and the signal may still be transmitted by other sections of the first region 300 of the conductive layer M which are not corroded. For example, if the probe contacts section 300A, since sections 300A and 300B are separated apart from each other, the corrosion is limited to section 300A, and the signal can still be transmitted by section 300B, which is not corroded. Therefore, dividing the first region 300 of the conductive layer M into a plurality of sections which are separated apart from each other by one or more first gaps 306 may further improve the reliability and yield of the display device 100.

The width of the first gap 306 may range from about 3 μm to 50 μm, for example from about 10 μm to 20 μm. Alternatively, the ratio of the width of the first gap 306 to the width W of the test pad 109 may range from about 0.0033 to 0.1, for example from about 0.01 to 0.02. If the width of the first gap 306 is too large, for example if the width of the first gap 306 is larger than 50 μm or the ratio of the width of the first gap 306 to the width W of the test pad 109 is larger than 0.1, the first gap 306 would occupy too much area of the test pad 109, which in turn reduces the area of the conductive layer M and increases the resistance. However, if the width of the first gap 306 is too small, for example if the width of the first gap 306 is smaller than 3 μm or the ratio of the width of the first gap 306 to the width W of the test pad 109 is smaller than 0.0033, the first gap 306 could not effectively separate the sections 300A and 300B.

In addition, the plurality of sections 300A and 300B in the first region 300, which are separated apart from each other, may further include one or more in-section gaps 308. The in-section gaps 308 may divide the sections 300A and 300B into a plurality of sub-sections. The sub-sections are substantially separated apart from each other, and the sub-sections connect to each other only by a small part or a small portion of the sub-sections. For example, section 300A may be divided into a plurality of sub-sections 300Aa and 300Ab by a plurality of in-section gaps 308. The sub-sections 300Aa and 300Ab are substantially separated apart from each other, and the sub-sections 300Aa and 300Ab physically connect to each other only by a small part or a small portion located at the upper left and lower left in the figure. The plurality of the sub-sections 300Aa and 300Ab which are substantially separated apart from each other may further improve the reliability and yield of the display device 100. For example, if the probe contacts the sub-section 300Ab, since the sub-sections 300Aa and 300Ab connect to each other only by a small part or a small portion, the corrosion is limited to sub-section 300Ab. Even if the sub-section 300Ab is damaged due to the corrosion, the signal may still be transmitted by the sub-section 300Aa which are not corroded. Therefore, dividing the plurality of sections 300A and 300B into a plurality of sub-sections such as sub-sections 300Aa and 300Ab by the in-section gaps 308 may further improve the reliability and yield of the display device 100.

The width of the in-section gap 308 may range from about 3 μm to 50 μm, for example from about 10 μm to 20 μm. Alternatively, the ratio of the width of the in-section gap 308 to the width W of the test pad 109 may range from about 0.0033 to 0.1, for example from about 0.01 to 0.02. If the width of the in-section gap 308 is too large, for example if the width of the in-section gap 308 is larger than 50 μm or the ratio of the width of the in-section gap 308 to the width W of the test pad 109 is larger than 0.1, the in-section gap 308 would occupy too much area of the test pad 109, which in turn reduces the area of the conductive layer M and increases the resistance. However, if the width of the in-section gap 308 is too small, for example if the width of the in-section gap 308 is smaller than 3 μm or the ratio of the width of the in-section gap 308 to the width W of the test pad 109 is smaller than 0.0033, the sub-sections 300Aa and 300Ab would be too close and the in-section gap 308 could not effectively prevent corrosion.

Referring to FIG. 9, the material of the wire 110 may include, but is not limited to, a single layer or multiple layers of copper, aluminum, tungsten, gold, chromium, nickel, platinum, titanium, iridium, rhodium, a combination thereof, an alloy thereof, or other metal materials with good conductivity. In addition, the wire 110 may further include one or more in-wire gaps 310. In one embodiment, at least one in-wire gap 310 connects to at least one first gap 306. The in-wire gap 310 may further improve the reliability and yield of the display device 100. In particular, if the corrosion extends from the sections 300 of the first region 300 to the first-section wire 110C, the in-wire gap 310 may limit the corrosion to the first-section wire 110C, and the second-section wire 110D would not be corroded. Accordingly, since the wire 110 would not be corroded completely, the in-wire gap 310 may further improve the reliability and yield of the display device 100. In other embodiments, the connecting layer 211 may also be disposed above or overlapped the wire 110.

The width of the in-wire gap 310 may range from about 3 μm to 50 μm, for example from about 10 μm to 20 μm. Alternatively, the ratio of the width of the in-wire gap 310 to the width of the wire 110 may range from about 0.02 to 0.5, for example from about 0.05 to 0.2. If the width of the in-wire gap 310 is too large, for example if the width of the in-wire gap 310 is larger than 50 μm or the ratio of the width of the in-wire gap 310 to the width of the wire 110 is larger than 0.5, the risk of an open circuit occurring in the wire 110 would increase due to the overly large size of the in-wire gap 310. However, if the width of the in-wire gap 310 is too small, for example if the width of the in-wire gap 310 is smaller than 3 μm or the ratio of the width of the in-wire gap 310 to the width of the wire 110 is smaller than 0.02, the in-wire gap 310 would not effectively prevent the corrosion from extending between the first-section wire 110C and the second-section wire 110D at the opposite sides of the in-wire gap 310. Alternatively, the ratio of the length of the in-wire gap 310 to the length L of the test pad 109 may range from about 0.03 to 3. The length of the in-wire gap 310 may be as short as 3 μm. Alternatively, the ratio of the length of the in-wire gap 310 to the length L of the test pad 109 may be as small as 0.03. The length of the in-wire gap 310 may be as long as the length of the wire 110 in the out lead bonding region 115. If the length of the in-wire gap 310 is too short, for example if the length of the in-wire gap 310 being shorter than 3 μm or the ratio of the length of the in-wire gap 310 to the length L of the test pad 109 is smaller than 0.03, the in-wire gap 310 could not effectively separate the first-section wire 110C and the second-section wire 110D. However, length of the in-wire gap 310 cannot be longer than the length of the wire 110 in the out lead bonding region 115.

It should be noted that the exemplary embodiment set forth in FIG. 9 is merely for the purpose of illustration. In addition to the embodiment set forth in FIG. 9, the test pad could have other patterns as shown in FIGS. 11-14. The inventive concept and scope are not limited to the exemplary embodiment shown in FIG. 9.

Figure 11:
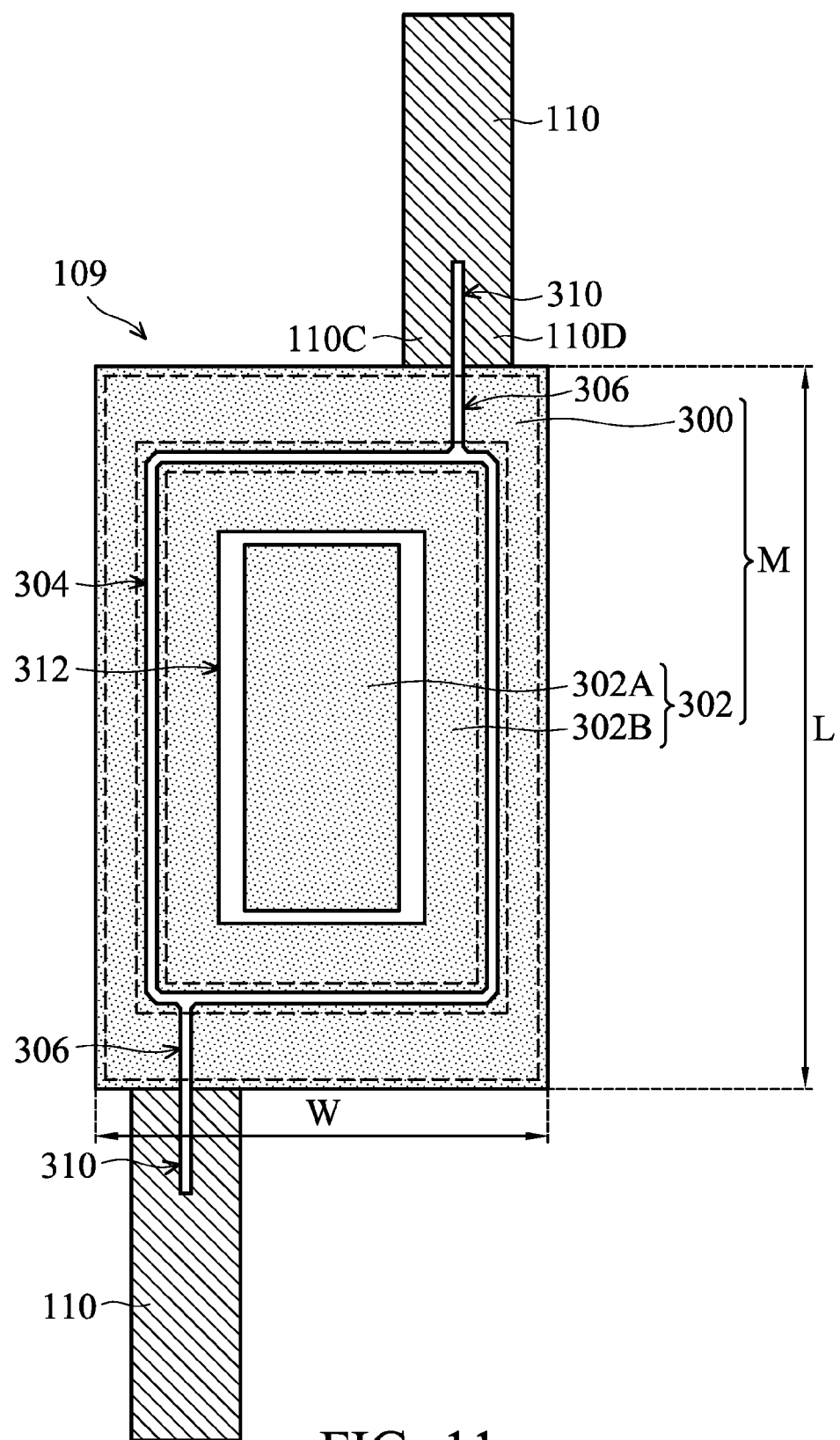
FIG. 11 is a top view of a test pad in accordance with another embodiment of the present disclosure.

Referring to FIG. 11, which is a top view of a test pad in accordance with another embodiment of the present disclosure. The difference between the embodiments shown in FIGS. 9 and 11 is that the second region 302 of the conductive layer M is also divided into a plurality of sections 302A and 302B which are separated apart from each other by one or more second gaps 312. In other words, the plurality of sections 302A and 302B do not directly contact each other. In addition, in the embodiment shown in FIG. 4, the first region 300 of the conductive layer M does not include an in-section gap.

The plurality of sections 302A and 302B which are separated apart from each other may further improve the reliability and yield of the display device 100. For example, when the probe touches the sections 302A, the corrosion is limited to section 302A, and the section 302B which is not corroded could still transmit signal through the via and the connecting layer. Therefore, the plurality of sections 302A and 302B may further improve the reliability and yield of the display device 100 and may further reduce the resistance.

The width of the second gap 312 may range from about 10 μm to 100 μm, for example from about 30 μm to 50 μm. Alternatively, the ratio of the width of the second gap 312 to the width W of the test pad 109 may range from about 0.01 to 0.25, for example from about 0.05 to 0.1. If the width of the second gap 312 is too large, for example if the width of the second gap 312 is larger than 100 μm or the ratio of the width of the second gap 312 to the width W of the test pad 109 is larger than 0.25, the second gap 312 would occupy too much area of the test pad 109, which in turn reduces the area of the conductive layer M and increases the resistance. However, if the width of the second gap 312 is too small, for example if the width of the second gap 312 is smaller than 10 μm or the ratio of the width of the second gap 312 to the width W of the test pad 109 is smaller than 0.01, the second gap 312 could not effectively separate the sections 302A and 302B.

Figure 12:
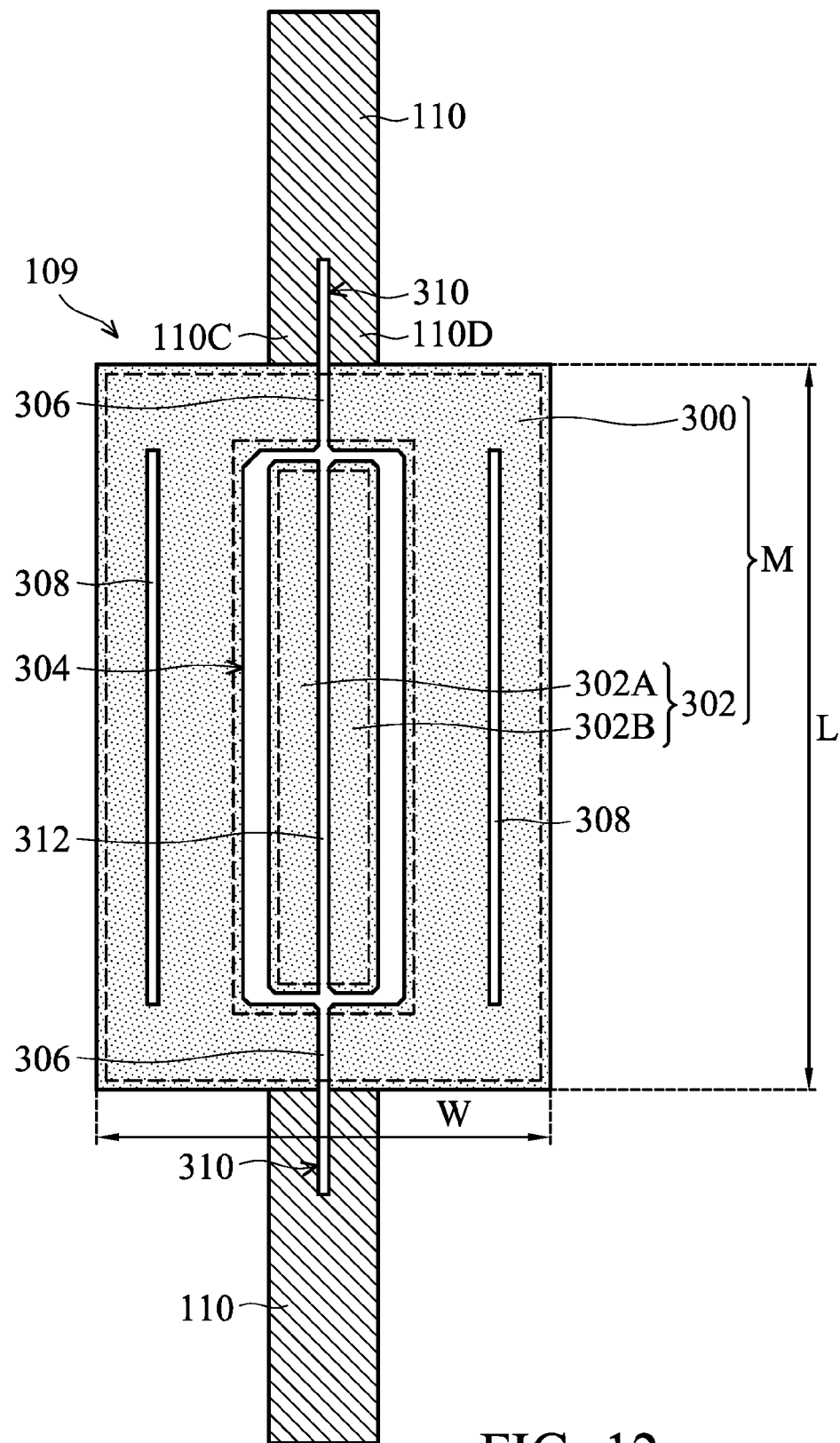
FIG. 12 is a top view of a test pad in accordance with another embodiment of the present disclosure.

Referring to FIG. 12, which is a top view of a test pad in accordance with another embodiment of the present disclosure. In the embodiment shown in FIG. 12, the second region 302 of the conductive layer M is also divided into a plurality of sections 302A and 302B which are separated apart from each other by one or more second gaps 312. The difference between the embodiment shown in FIG. 12 and the embodiment shown in FIG. 11 is that the second gap 312 of this embodiment is aligned with the first gap 306 and the in-wire gap 310.

Figure 13:
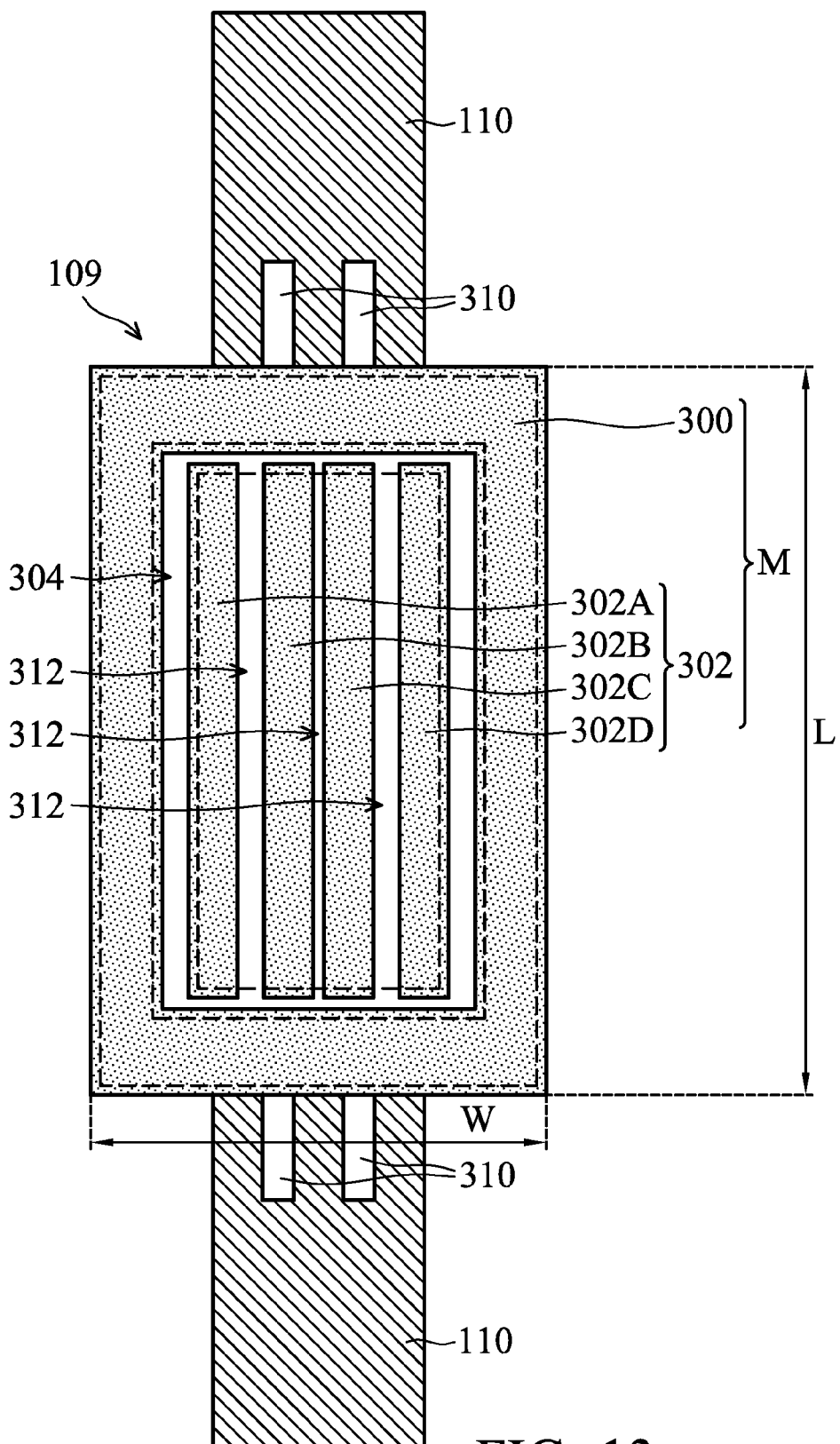
FIG. 13 is a top view of a test pad in accordance with another embodiment of the present disclosure.

Referring to FIG. 13, which is a top view of a test pad in accordance with another embodiment of the present disclosure. The difference between the embodiment shown in FIG. 13 and the embodiment shown in FIG. 12 is that the second region 302 of the conductive layer M is divided into four sections 302A, 302B, 302C and 302D which are separated apart from each other by three second gaps 312. In addition, the wire 110 includes two in-wire gaps 310, and the first region 300 of the conductive layer M does not include the first gap.

Figure 14:
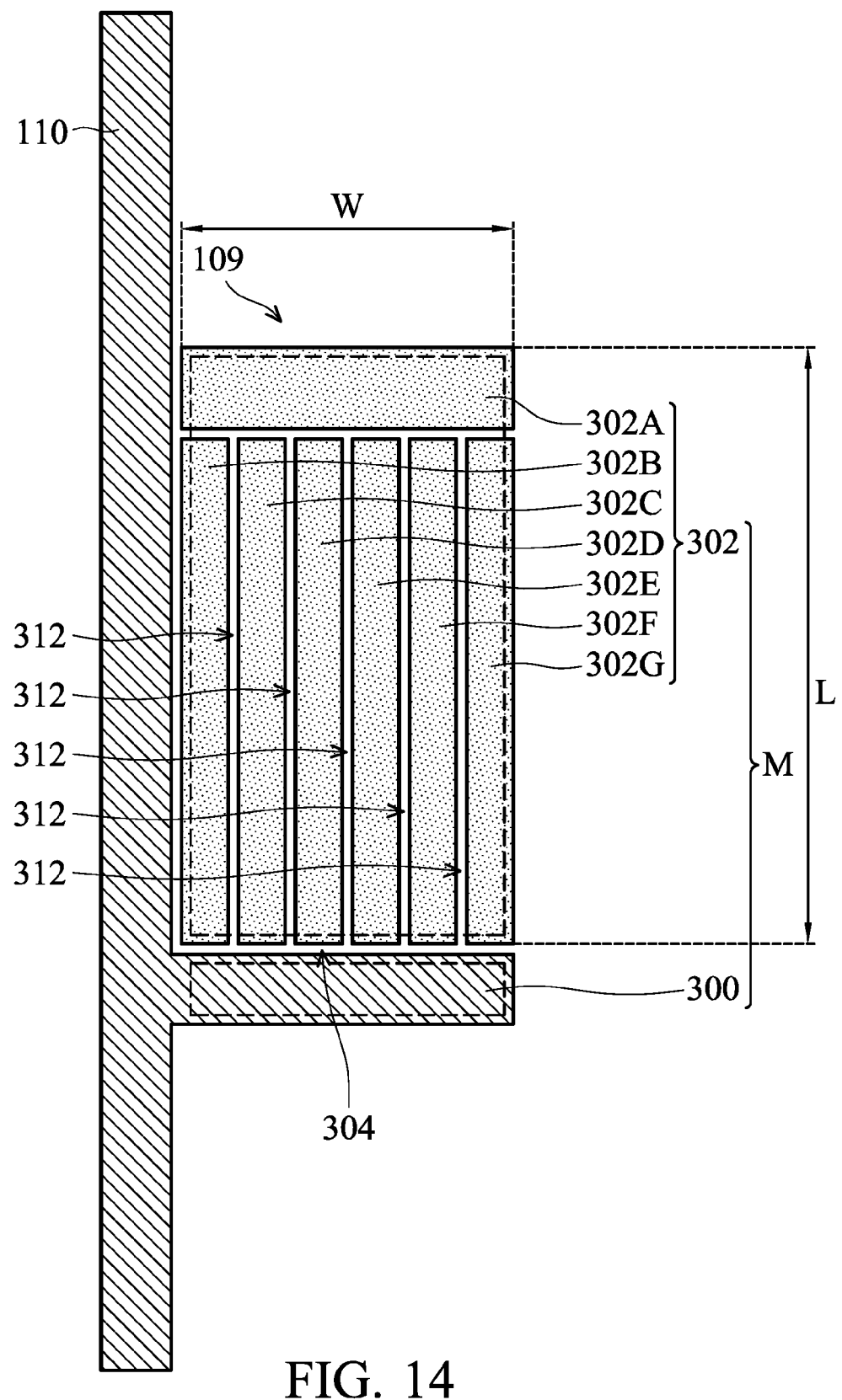
FIG. 14 is a top view of a test pad in accordance with another embodiment of the present disclosure.

Referring to FIG. 14, which is a top view of a test pad in accordance with another embodiment of the present disclosure. The difference between the embodiment shown in FIG. 14 and the embodiments shown in FIGS. 9 and 11-13 is that the first region 300 of the conductive layer M does not surround or enclose the second region 302 of the conductive layer M. Instead, the first region 300 of the conductive layer M is disposed at one side of the second region 302 of the conductive layer M. In addition, the second region 302 of the conductive layer M is divided into seven sections 302A, 302B, 302C, 302D, 302E, 302F and 302G which are separated apart from each other by six second gaps 312. In other embodiments, the shape of the second gap 312 is not limited to a linear shape, and the division manner is not limited to that shown in the above embodiments. Any division manner which may divide the second region 302 of the conductive layer M into a plurality of the sections which are separated apart from each other may be used in the present disclosure.

In summary, by electrically connecting the driving unit to the gate-driving circuit through the test pad, the present disclosure may reduce the area occupied by the wire in the driving unit. Therefore, the problem of insufficient area for the wire in the driving unit happened as the resolution of the display panel is enhanced may be solved. In addition, the present disclosure utilizes the patterned test pad to limit the corrosion happened after the testing step in a portion of the patterned test pad, which in turn improves the reliability and yield of the display device.

The disclosure provides a display device that has a fanout area with circuits that are integrated to a high degree in order to reduce the space occupied by the fanout area. Therefore, the display device can have a high resolution under the premise that the size of the display device is fixed.

In addition, according to an embodiment of the disclosure, the display device of the disclosure can further include a first conductive loop, having a plurality of conductive blocks, outside the display region, in order to prevent the display device from damage caused by electrostatic discharge during the process.

Moreover, according to an embodiment of the disclosure, the display device of the disclosure can further include a second conductive loop outside the display region, wherein a sealant is disposed over the second conductive loop and close to the peripheral boundary of the display device, in order to achieve a high electrostatic discharge ability.

Figure 15:
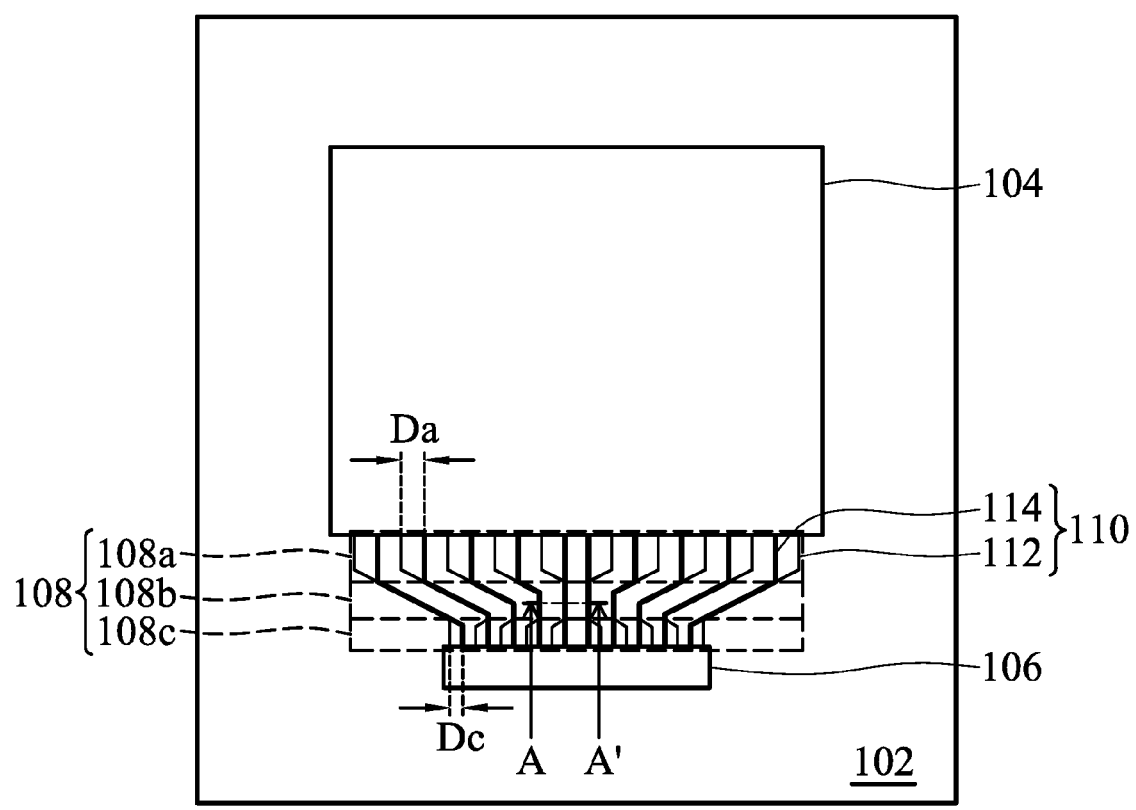
FIG. 15 is a top view of a display device according to an embodiment of the disclosure.

FIG. 15 shows a top-view of a display device according to an embodiment of the disclosure. The display device 100 includes a display region 104 and a driving unit 106 disposed on a substrate 102. The display device 100 can be a liquid-crystal display (such as thin film transistor liquid-crystal display), or an organic electroluminescent display (such as active full-color organic electroluminescent display). The display region 104 has a plurality of pixels (not shown), and the driving unit 106 is electrically connected to the display region 104 via a plurality of signal line pairs 110, in order to provide input to the pixels of the display region 110 so that the display device can display images. In particular, the display region 104 is separated from the driving unit 106 by a fanout area 108, and a plurality of signal line pairs 110 are disposed on the fanout area 108. At least one of the signal line pairs 110 includes a first conductive line 112 and a second conductive line 114, wherein the first conductive line 112 and the second conductive line 114 are electrically isolated from each other. The first conductive line 112 and the second conductive line 114 transmit different signals. For example, each of the pixels disposed in the display region 104 can have at least three sub-pixels (such as red sub-pixel, blue sub-pixel, and green sub-pixel; or, red sub-pixel, blue sub-pixel, green sub-pixel, and white sub-pixel), and the various signals produced by the driving unit 106 are transmitted to the sub-pixels via the first conductive lines 112 and second conductive lines 114. In addition, In the fanout area 108, at least a part of the first conductive line 112 overlaps with the second conductive line 114.

As still shown in FIG. 15, the fanout area 108 can be defined as a first circuit area 108a, a second circuit area 108b, and a third circuit area 108c, wherein the first circuit area 108a is adjacent to the display region 104, the third circuit area 108c is adjacent to the driving unit 106, and the second circuit area 108b area disposed between the first circuit area 108a and third circuit area 108c.

According to an embodiment of the disclosure, in the first circuit area 108a, any the first conductive line 112 and the adjacent second conductive line 114 are separated by a distance (minimum horizontal distance) Da. Namely, the first conductive block 112 and the second conductive block 114 adjacent to the first conductive block 112 are separated from each other. In the third circuit area 108c, any the first conductive line 112 and the adjacent second conductive line 114 are separated by a distance (minimum horizontal distance) Dc. In particular, the distance Da (the distance between the first conductive block 112 and the second conductive block 114 adjacent to the first conductive block 112) can be from 3 to 40 μm, the distance Dc can be from 3 μm to 18 μm, and the distance Da is longer than the distance Dc.

Figure 16A:
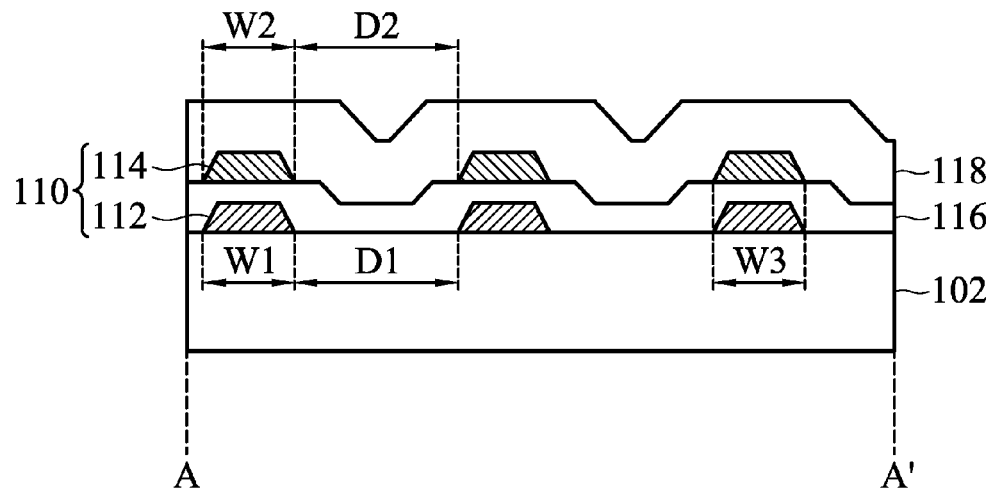
FIG. 16A is a cross-sectional view of the display device shown in FIG. 15 along line A-A'.

FIG. 16A shows a cross-sectional view of FIG. 15 along line A-A'. As shown in FIG. 16A, in the second circuit area 108b, the first conductive line 112 and the second conductive line 114 of the same signal line pair 110 can partially overlap each other. As a result, the horizontal projection area of the first conductive line 112 and the second conductive line 114 can be reduced, and the integration degree of the fanout area 108 can be increased.

As shown in FIG. 16A, the first conductive line 112 can be disposed on the substrate 102. A dielectric layer 116 can be disposed on the substrate 102 to cover the first conductive line 112. The second conductive line 114 can be disposed on the dielectric layer 116, and the first conductive line 112 can overlap with the second conductive line 114. A passivation layer 118 can be disposed on the dielectric layer 116 to cover the second conductive line 114. In particular, the substrate 102 can be quartz, glass, silicon, metal, plastic, or ceramic. Suitable materials for the first conductive lines 112 and the second conductive lines 114 include a single-layer or multilayer metal conductive material (such as aluminum (Al), copper (Cu), molybdenum (Mo), titanium (Ti), platinum (Pt), iridium (Ir), nickel (Ni), chromium (Cr), silver (Ag), gold (Au), tungsten (W), or an alloy thereof), metal-containing conductive material (such as: aluminum-containing compound, copper-containing compound, molybdenum-containing compound, titanium-containing compound, platinum-containing compound, iridium-containing compound, nickel-containing compound, chromium-containing compound, silver-containing compound, gold-containing compound, tungsten-containing compound, magnesium-containing compound, or a combination thereof), or a combination thereof. Furthermore, the first conductive line 112 and the second conductive line 114 can be made of the same or different material. The dielectric layer 116 can be silicon nitride, silicon oxide, silicon oxynitride, silicon carbide, aluminum oxide, or a combination thereof. The passivation layer 118 can be made of organic insulating materials (such as photosensitive resins) or inorganic insulating materials (such as silicon nitride, silicon oxide, silicon oxynitride, silicon carbide, aluminum oxide, or a combination thereof), in order to isolate the first conductive line 112 and the second conductive line 114 from air and moisture. In addition, according to an embodiment of the disclosure, the first conductive line 112 and the second conductive line 114 have tapered sidewalls, as shown in FIG. 16A. In particular, the tapered sidewall of the first conductive line 112 or the second conductive line 114 has an inclination angle of 15 to 90° from horizontal. Further, the inclination angle of the first conductive line 112 can be equal to or different from that of the second conductive line 114.

Figure 16B:
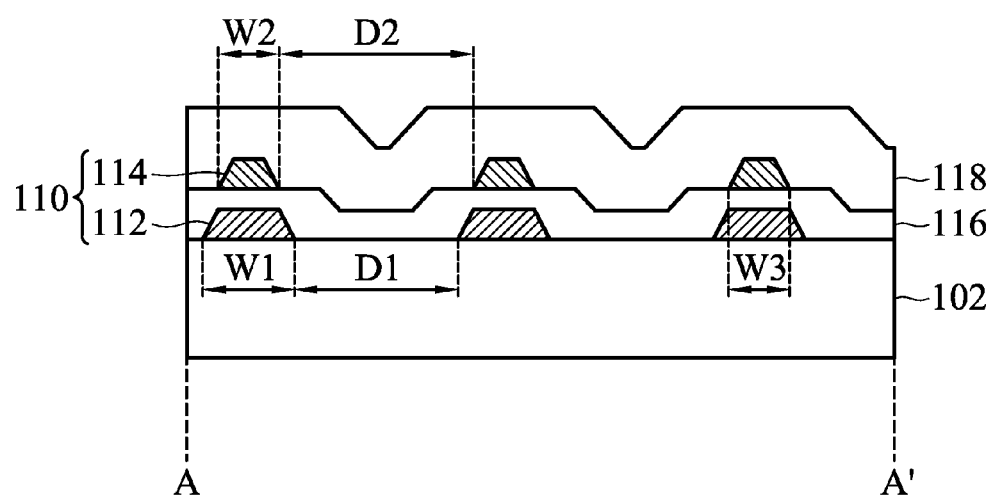
FIGS. 16B and 16C are cross-sectional views of the display devices according to some embodiments of the disclosure along line A-A' of FIG. 15.

According to an embodiment of the disclosure, the width W1 of the first conductive line 112 can be from 2 to 10 μm, the width W2 of the second conductive line 114 can be from 2 to 10 µm, and the width W1 can be equal to the width W2 (as shown in FIG. 16A). Further, the width W1 of the first conductive line 112 can be different from the width W2 of the second conductive line 114 (as shown in FIG. 16B). Namely, the ratio of the width W1 of the first conductive line 112 to the width W2 of the second conductive line 114 is from 1 to 5. For example, as shown in FIG. 16B, the width W1 of the first conductive line 112 can be larger than the width W2 of the second conductive line 114. In addition, as shown in FIGS. 16A and 16B, the second conductive line 114 can completely overlap with the first conductive line 112 (i.e., the horizontal projection of the second conductive line 114 can completely overlap the horizontal projection of the first conductive line 112).

According to an embodiment of the disclosure, in the second circuit area 108b, any two adjacent first conductive lines 112 are separated by a distance D1 (i.e., the minimum horizontal distance between the two adjacent first conductive lines 112 in the second circuit area 108b). Further, in the second circuit area 108b, any two adjacent second conductive lines 114 are separated by a distance D2 (i.e., the minimum horizontal distance between the two adjacent second conductive lines 114 in the second circuit area 108b). In particular, the distance D1 can be from 2 to 30 µm, and the distance D2 can be from 2 to 30 µm.

According to an embodiment of the disclosure, in the second circuit area 108b, the sum (W1+D1) of the width W1 of the first conductive line 112 and the distance D1 can be equal to the sum (W2+D2) of the width W2 of the second conductive line 114 and the distance D2. In addition, the ratio (D1/(W1+D1)) of the distance D1 and the sum of the distance D1 and the width W1 can be from 0.1 to 0.66. When the ratio (D1/(W1+D1)) is greater than or equal to 0.1, a sealant (not shown) subsequently formed within the second circuit area 108b is apt to be completely cured after a curing process (irradiating an energy from the substrate 102 side). On the other hand, when the ratio (D1/(W1+D1)) is less than or equal to 0.66, the integration degree of conductive lines of the second circuit area 108b can be increased.

According to embodiments of the disclosure, the overlapping portion of the first conductive line 112 and the second conductive line 114 (i.e., the overlapping portion of the horizontal projection of the first conductive line 112 and the horizontal projection of the second conductive line 114) has a width W3 (i.e., the minimum horizontal width). Further, the ratio (W3/W1) of the width W3 and the width W1 of the first conductive line 112 is from 0.3 to 1.

Figure 16C:
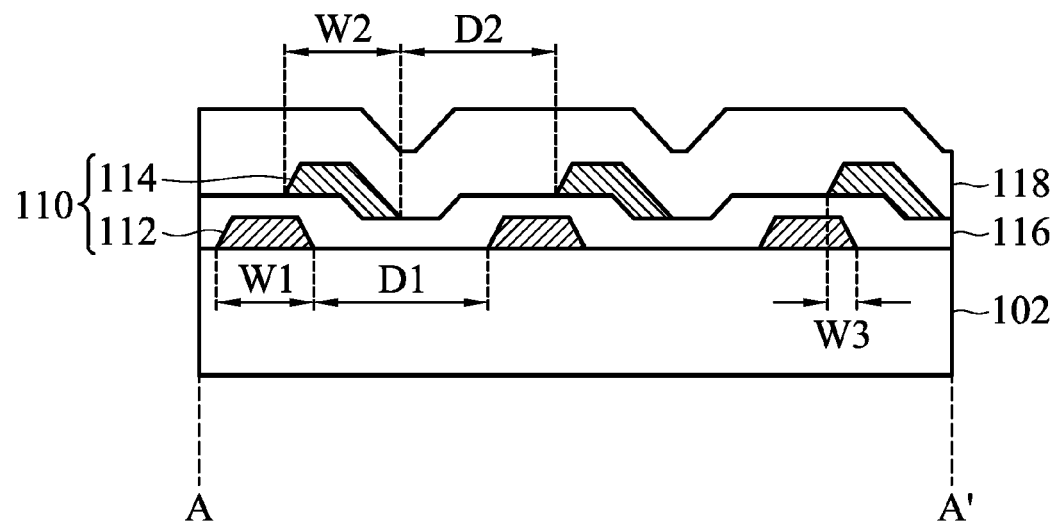

With respect to the signal line pair 110 in the second circuit area 108b, at least a part of the first conductive line 112 can overlap with the second conductive line 114 (i.e., at least a part of the horizontal projection of the first conductive line 112 can overlap the horizontal projection of the second conductive line 114), as shown in FIG. 16C. Herein, the relationship between the width W1 of the first conductive line 112, the width W2 of the second conductive line 114, and the width W3 can be defined by the following equation:

$$(W1+W2-W3)/W1 \geq 1$$

Figure 17:
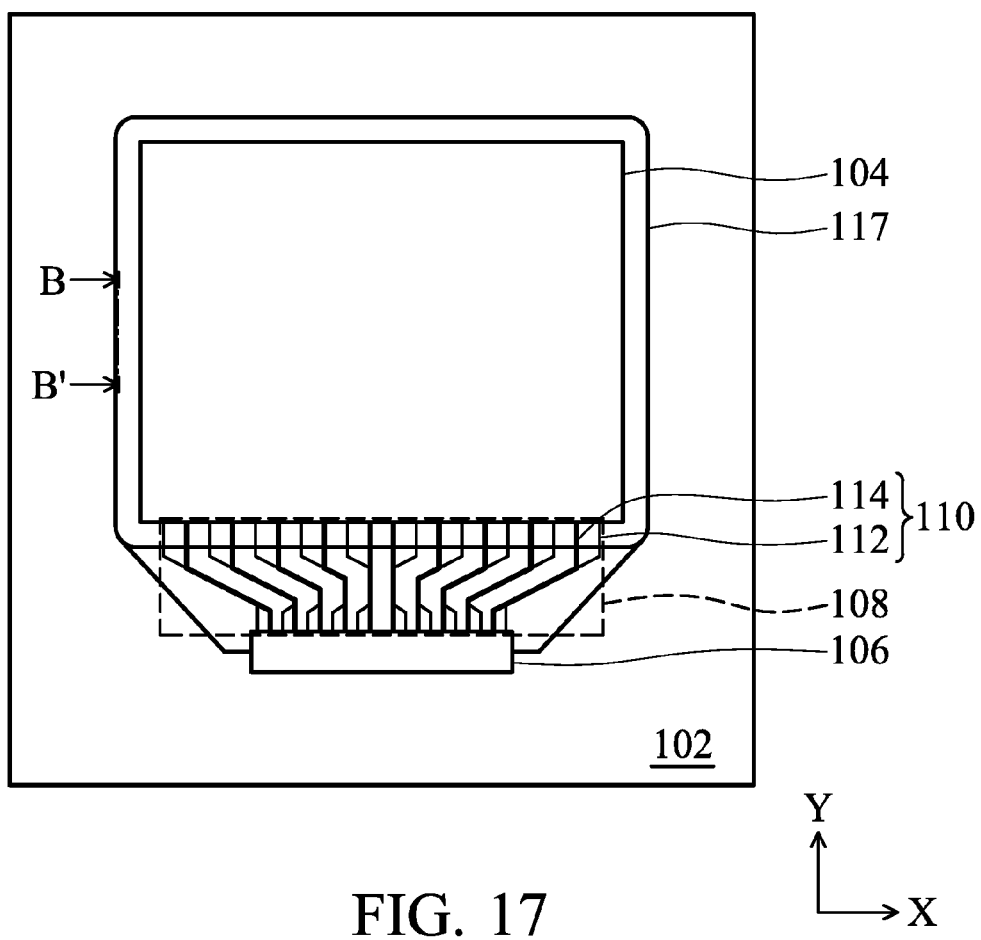
FIG. 17 is a top view of a display device according to another embodiment of the disclosure.

FIG. 17 is a top-view of a display device 100 according to an embodiment of the disclosure. Besides the display region 104, the driving unit 106, and the fanout area 108, the display device 100 further includes a first conductive loop 117 disposed outside the display region 104. As shown in FIG. 17, the first conductive loop 117 can be disposed on the substrate 102 and surround the display region 104. Further, the first conductive loop 117 can be electrically connected to the driving unit 106, and the driving unit 106 can provide a voltage signal to the first conductive loop 117 in order to force the first conductive loop 117 to generate a reference voltage. Since the first conductive loop 117 would overlap with the signal line pairs 110 in the fanout area 108, another conducting layer can be used as a substitute for the first conductive loop 117 or the signal line pairs 110 in order to avoid contact between the first conductive loop 117 and the signal line pairs 110.

Figure 18A:
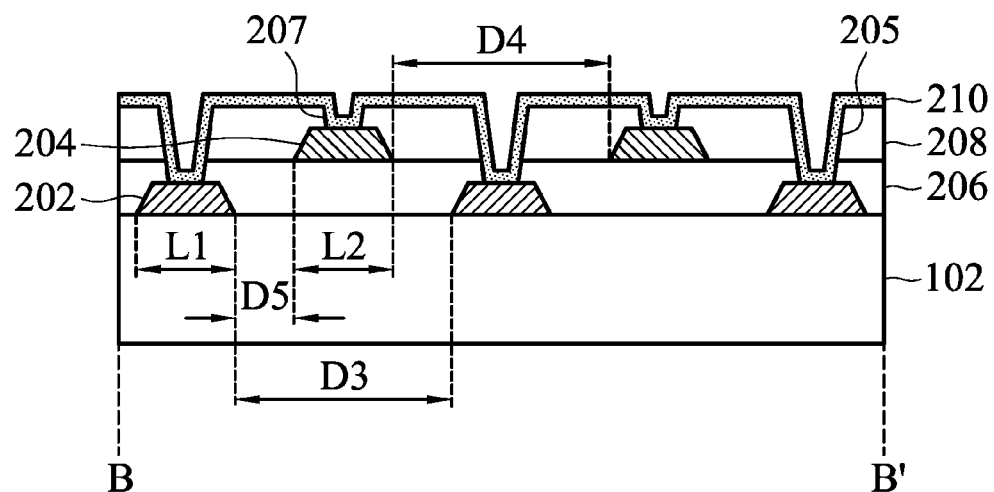
FIG. 18A is a cross-sectional view of the display device shown in FIG. 17 along line B-B'.

According to an embodiment of the disclosure, at least a part of the first conductive loop 117 includes a plurality of first conductive blocks 202 and a plurality of second conductive blocks 204. The first conductive blocks 202 and the second conductive blocks 204 are electrically connected to each other. FIG. 18A shows a cross-sectional view of the display device 100 of FIG. 17 along line B-B'. According to an embodiment of the disclosure, the part of the first conductive loop 117 including the plurality of first conductive blocks 202 and the plurality of second conductive blocks 204 can be disposed on the two opposite sides of the display region 104, and the part of the first conductive loop 117 can be perpendicular to a first axis X (i.e. parallel to a second axis Y). In an embodiment of the disclosure, since there are a plurality of data lines (not shown) disposed on the two opposite sides of the display region 104 corresponding to the first axis X (i.e. the plurality of data lines perpendicular to the first axis X), the part of the first conductive loop 117 including the plurality of first conductive blocks 202 and the plurality of second conductive blocks 204 is not apt to be disposed parallel to the first axis X. In some embodiments of the disclosure, the part of the first conductive loop 117 including the plurality of first conductive block 202 and the plurality of second conductive block 204 can be also disposed on the two opposite sides of the display region 104 and parallel to a first axis X.

As shown in FIG. 18A, the plurality of first conductive blocks 202 can be disposed on the substrate 102. A dielectric layer 206 can be disposed on the substrate 102 to cover the first conductive blocks 202. The plurality of second conductive blocks 204 can be disposed on the dielectric layer 206. A passivation layer 208 can be disposed on the dielectric layer 206 to cover the second conductive blocks 204. In addition, a plurality of first via holes 205 pass through the dielectric layer 206 and the passivation layer 208, exposing the first conductive block 202. A plurality of second via holes 207 pass through the passivation layer 208, exposing the second conductive block 204. A conducting layer 210 can be disposed on the passivation layer 208 to fill into the first via hole 205 and the second via hole 207, resulting in the plurality of first conductive blocks 202 and the plurality of second conductive blocks 204 being electrically connected to each other via the conducting layer 210.

According to an embodiment of the disclosure, the first conductive block 202 and the second conductive block 204 can be a made of single-layer or multilayer metal conductive material (such as aluminum (Al), copper (Cu), molybdenum (Mo), titanium (Ti), platinum (Pt), iridium (Ir), nickel (Ni), chromium (Cr), silver (Ag), gold (Au), tungsten (W), or an alloy thereof), metal-containing conductive material (such as: aluminum-containing compound, copper-containing compound, molybdenum-containing compound, titanium-containing compound, platinum-containing compound, iridium-containing compound, nickel-containing compound, chromium-containing compound, silver-containing compound, gold-containing compound, tungsten-containing compound, magnesium-containing compound, or a combination thereof), or a combination thereof. Further, the materials of first conductive blocks 202 and second conductive blocks 204 can be the same or different. According to an embodiment of the disclosure, the first conductive blocks 202 and the first conductive line 112 can be formed in the same process and made of the same material; and/or, the second conductive blocks 204 and the second conductive line 114 can be formed in the same process and made of the same material. The dielectric layer 206 can be silicon nitride, silicon oxide, silicon oxynitride, silicon carbide, aluminum oxide, or a combination thereof. Further, the dielectric layer 206 and the dielectric layer 116 can be formed in the same process and made of the same material. The passivation layer 208 can be organic insulating materials (such as photosensitive resins) or inorganic insulating materials (such as silicon nitride, silicon oxide, silicon oxynitride, silicon carbide, aluminum oxide, or a combination thereof). The passivation layer 208 and the passivation layer 118 can be formed in the same process and made of the same material. In addition, the conducting layer 210 can be a single-layer or multilayer transparent conducting layer, and the material of the conducting layer 210 can be ITO (indium tin oxide), IZO (indium zinc oxide), AZO (aluminum zinc oxide), ZnO (zinc oxide), tin oxide, indium oxide, or a combination thereof.

As still shown in FIG. 18A, in order to prevent the display device 100 from damage caused by electrostatic discharge during the fabrication of the display device, the first conductive block 202 can have a length L1 between 10 and 10000 μm, and the second conductive block 204 can have a length L2 between 10 and 10000 μm. In addition, any two adjacent first conductive blocks 202 are separated by a distance D3, any two adjacent second conductive blocks 204 are separated by a distance D4, and any two adjacent first and second conductive blocks 202 and 204 are separated by a distance D5. In particular, the distance D3 is from 16 to 100 μm, the distance D4 is from 16 to 100 μm, and the distance D5 is from 3 to 40 μm.

Figure 18B:
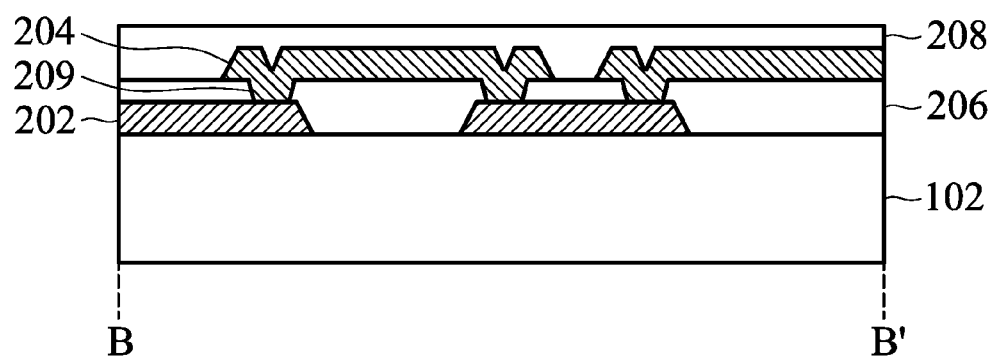
FIGS. 18B and 18C are cross-sectional views of the display devices according to some embodiments of the disclosure along line B-B' of FIG. 17.

According to another embodiment of the disclosure, any two adjacent first conductive blocks 202 can be electrically connected to each other via the second conductive block 204 adjacent to the two adjacent first conductive blocks 202. As shown in FIG. 18B, the plurality of first conductive blocks 202 can be disposed on the substrate 102. The dielectric layer 206 can be disposed on the substrate 102 to cover the first conductive block 202. A plurality of third via holes 209 pass through the dielectric layer 206 exposing the first conductive block 202. The plurality of second conductive blocks 204 can be disposed on the dielectric layer 206 to fill into the third via hole 209, forcing the second conductive block 204 to overlap with the two first conductive block 202 adjacent to the second conductive block 204. Therefore, the first conductive blocks 202 and the second conductive blocks 204 can be electrically connected to each other in the absence of the conducting layer 210.

Figure 18C:
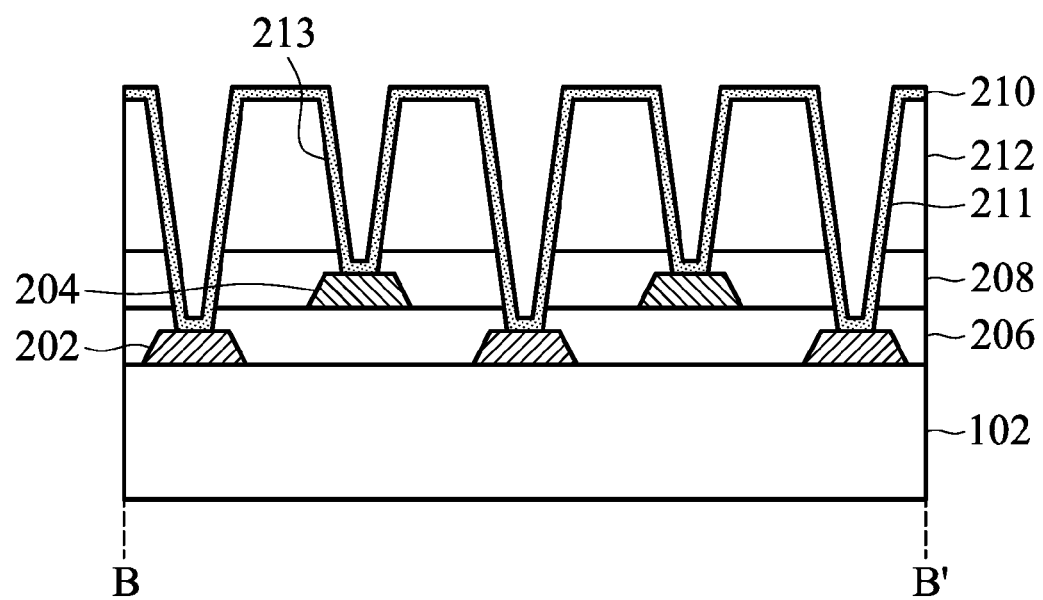

According to other embodiments of the disclosure, as shown in FIG. 18C, a planarization layer 212 can be further formed on the passivation layer 208. A plurality of fourth via holes 211 pass through the dielectric layer 206, the passivation layer 208, and the planarization layer 212, exposing the first conductive blocks 202. A plurality of fifth via holes 213 pass through the passivation layer 208 and the planarization layer 212, exposing the second conductive blocks 204. The conducting layer 210 can be formed on the planarization layer 212 to be filled into the fourth via hole 211 and the fifth via hole 213, resulting in the first conductive blocks 202 and the second conductive blocks 204 being electrically connected to each other via the conducting layer 210. In particular, the planarization layer 212 can be a layer with insulating properties, such as a dielectric material, or photosensitive resin.

Figure 19:
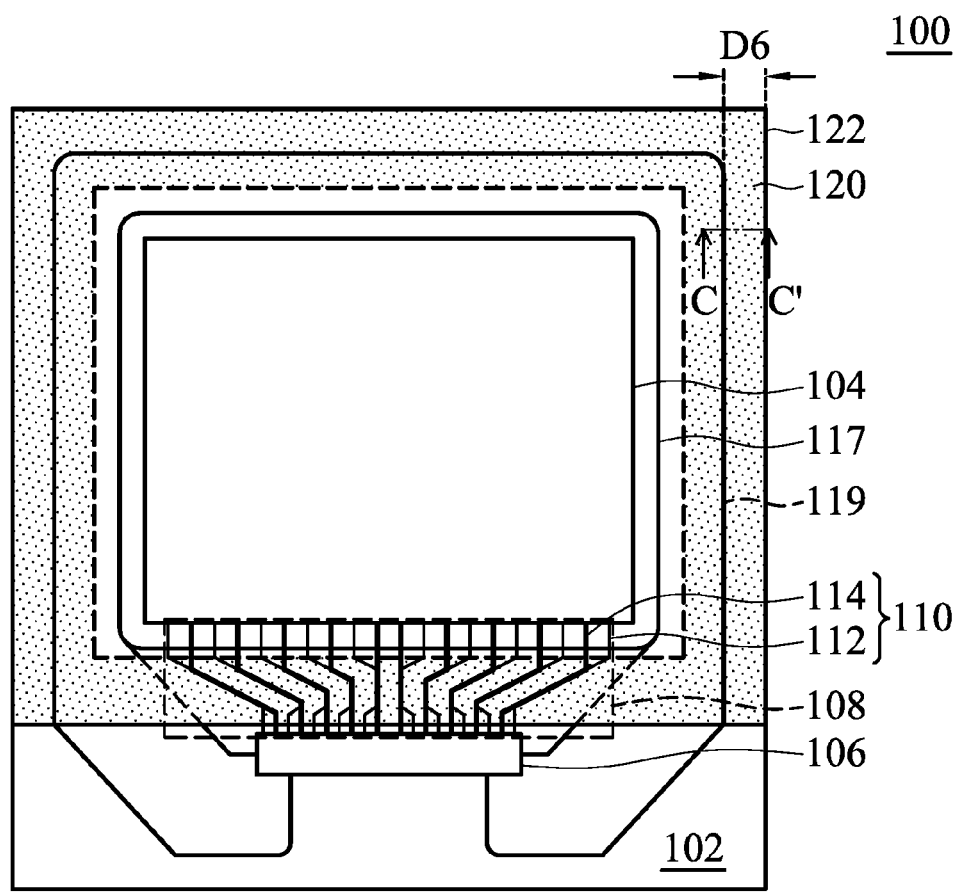
FIG. 19 is a top view of a display device according to still another embodiment of the disclosure.

FIG. 19 shows a top view of the display device 100 according to an embodiment of the disclosure. In addition to the display region 104, the driving unit 106, the fanout area 108, and the first conductive loop 117, the display device 100 can further include a second conductive loop 119. The second conductive loop 119 can be disposed on substrate 102 outside the display region 104 and the first conductive loop 117. As shown in FIG. 19, the second conductive loop 119 can be disposed on the substrate 102 to surround the display region 104 and connect to the driving unit 106. The second conductive loop 119 can serve as an electrostatic discharge (ESD) protection element, preventing the pixels within the display region 104 from damage caused by electrostatic discharge. In addition, a sealant 120 can be disposed on the substrate 102 to cover a part of the second conductive loop 119. In particular, a region defined by projecting the sealant 120 to the substrate 102 serves as a package region (not shown). The second conductive loop 119 within the package region is completely covered by the sealant 120.

The second conductive loop 119 can be single-layer or multilayer metal conductive material (such as aluminum (Al), copper (Cu), molybdenum (Mo), titanium (Ti), platinum (Pt), iridium (Ir), nickel (Ni), chromium (Cr), silver (Ag), gold (Au), tungsten (W), or an alloy thereof), metal-containing conductive material (such as aluminum-containing compound, copper-containing compound, molybdenum-containing compound, titanium-containing compound, platinum-containing compound, iridium-containing compound, nickel-containing compound, chromium-containing compound, silver-containing compound, gold-containing compound, tungsten-containing compound, magnesium-containing compound, or a combination thereof), or a combination thereof. According to an embodiment of the disclosure, the second conductive loop 119 can be formed simultaneously during the process for forming the first conductive blocks 202 and the second conductive blocks 204. In addition, the sealant can be a resin.

Figure 20:
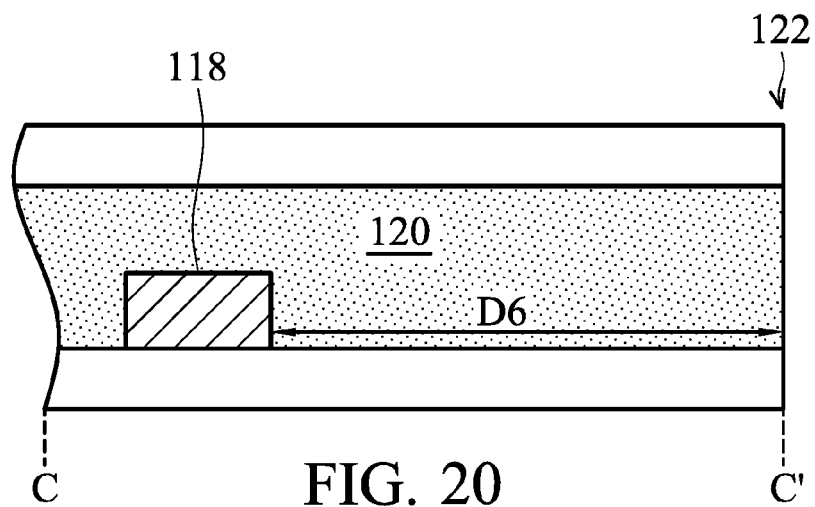
FIG. 20 is a cross-sectional view of the display device shown in FIG. 19 along line C-C'.

As shown in FIG. 19, the display device 100 has a peripheral boundary 122. In the package region, there is no distance between the sealant 120 and the peripheral boundary 122 (the horizontal distance between the sealant 120 and the peripheral boundary 122 is 0). FIG. 20 is a cross-sectional view of the display device 100 as shown in FIG. 19 along line C-C'. As shown in FIG. 20, the second conductive loop 119 and the peripheral boundary 122 are separated by a distance D6, and the sealant 120 is disposed on the second conductive loop 119 within the peripheral boundary 122. Namely, the space between the second conductive loop 119 and the peripheral boundary 122 is filled with the sealant 120. It should be noted that the distance D6 is from 50 to 300 μm in order to prevent the second conductive loop 119 from erosion and corrosion by moisture and air and achieve the electrostatic discharge (ESD) protection ability of the second conductive loop 119.

Figure 21:
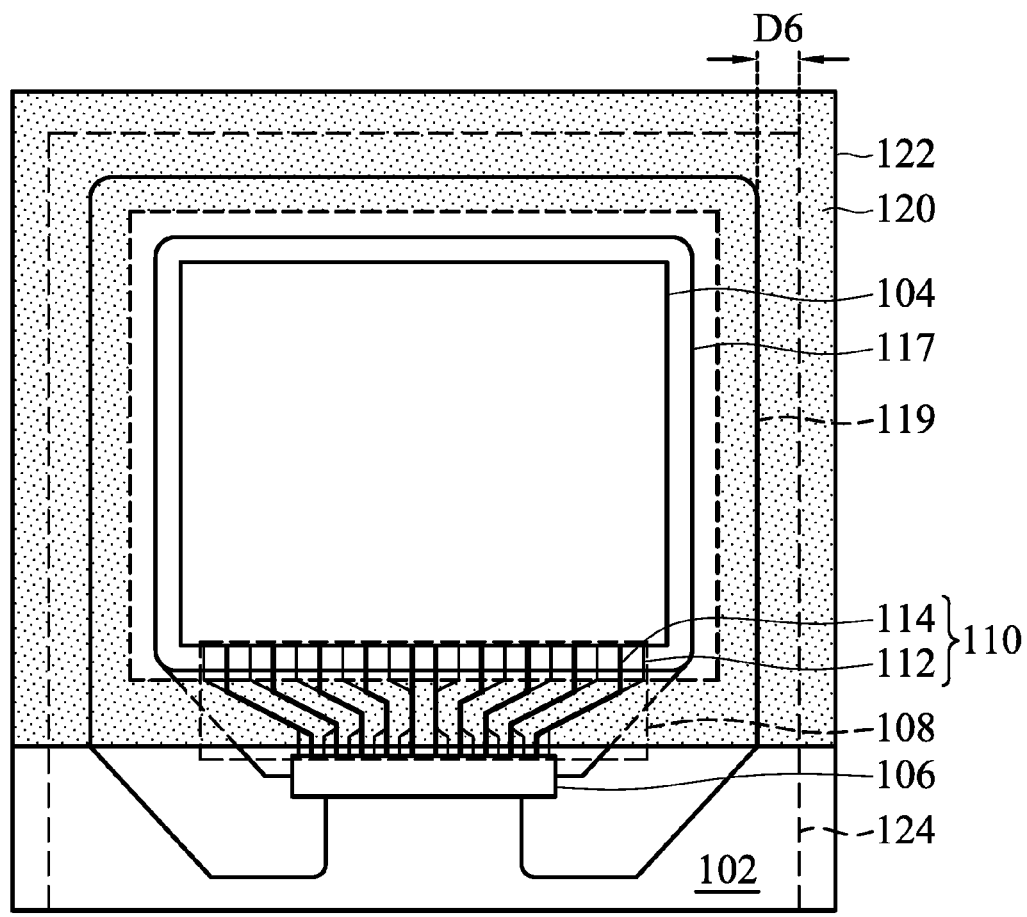
FIGS. 21 and 22 are top views of display device main substrates according to embodiments of the disclosure.

In order to ensure that the second conductive loop 119 is not be uncovered by the sealant 120 due to a processing error, a so-called "cutting-on-sealant process" is employed during the processes for fabricating the display device of the disclosure. FIG. 21 shows a schematic top view of a display device main substrate 201 according to an embodiment of the disclosure. The display device as shown in FIG. 19 can be obtained after cutting the display device main substrate 201 via a cutting process. As shown in FIG. 21, when forming the sealant 120 on the substrate 102, the sealant 120 is formed to cover the predetermined cutting line 124. Therefore, after performing the cutting process (using for example, a single-tool cutting process, a multi-tool cutting process, or a laser cutting process) along the predetermined cutting line 124, there is no distance between the peripheral boundary 122 and the sealant 120 of the obtained display device 100 (such as the display device 100 as shown in FIG. 19). Further, the second conductive loop 119 is separated from the peripheral boundary 122 by the distance D6. As shown in FIG. 21, the sealant 120 can be formed to contact the peripheral boundary 122.

Figure 22:
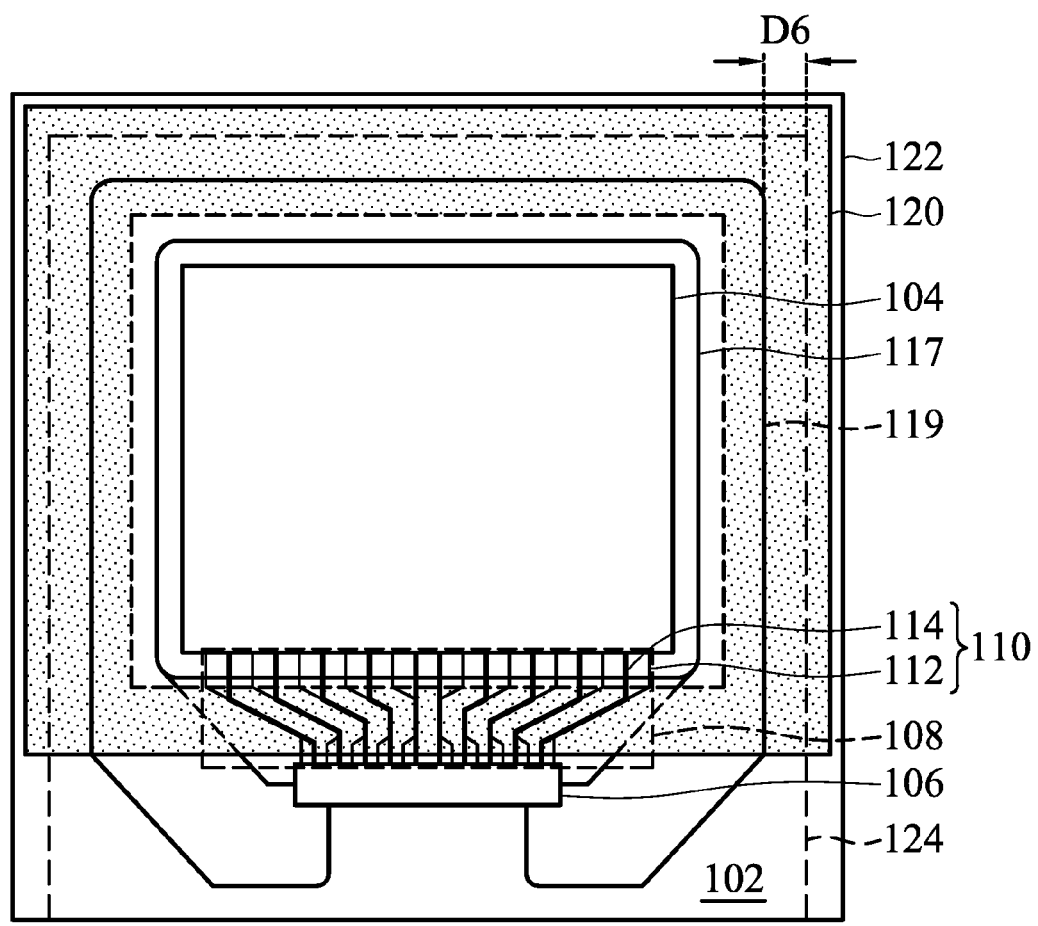

In addition, according to an embodiment of the disclosure, when forming the sealant 120 on the substrate 102, the sealant 120 can cover the predetermined cutting line 124 and not contact the peripheral boundary 122, as shown in FIG. 22. After performing the cutting process along the predetermined cutting line 124, the display device 100 as shown in FIG. 19 can be still obtained.

Accordingly, the area occupied by the fanout area of the display device of the disclosure can be lowered resulting from increasing the conductive line integration degree in the fanout area. Therefore, the display device can have a larger display region under the premise that the size of the display device is fixed. In addition, the display device of the disclosure can further include a first conductive loop outside the display region, wherein the first conductive loop includes a plurality of conductive blocks. Therefore, the first conductive loop can prevent the display device from damage caused by electrostatic discharge during the fabrication of the display device. Moreover, the display device of the disclosure can further include a second conductive loop outside the display region, wherein a sealant is disposed on the second conductive loop and within the peripheral boundary of the display device, in order to achieve high electrostatic discharge ability of the second conductive loop.

The embodiments of the present disclosure utilize a spacer wall disposed between the pixel-displaying region and the sealant to prevent the sealant from contacting the liquid-crystal material in the pixel-displaying region. Therefore, the distance between the sealant and the pixel-displaying region may be further reduced to narrow the non-display region of the display devices.

Figure 23A:
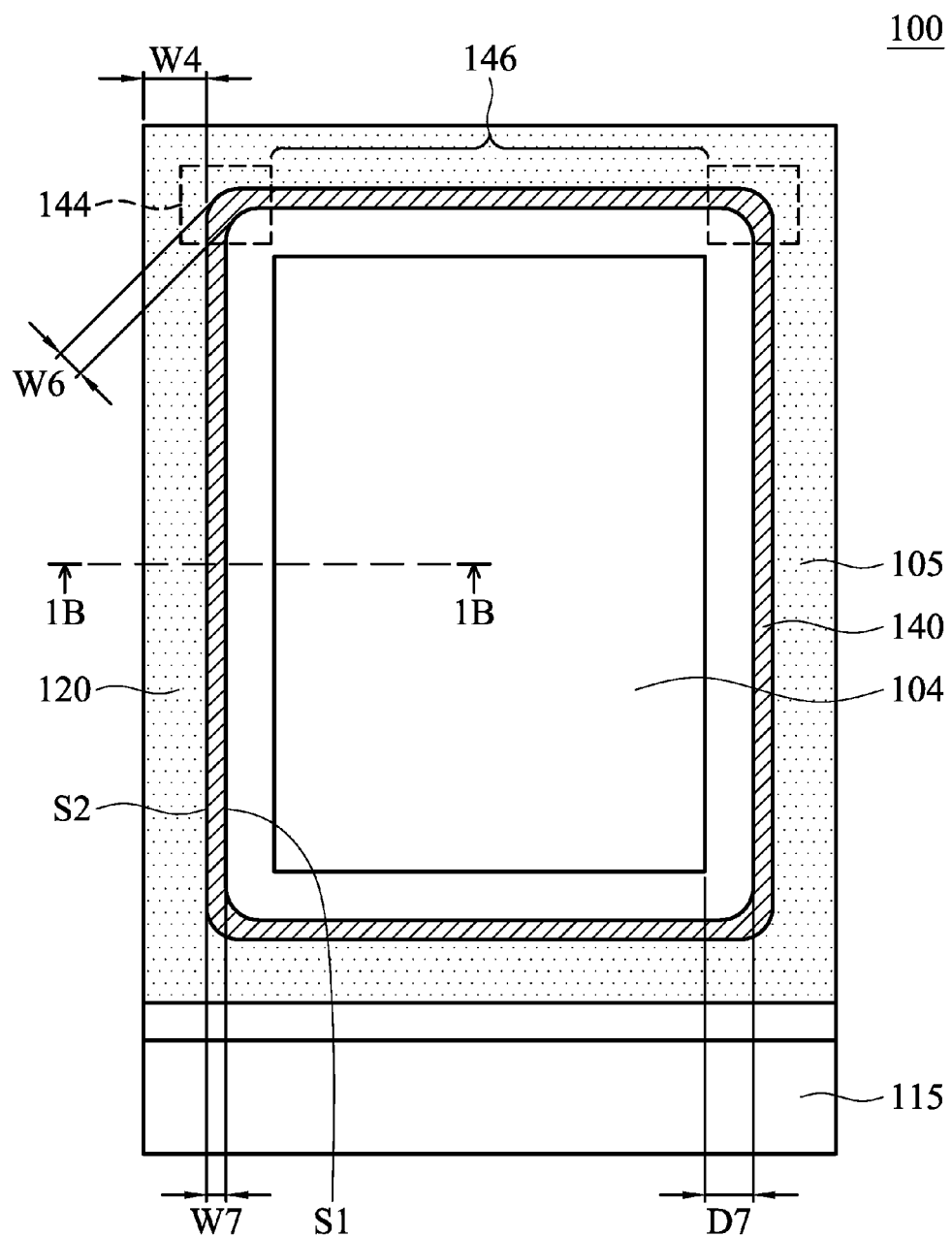
FIG. 23A is a top view of a display device in accordance with some embodiments of the present disclosure.
Figure 23B:
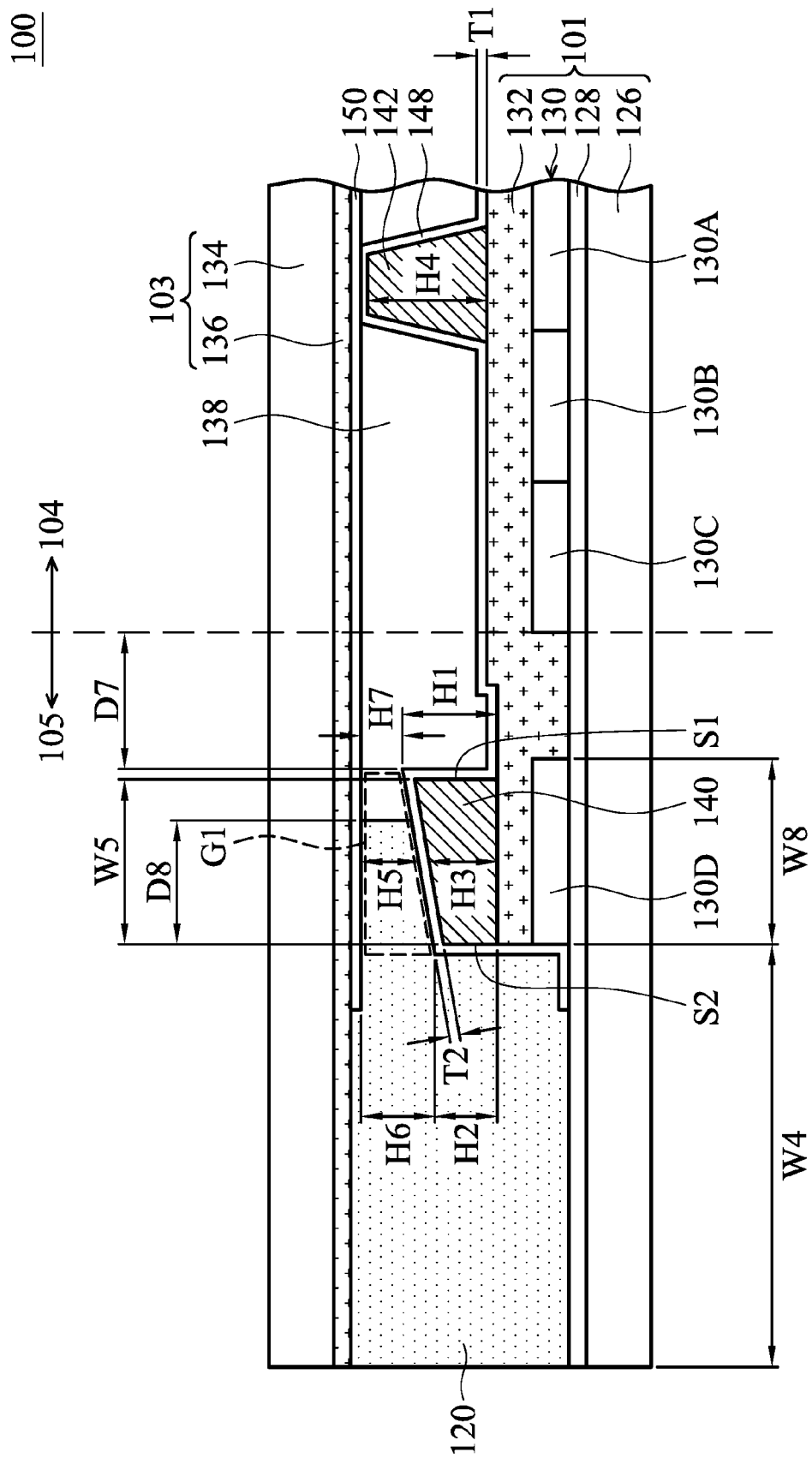
FIG. 23B is a cross-sectional view along line 1B-1B in FIG. 23A in accordance with some embodiments of the present disclosure.

First, referring to FIGS. 1A and 1B. FIG. 23A is a top view of a display device in accordance with some embodiments of the present disclosure, and FIG. 23B is a cross-sectional view along line 1B-1B in FIG. 23A in accordance with some embodiments of the present disclosure. As shown in FIG. 23A, the display device 100 includes a first substrate 101 and a second substrate 103 disposed opposite to the first substrate 101. In addition, as shown in FIGS. 1A and 1B, the display device 100 includes a pixel-displaying region 104 and a non-display region 105 adjacent to the pixel-displaying region 104. In other words, the first substrate 101 and the second substrate 103 may both be divided into a pixel-displaying region 104 and a non-display region 105 adjacent to the pixel-displaying region 104. In addition, the non-display region 105 may include an out lead bonding (OLB) region 115, as shown in FIG. 23A.

The display device 100 may include, but is not limited to, a liquid-crystal display such as a thin film transistor liquid-crystal display. Alternatively, the liquid-crystal display may include, but is not limited to, a twisted nematic (TN) liquid-crystal display, a super twisted nematic (STN) liquid-crystal display, a double layer super twisted nematic (DSTN) liquid-crystal display, a vertical alignment (VA) liquid-crystal display, an in-plane switching (IPS) liquid-crystal display, a cholesteric liquid-crystal display, a blue phase liquid-crystal display, or any other suitable liquid-crystal display.

Referring to FIG. 23B, the first substrate 101 includes a first transparent substrate 126, a light-shielding layer 128 disposed over the first transparent substrate 126 and a color filter layer 130 disposed over the light-shielding layer 128. In addition, the first substrate 101 may further include a planar layer 132 covering the color filter layer 130 and a portion of the light-shielding layer 128.

The first transparent substrate 126 may include, but is not limited to, a glass substrate, a ceramic substrate, a plastic substrate, or any other suitable transparent substrate. The light-shielding layer 128 is used to shield the non-display region 105 and the elements in the pixel-displaying region 104 other than the pixels. The light-shielding layer 128 may include, but is not limited to, black photoresist, black printing ink, black resin or any other suitable light-shielding materials of various colors. The color filter layer 130 may include color filter layers 130A, 130B and 130C disposed in the pixel-displaying region 104 and a color filter layer 130D disposed in the non-display region 105. Each of the color filter layers 130A, 130B and 130C may independently include a red color filter layer, a green color filter layer, a blue color filter layer, or any other suitable color filter layer. The material of the planar layer 132 may include, but is not limited to, organic silicon oxides photoresist, or inorganic materials such as silicon nitride, silicon oxide, silicon oxynitride (SiON), silicon carbide, aluminum oxide, hafnium oxide, or a multi-layered structure of the above materials.

Still referring to FIG. 23B, the second substrate 103 includes a second transparent substrate 134. The material of the second transparent substrate 134 may include the aforementioned material of the first transparent substrate 126. The material of the first transparent substrate 126 may be the same as or different from that of the second transparent substrate 134. In addition, a transistor such as a thin film transistor (not shown) is disposed in or over the second transparent substrate 134. This transistor is used to control the pixels. The second substrate 103 may further include an insulating layer 136 which covers the second transparent substrate 134 and the transistor. The insulating layer 136 is used to electrically isolate the second substrate 103 from the elements disposed between the first substrate 101 and the second substrate 103. The material of the insulating layer 136 may include, but is not limited to, silicon oxide, silicon nitride, silicon oxynitride, a combination thereof, or any other suitable material.

Still referring to FIGS. 1A and 1B, the display device 100 further includes a sealant 120 and liquid-crystal material 138 disposed between the first substrate 101 and the second substrate 103. The sealant 120 is used to seal the liquid-crystal material 138 between the first substrate 101 and the second substrate 103. The material of the sealant 120 may include, but is not limited to, insulating transparent resin or any other suitable sealant material. The material of the liquid-crystal material 138 may include, but is not limited to, nematic liquid crystal, smectic liquid crystal, cholesteric liquid crystal, blue phase liquid crystal, or any other suitable liquid-crystal material.

As shown in FIGS. 1A and 1B, the sealant 120 is disposed outside the pixel-displaying region 104. In other words, the sealant 120 is disposed in the non-display region 105. In some embodiments, the sealant 120 may surround or enclose the pixel-displaying region 104. In addition, the width W4 of the sealant 120 ranges from about 200 μm to 900 μm, for example from about 500 μm to 800 μm. It should be noted that, if the width W4 of the sealant 120 is too great, for example greater than 900 µm, the non-display region 105 of the display device 100 would be too wide, which in turn hinders the display device 100 from being thinner, lighter, smaller and more fashionable than the last. However, if the width W4 of the sealant 120 is too small, for example smaller than 200 µm, portions of the sealant 120 may break and it will not effectively seal the liquid-crystal material 138.

Still referring to FIGS. 1A and 1B, the display device 100 further includes a spacer wall 140 disposed between the first substrate 101 and the second substrate 103. The spacer wall 140 is also disposed between the pixel-displaying region 104 and the sealant 120 to further prevent the sealant 120 from contacting the liquid-crystal material 138 in the pixel-displaying region 104. In addition, the spacer wall 140 has a first side S1 which is adjacent to the pixel-displaying region 104 and a second side S2 which is adjacent to the sealant 120. The height H1 of the first side S1 is greater than the height H2 of the second side S2. For example, as shown in the figure, the height of the spacer wall 140 gradually decreases from H1 at side S1 (side adjacent to the pixel-displaying region 104) to H2 at side S2 (side adjacent to the sealant 120). It should be noted that, although the spacer wall 140 is disposed over the planar layer 132 of the first substrate 101 in the embodiment shown in FIGS. 1A and 1B, the spacer wall 140 may disposed over the second substrate 103 in other embodiments. This will be described in detail in the following description. In addition, although the spacer wall 140 completely surrounds or encloses the pixel-displaying region 104 in the embodiment shown in FIG. 23A, those skilled in the art will appreciate that the display device 100 may include not only one spacer wall 140 but also a plurality of spacer walls. In addition, the spacer wall 140 may partially surround or enclose the pixel-displaying region 104. Therefore, the inventive concept may be embodied in various forms without being limited to the exemplary embodiments as shown in FIG. 23A.

In addition, the material of the spacer wall 140 may include, but is not limited to, a resist such as a positive resist or a negative resist. The spacer wall 140 may be formed by photolithography and etching steps. In one embodiment, the photolithography steps may include resist patterning. The resist patterning may include steps such as resist coating, soft baking, mask alignment, pattern exposure, post-exposure baking, resist developing and hard baking. The etching step may include reactive ion etch (RIE), plasma etch, or any other suitable etching step.

Referring to FIG. 23B, the spacer wall 140 (or the first alignment layer 148 subsequently disposed over the top surface of the spacer wall 140) does not directly contact the second substrate 103. Therefore, the display device 100 includes a first gap G1 between the spacer wall 140 (or the first alignment layer 148 subsequently disposed over the top surface of the spacer wall 140) and the second substrate 103. The height H5 of the first gap G1 may range from about 0.1 µm to 1.5 µm, for example from about 0.3 µm to 0.8 µm. The height H5 of the first gap G1 refers to the average value of the maximum distance H6 and the minimum distance H7 calculated from the second alignment layer 150 to the top surface of the spacer wall 140 (or the first alignment layer 148 subsequently disposed over the top surface of the spacer wall 140). In other words, H5=(H6+H7)/2. In addition, the sealant 120 may directly contact the spacer wall 140, and portions of the sealant 120 may further extend from the second side S2 to the first side S1 by a distance D8. The distance D8 may range from about 20% to 90% of the width W5 of the spacer wall 140, for example from about 40%-70%. It should be noted that, if the distance D8 is too great, for example greater than 90% of the width W5 of the spacer wall 140, the sealant 120 may contact and contaminate the liquid-crystal material 138 in the pixel-displaying region 104, which in turn increases the risk of defects and lowers the yield. In addition, if the height H5 of the first gap G1 is too large, for example larger than 1.5 µm, the spacer wall 140 cannot effectively prevent the sealant 120 from extending into the pixel-displaying region 104 through the first gap G1, and the height difference between the spacer wall 140 and the main spacer 142 is too large, the sealant 120 may contact and contaminate the liquid-crystal material 138 in the pixel-displaying region 104, which in turn results in mura such as frame mura in the display device 100. However, if the height H5 of the first gap G1 is too small, for example smaller than 0.1 µm, the top surface of the spacer wall 140 would be too close to the second substrate 103 such that the sealant 120 extending into the first gap G1 may push the second substrate 103 away from the first substrate 101, which in turn results in mura such as gap mura in the display device 100 and lower the yield.

Since the spacer wall 140 may prevent the sealant 120 from contacting the liquid-crystal material 138 in the pixel-displaying region 104, the distance between the sealant 120 and the pixel-displaying region 104 may be further reduced to narrow the non-display region 105 of the display device 100 and make the display device 100 thinner, lighter, smaller and more fashionable than the last. In addition, since the height H1 of the first side S1 of the spacer wall 140 is greater than the height H2 of the second side S2, even though the sealant 120 extends into the first gap G1 between the spacer wall 140 and the second substrate 103, the higher height H1 of the first side S1 may prevent the sealant 120 from extending into the pixel-displaying region 104 through the first gap G1 and thus prevent the sealant 120 from contacting the liquid-crystal material 138 in the pixel-displaying region 104 and resulting in defects in the display device 100. As shown in FIG. 1B, without considering the portion of the sealant 120 extending into the first gap G1, the distance between the sealant 120 and the pixel-displaying region 104 is the total distance of the width W5 of the spacer wall 140, the thickness T1 of the first alignment layer 148 disposed over the two sides S1 and S2 of the spacer wall 140 and the distance D7 between the first side S1 of the spacer wall 140 and the pixel-displaying region 104. In other words, the distance between the sealant 120 and the pixel-displaying region 104 is W5+2×T1+D7.

The height difference between the height H1 of the first side S1 of the spacer wall 140 and the height H2 of the second side S2 may range from about 0.01 µm to 0.3 µm, for example from about 0.05 µm to 0.1 µm. It should be noted that, if the height difference between the first side S1 and the second side S2 is too great, for example greater than 0.3 µm, the height H2 of the second side S2 would be too low and the spacer wall 140 cannot effectively prevent the sealant 120 from contacting the liquid-crystal material 138 in the pixel-displaying region 104. However, if the height difference is too small, for example smaller than 0.01 µm, the spacer wall 140 cannot utilize the height difference between the first side S1 and the second side S2 to prevent the sealant 120 from extending into the pixel-displaying region 104 through the first gap G1

Still referring to FIG. 23B, the width W5 of the spacer wall 140 may range from about 10 µm to 200 µm, for example from about 60 µm to 110 µm. It should be noted that, if the width W5 of the spacer wall 140 is too large, for example larger than 200 µm, the non-display region 105 of the display device 100 would be too broad, which in turn hinders the display device 100 from being thinner, lighter, smaller and more fashionable than the last. However, if the width W5 of the spacer wall 140 is too small, for example smaller than 10 μm, the spacer wall 140 cannot effectively prevent the sealant 120 from contacting the liquid-crystal material 138 in the pixel-displaying region 104.

In addition, the distance D7 between the first side S1 of the spacer wall 140 and the pixel-displaying region 104 may range from about 20 μm to 200 μm, for example from about 50 μm to 100 μm. It should be noted that, if the distance D7 is too large, for example larger than 200 μm, the non-display region 105 of the display device 100 would be too broad, which in turn hinders the display device 100 from being thinner, lighter, smaller and more fashionable than the last. However, if the distance D7 is too small, for example smaller than 20 μm, the sealant 120 may contact the liquid-crystal material 138 in the pixel-displaying region 104, which in turn increase the risk of defects and lower the yield.

In addition, the height H3 of the spacer wall 140 may be adjusted by altering the distance D7 between the first side S1 of the spacer wall 140 and the pixel-displaying region 104. In particular, the lower the distance D7, the lower the reflow effect of the spacer wall 140 and the spacer wall 140 may have a greater height. On the other hand, the greater the distance D7, the greater the reflow effect of the spacer wall 140 and the spacer wall 140 may have a lower height. Therefore, by altering the distance D7, the height difference between the main spacer 142 and the spacer wall 140 (namely H4-H3) may be adjusted to fall in the preferable range mentioned below (namely about 0.1 μm to 1.5 μm).

Still referring to FIG. 23B, the display device 100 further includes a main spacer 142 disposed between the first substrate 101 and second substrate 103. The main spacer 142 is disposed inside the pixel-displaying region 104. The main spacer 142 and the spacer wall 140 may be formed by the same photolithography and etching steps. However, the main spacer 142 may be formed by other photolithography and etching steps.

In addition, the height H4 of the main spacer 142 is greater than the height H3 of the spacer wall 140. The height H3 of the spacer wall 140 refers to the average value of the height H1 of the first side S1 of the spacer wall 140 and the height H2 of the second side S2 of the spacer wall 140. In other words, H3=(H1+H2)/2. In some embodiments, the height H4 of the main spacer 142 is greater than the height H3 of the spacer wall 140 by a height difference ranging from about 0.1 μm to 1.5 μm, for example from about 0.3 μm to 0.8 μm. It should be noted that, if the height difference between the main spacer 142 and the spacer wall 140 is too large, for example larger than 1.5 μm, mura such as frame mura would be resulted in the display device 100. However, if the height difference between the main spacer 142 and the spacer wall 140 is too small, for example smaller than 0.1 μm, the top surface of the spacer wall 140 would be too close to the second substrate 103 such that the sealant 120 extending into the first gap G1 may push the second substrate 103 away from the first substrate 101, which in turn results in mura such as gap mura in the display device 100 and lower the yield.

Referring back to FIG. 23A, the spacer wall 140 includes a corner region 144 and a longitudinal region 146. The width W6 of the corner region 144 is different from the width W7 of the longitudinal region 146. For example, in the embodiment shown in FIG. 23A, the width W6 of the corner region 144 is greater than the width W7 of the longitudinal region 146.

Figure 24:
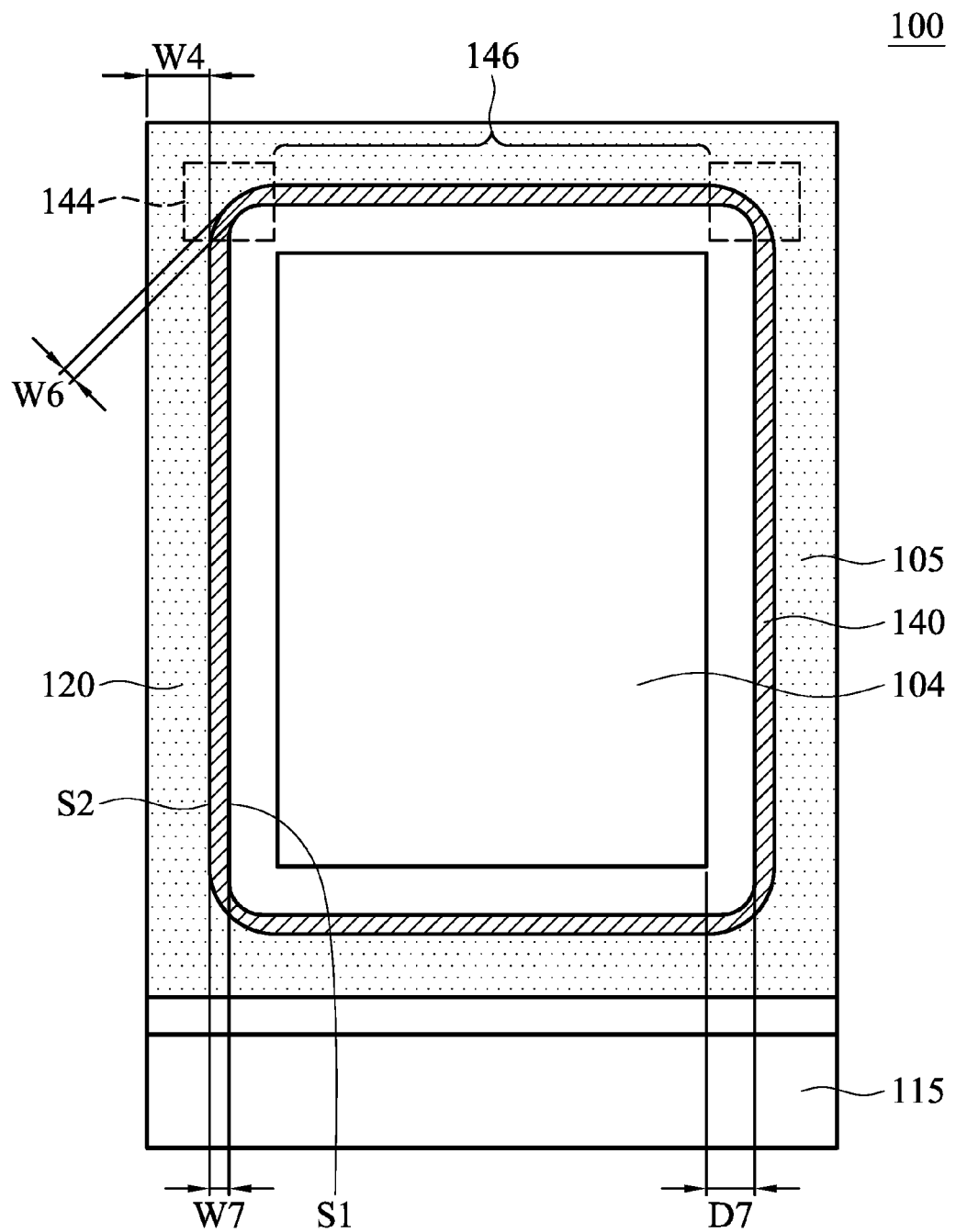
FIG. 24 is a top view of a display device in accordance with another embodiment of the present disclosure.
Figure 25:
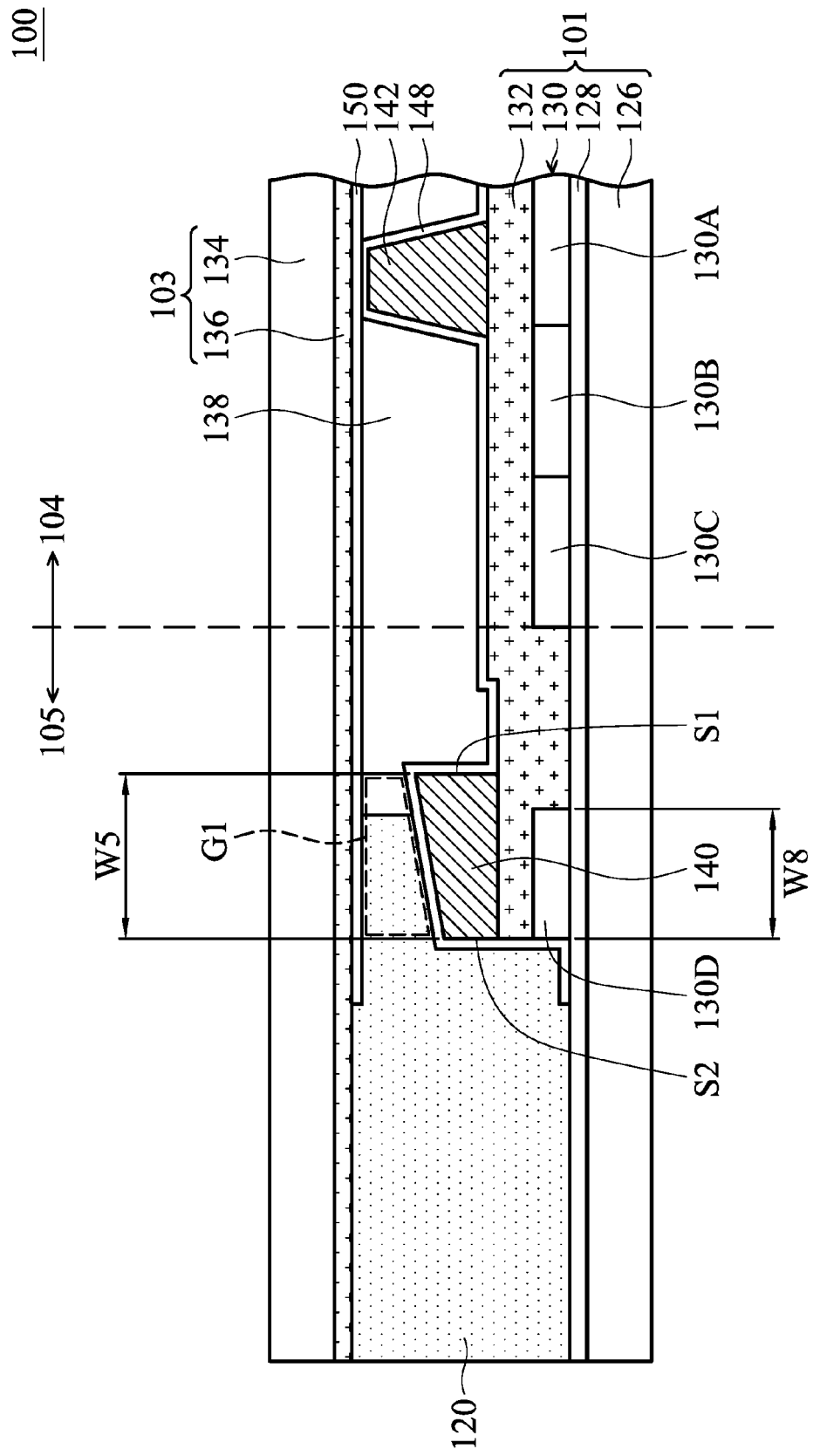
FIG. 25 is a cross-sectional view of a display device in accordance with another embodiment of the present disclosure.

However, the width of the corner region may be smaller than the width of the longitudinal region. Referring to FIG. 24, which is a top view of a display device in accordance with another embodiment of the present disclosure. The difference between the embodiment shown in FIG. 24 and the embodiment shown in FIG. 23A is that the width W6 of the corner region 144 is smaller than the width W7 of the longitudinal region 146. In addition, those skilled in the art will appreciate that the width of the corner region may be the same as the width of the longitudinal region. Therefore, the exemplary embodiments put forth in FIGS. 23A, 23B and 24 are merely for the purpose of illustration, and the inventive concept may be embodied in various forms without being limited to the exemplary embodiments as shown in FIGS. 23A, 23B and 24. Note that the same or similar elements or layers corresponding to those of the display device are denoted by like reference numerals. The same or similar elements or layers denoted by like reference numerals have the same or similar materials, manufacturing processes and functions. These will not be repeated for the sake of brevity.

Referring back to FIG. 23B, the display device 100 may further include a first alignment layer 148 disposed over the planar layer 132 and covering the spacer wall 140 and the main spacer 142. The display device 100 may further include a second alignment layer 150 disposed over the insulating layer 136. The first alignment layer 148 and the second alignment layer 150 are layers used to induce the liquid-crystal molecules to align with specific direction. The materials of each of the first alignment layer 148 and second alignment layer 150 may independently include, but are not limited to, polyimide, or any other suitable alignment material. In addition, the first alignment layer 148 disposed over the top surface of the main spacer 142 may directly contact the second alignment layer 150. The thickness of the first alignment layer 148 may range from about 300 Å to 1000 Å, for example from about 400 Å to 700 Å. The thickness T1 of the first alignment layer 148 over the planar layer 132 is greater than or equal to the thickness T2 of the first alignment layer 148 over the spacer wall 140.

Still referring to FIG. 23B, as mentioned above, the color filter layer 130 of the first substrate 101 may include the first color filter layer 130D disposed in the non-display region 105. The first color filter layer 130D is disposed under the spacer wall 140 and corresponds to the spacer wall 140. In addition, as shown in FIG. 23B, the width W8 of the first color filter layer 130D is greater than the width W5 of the spacer wall 140. However, it should be noted that the width of the first color filter layer may also be smaller than the width of the spacer wall. For example, in the embodiment shown in FIG. 25, the width W8 of the first color filter layer 130D is smaller than the width W5 of the spacer wall 140. In addition, those skilled in the art will appreciate that the width of the first color filter layer may equal to the width of the spacer wall. Therefore, the exemplary embodiments set forth in FIGS. 23A, 23B, 24 and 25 are merely for the purpose of illustration, and the inventive concept may be embodied in various forms without being limited to the exemplary embodiments as shown in FIGS. 23A, 23B, 24 and 25.

The height H3 of the spacer wall 140 may be adjusted by altering the width W8 of the first color filter layer 130D which is disposed under the spacer wall 140 and corresponds to the spacer wall 140. In particular, the smaller the width W8 of the first color filter layer 130D, the greater the reflow effect of the spacer wall 140 and the spacer wall 140 may have a lower height. On the other hand, the larger the width W8 of the first color filter layer 130D, the lower the reflow effect of the spacer wall 140 and the spacer wall 140 may have a greater height. Therefore, by altering the width W8 of the first color filter layer 130D, the height difference between the main spacer 142 and the spacer wall 140 (namely H4-H3) may be adjusted to fall in the preferred range mentioned above (namely about 0.1 μm to 1.5 μm).

Figure 26:
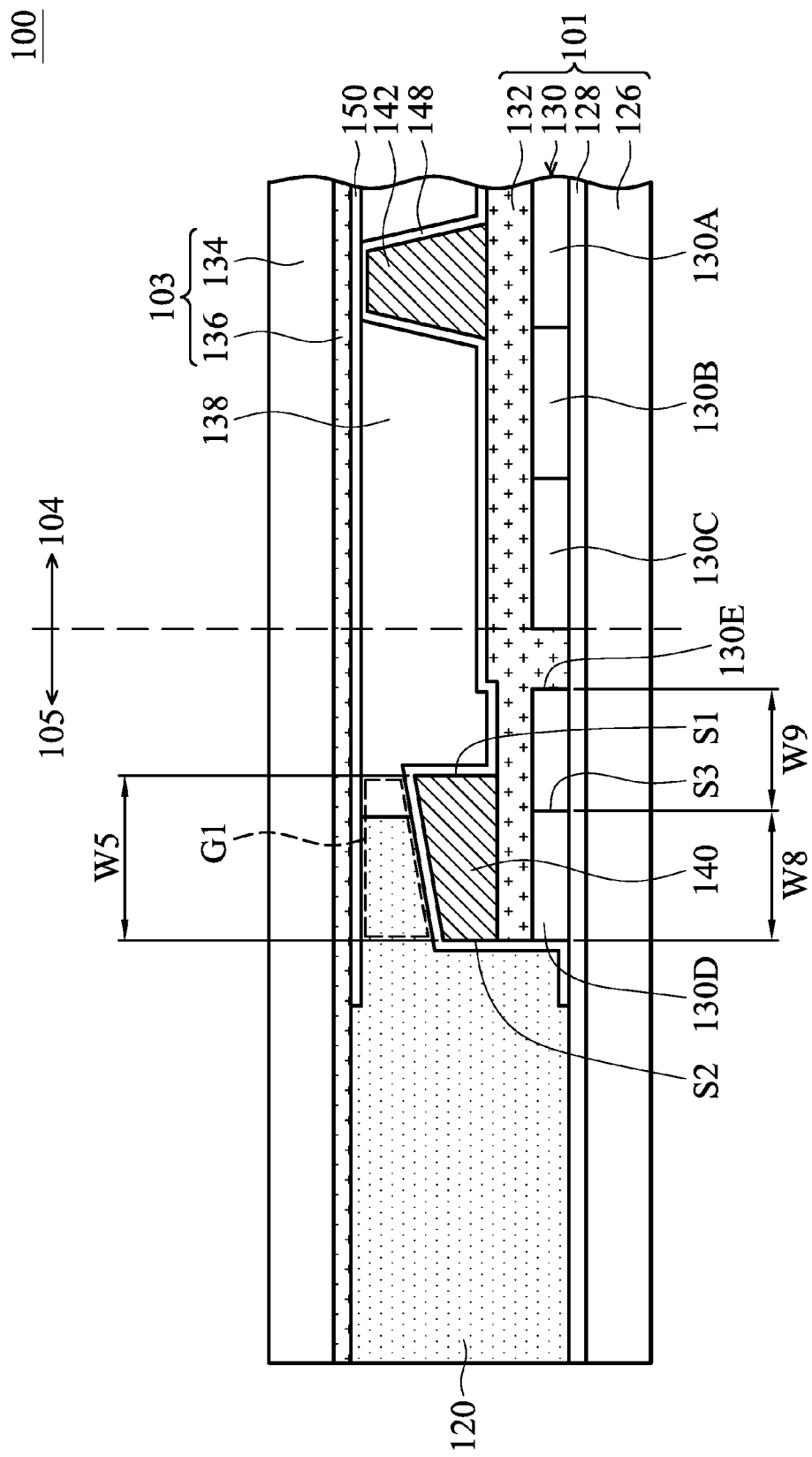
FIG. 26 is a cross-sectional view of a display device in accordance with another embodiment of the present disclosure.

In addition, referring to FIG. 26, which is a cross-sectional view of a display device in accordance with another embodiment of the present disclosure. The difference between the embodiment shown in FIG. 26 and the embodiments shown in FIGS. 1A-3 is that the color filter layer 130 of the first substrate 101 further includes a second color filter layer 130E which is disposed under the spacer wall 140 and corresponds to the spacer wall 140. The second color filter layer 130E is different from the first color filter layer 130D. The boundary S3 between the first color filter layer 130D and second color filter layer 130E is disposed under the spacer wall 140 and corresponds to the spacer wall 140. However, it should be noted that the boundary S3 between the first color filter layer 130D and second color filter layer 130E may also correspond to the first side S1 of the spacer wall 140 or the region outside the first side S1. Therefore, the exemplary embodiment set forth in FIG. 26 is merely for the purpose of illustration, the inventive concept may be embodied in various forms without being limited to the exemplary embodiments as shown in FIG. 26. In addition, similar to the first color filter layer 130D, the height H3 of the spacer wall 140 may be adjusted by altering the width W9 of the second color filter layer 130E which is disposed under the spacer wall 140 and corresponds to the spacer wall 140.

Figure 27:
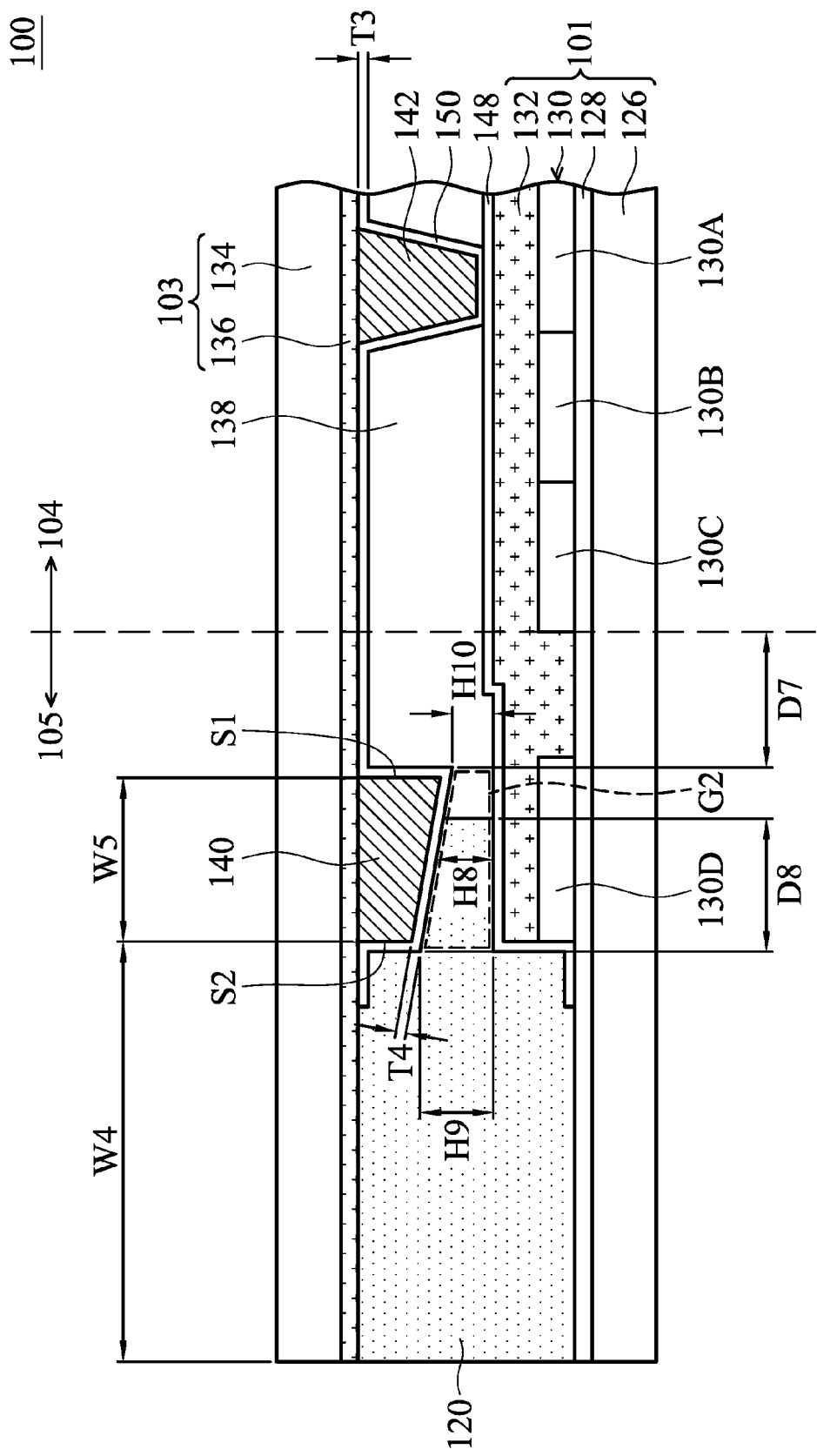
FIG. 27 is a cross-sectional view of a display device in accordance with another embodiment of the present disclosure.

FIG. 27 is a cross-sectional view of a display device in accordance with another embodiment of the present disclosure. The difference between the embodiment shown in FIG. 27 and the embodiments shown in FIGS. 23A-26 is that the spacer wall 140 is disposed over the insulating layer 136 of the second substrate 103, rather than being disposed over the planar layer 132 of the first substrate 101, as in the embodiments shown in FIGS. 23A-26. In addition, as shown in FIG. 27, the display device 100 may further include the second alignment layer 150 disposed over the insulating layer 136 and covering the spacer wall 140. The material of the second alignment layer 150 may be the same as the material of the first alignment layer 148. In addition, the second alignment layer 150 disposed over the top surface of the main spacer 142 may directly contact the first alignment layer 148. The thickness T3 of the second alignment layer 150 over the insulating layer 136 is greater than or equal to the thickness T4 of the second alignment layer 150 over the spacer wall 140.

In addition, the spacer wall 140 (or the second alignment layer 150 disposed over the top surface of the spacer wall 140) does not directly contact the first substrate 101. Therefore, the display device 100 includes a second gap G2 between the spacer wall 140 (or the second alignment layer 150 disposed over the top surface of the spacer wall 140) and the first substrate 101. The height H8 of the second gap G2 may range from about 0.1 μm to 1.5 μm, for example from about 0.3 μm to 0.8 μm. The height H8 of the second gap G2 refers to the average value of the maximum distance H9 and the minimum distance H10 calculated from the first alignment layer 148 to the top surface of the spacer wall 140 (or the second alignment layer 150 disposed over the top surface of the spacer wall 140). In other words, H8=(H9+H10)/2. It should be noted that, if the height H8 of the second gap G2 is too large, for example larger than 1.5 μm, the spacer wall 140 cannot effectively prevent the sealant 120 from extending into the pixel-displaying region 104 through the second gap G2, and the height difference between the spacer wall 140 and the main spacer 142 is too large, mura such as frame mura in the display device 100 would result. However, if the height H8 of the second gap G2 is too small, for example smaller than 0.1 μm, the top surface of the spacer wall 140 would be too close to the first substrate 101 such that the sealant 120 extending into the second gap G2 may push the first substrate 101 away from the second substrate 103, which in turn results in mura such as gap mura in the display device 100 and lower the yield.

In summary, since the spacer wall of the present disclosure may prevent the sealant from contacting the liquid-crystal material in the pixel-displaying region, the distance between the sealant and the pixel-displaying region may be reduced further to narrow the non-display region of the display devices and display device may be thinner, lighter, smaller and more fashionable than the last. In addition, since the side of the spacer wall adjacent to the pixel-displaying region has a greater height, even though the sealant extends into the gap, the sealant cannot extends into the pixel-displaying region, which in turn may further prevent the sealant from contacting the liquid-crystal material and resulting in defects in the display device.

According to embodiments of the disclosure, the display device has spacers disposed on the stable cutting region for increasing structural stability during a cutting process. Therefore, side walls of the substrates of the display device have specific cutting crack surfaces, resulting in improving the cutting and breaking performance and reducing the substrate breakage rate. As a result, the yield of the display device can be improved.

In addition, according to embodiments of the disclosure, the display device of the disclosure can further include a test circuit disposed along predetermined cutting lines. Therefore, after the cutting process, the test circuit can be used to detect whether cutting shift is occurring on the display device.

Figure 28:
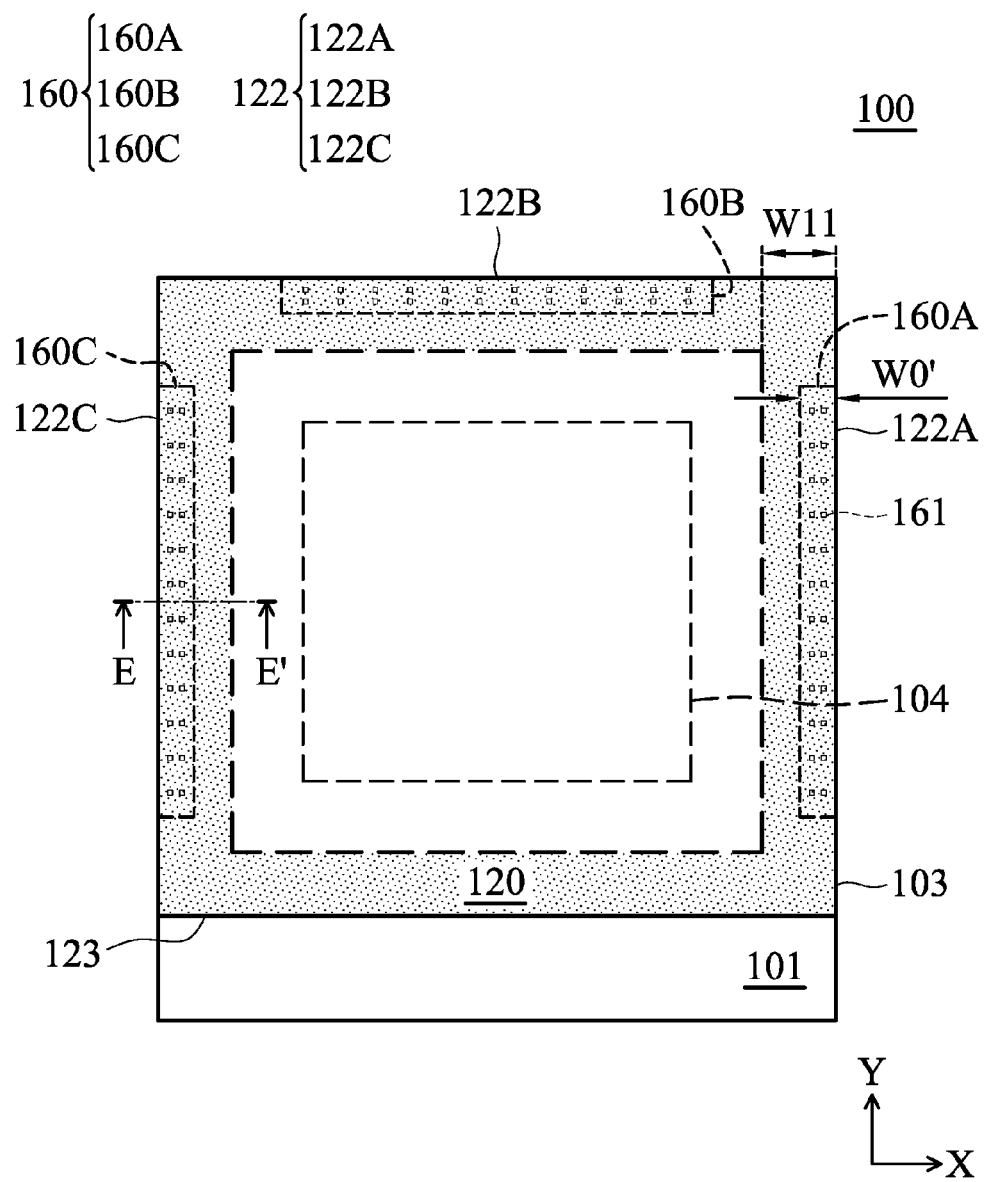
FIG. 28 is a top-view of a display device according to an embodiment of the disclosure.

FIG. 28 is a top-view of a display device according to an embodiment of the disclosure. The display device 100 includes a first substrate 101 and a second substrate 103, wherein the first substrate 101 is disposed opposite to the second substrate 103, and the first substrate 101 and the second substrate 103 are bonded together via a sealant 120. The first substrate 101 has a display region 104. The second substrate 103 has a stable cutting region 160, and the stable cutting region 160 corresponds to an area outside the display region 104 of the first substrate 101. Furthermore, the stable cutting region 160 is adjacent to the peripheral boundary 122 (including a first boundary 122A, a second boundary 122B, and a third boundary 122C) of the first substrate 101, on which a projection of the second substrate 103 is located. In addition, there is a substrate border 123 between the part of the first substrate 101 overlapped by the second substrate 103 and the part of the first substrate 101 not overlapped by the second substrate 103. The sealant 120 is disposed along the first boundary 122A, the second boundary 122B, the third boundary 122C, and the substrate border 123. Furthermore, the sealant 120 is disposed outside the display region 104.

The display device 100 can be a liquid-crystal display (such as a thin film transistor liquid-crystal display), or an organic light emitting device (such as an active organic light emitting device). The display region 104 can have a plurality of pixels (not shown). The first substrate 101 and the second substrate 103 can be quartz, glass, silicon, metal, plastic, or ceramic. Furthermore, the sealant 120 can be a resin.

According to an embodiment of the disclosure, there are a plurality of spacers 161 disposed within the stable cutting region 160. The sealant 120 can overlap a part of the spacers 161. For example, the sealant 120 overlaps five spacers 161, and others (five other spacers 161) are outside the sealant 120. In an embodiment of the disclosure, the sealant can cover all the spacers 161. For example, ten spacers are covered by the sealant. In other embodiments of the disclosure, at least part of the spacers are overlapped by the sealant and are adjacent to a liquid-crystal layer. For example, the sealant 120 overlaps five spacers 161, and each of the others is partially outside the sealant 120. The stable cutting region 160 can include a first stable region 160A, a second stable region 160B, and a third stable region 160C. The first stable region 160A, the second stable region 160B, and the third stable region 160C can be adjacent to the first boundary 122A, the second boundary 122B, and the third boundary 122C, respectively. It should be noted that, since there are a plurality of conductive lines (not shown) disposed across the substrate border 123 for electrically connecting the display region 104 to a driving element (such as an integrated circuit, not shown), the stable cutting region 160 is not disposed on the second substrate 103 along the substrate border 123. Namely, the stable cutting region 160 is not adjacent to the substrate border 123. In addition, the stable cutting region 160 is not in contact with four corners of the second substrate 103. Furthermore, any two of the first stable region 160A, the second stable region 160B, and the third stable region 160C do not contact each other, and alignment marks (not shown) for cutting can be disposed on the four angles of the second substrate 103. The spacers 161 can be made of a photoresist material, such as a positive photoresist material or a negative photoresist material. In one embodiment, the spacers can be formed by subjecting a photoresist layer to a patterning process. The patterning process can include the following steps: coating a photoresist layer, soft-baking, aligning mask, exposing, post-exposure baking, developing, and hard-baking.

According to an embodiment of the disclosure, the stable cutting region has a width between about 50 μm and 150 μm. The percentage ratio of the width W0' of the stable cutting region to the width W11 of the sealant can be between 6% and 50% (i.e. 6%≤W0'/W11≤50%). As shown in FIG. 28, the part of the stable cutting region 160, which is not occupied by the spacer 161, can be filled with the sealant 120.

Figure 29:
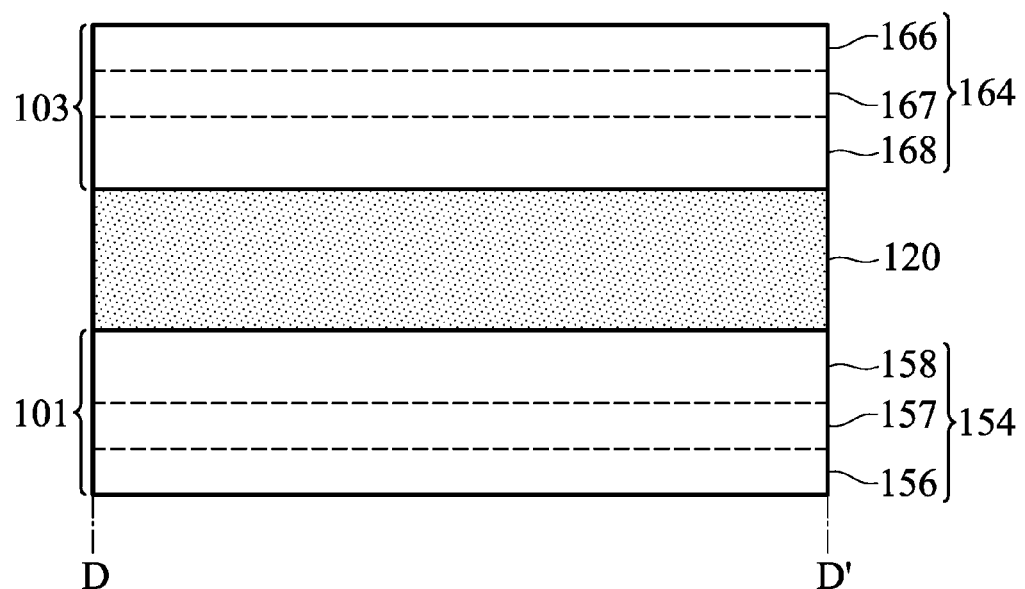
FIG. 29 is a schematic drawing of the display device of FIG. 28 in the X direction.

FIG. 29 is a schematic drawing of the display device of FIG. 28 in the X direction. According to embodiments of the disclosure, after cutting, the side walls of the first substrate 101 can have a first cutting crack surface 156, a first median crack surface 157, and a first pressure crack surface 158, wherein the first median crack surface 157 is disposed between the first cutting crack surface 156 and the first pressure crack surface 158. The first cutting crack surface 156 is a crack section formed by a cutter wheel and the first cutting crack surface 156 is disposed at a side of the first substrate far away from the sealant 120. The first median crack surface 157 is an extending section due to pressure from the cutter wheel. The first pressure crack surface 158 is a peeling section formed by external pressure during a peeling process. In an embodiment of the disclosure, if the side wall 154 has a relatively larger first median crack surface 157, the side wall 154 would merely have the first cutting crack surface 156 and the first median crack surface 157, and thus there is no first pressure crack surface 158 formed on the side wall 154. In particular, the roughness of the first cutting crack surface 156, the first median crack surface 157, and the first pressure crack surface 158 are different.

On the other hand, side walls 164 of the second substrate 103 can have a second cutting crack surface 166, a second median crack surface 167, and a second pressure crack surface 168, wherein the second median crack surface 167 is disposed between the second cutting crack surface 166 and the second pressure crack surface 168. The second cutting crack surface 166 is a crack section formed by a cutter wheel and the second cutting crack surface 166 is disposed at a side of the second substrate 103 far away from the sealant 120. The second median crack surface 167 is an extending section due to pressure from the cutter wheel. The second pressure crack surface 168 is a peeling section formed by external pressure during a peeling process. In an embodiment of the disclosure, if the side wall 154 has a relatively larger second median crack surface 167, the side wall 164 would merely have the second cutting crack surface 166 and the second median crack surface 167, and thus there is no second pressure crack surface 168 formed on the side wall 164. In particular, the roughness of the second cutting crack surface 166, the second median crack surface 167, and the second pressure crack surface 168 are different.

Figure 30A:
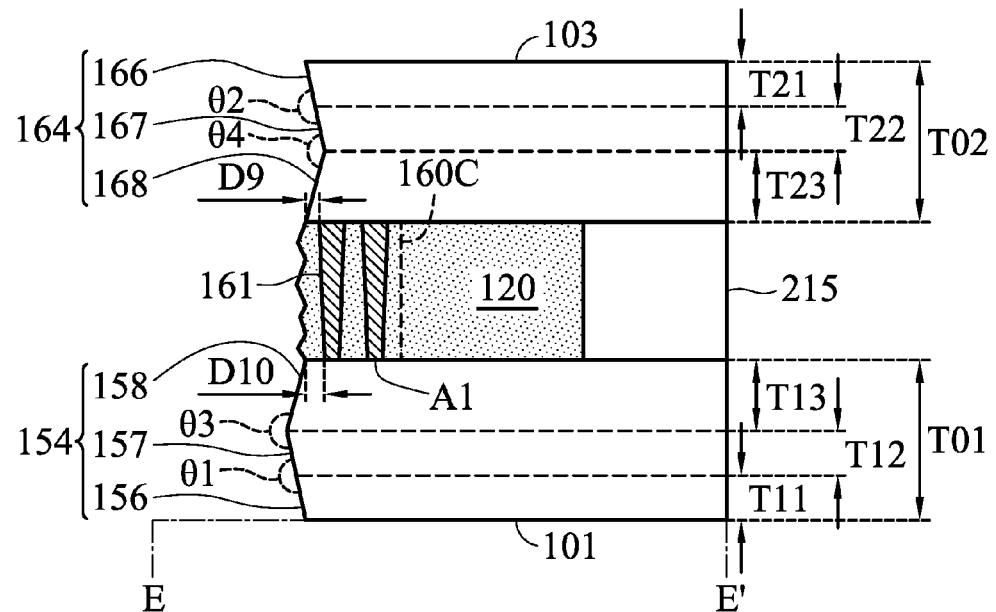
FIGS. 30A to 30D are cross-sectional views of the display devices of FIG. 28 along line E-E'.

As shown in FIG. 30A, since the display device of the disclosure 100 has a stable cutting region 160 in order to increase support function during cutting process, the ratio of the sum of the thickness T11 of the first cutting crack surface 156 and the thickness T12 of the first median crack surface 157 to the thickness T01 of the side wall 154 of the first substrate 101 is from 0.3 to 1 (i.e. 0.3 (T11+T12)/T01≤1), such as from 0.5 to 1, or from 0.7 to 1. Furthermore, the ratio of the sum of the thickness T21 of the second cutting crack surface 166 and the thickness T22 of the second median crack surface 167 to the thickness T02 of the side wall 164 of the second substrate 103 is from 0.3 to 1 (i.e. 0.3≤(T21+T22)/T02≤1), such as from 0.5 to 1, or from 0.7 to 1. As a result, the cutting and breaking performance of the display device can be improved, the substrate breakage rate can be reduced, and the yield of the display device can be increased. In addition, the first pressure crack surface 158 can have a thickness T13, and the second pressure crack surface 168 can have a thickness T23.

FIG. 30A is cross-sectional view of the display devices of FIG. 28 along line E-E'. The first cutting crack surface 156 and the first median crack surface 157 define a first angle θ1, wherein the first angle θ1 can be greater than 90 degrees and less than 270 degrees; the second cutting crack surface 166 and the second median crack surface 167 define a second angle θ2, wherein the second angle θ2 can be greater than 90 degrees and less than 270 degrees; the first median crack surface 157 and the first pressure crack surface 158 define a third angle θ3, wherein the third angle θ3 can be greater than 90 degrees and less than 270 degrees; and, the second median crack surface 167 and the second pressure crack surface 168 define a fourth angle θ4, wherein the fourth angle θ4 can be greater than 90 degrees and less than 270 degrees.

As shown in FIG. 30A, a person skilled in the art would know that the first substrate 101 and the second substrate 103 can optionally have other elements, and a display medium layer 215, ex. a liquid-crystal layer, can be disposed between the first substrate 101 and the second substrate 103. For example, the first substrate 101 can be an array substrate, and the second substrate 103 can be a color filter substrate. In the stable cutting region 160 (such as the third stable region 160C), there is a distance D9 between at least one of the spacers 161 and the side wall 164 of the second substrate 103. Namely, the distance D9 is the minimum distance between the side wall 164 of the second substrate 103 and the spacers 161. The distance D9 is from 0 to 200 µm. There is a distance D10 between at least one of the spacers 161 and the side wall 154 of the first substrate 101. Namely, the distance D10 is the minimum distance between the side wall 154 of the first substrate 101 and the spacers 161. In particular, the distance D10 is greater than the distance D9.

Figure 30B:
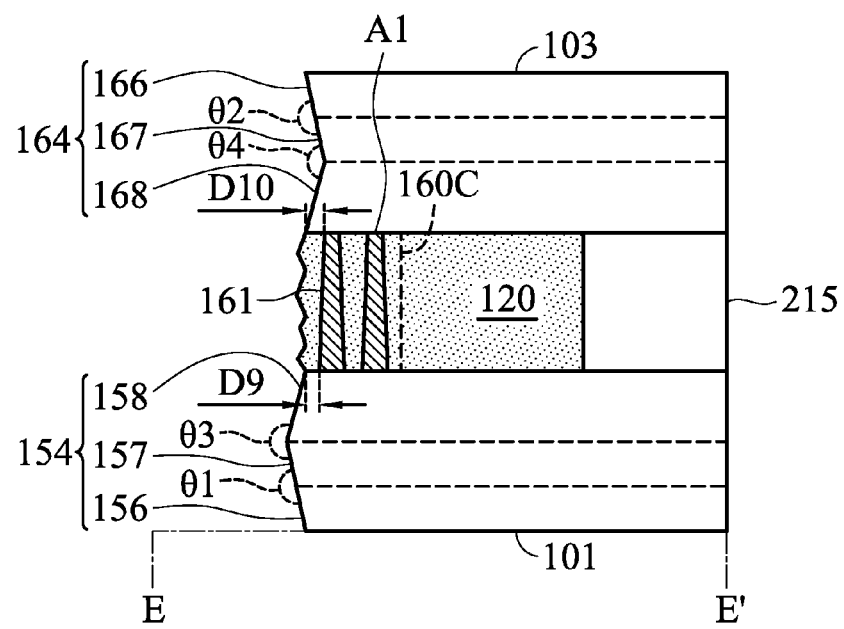
Figure 30C:
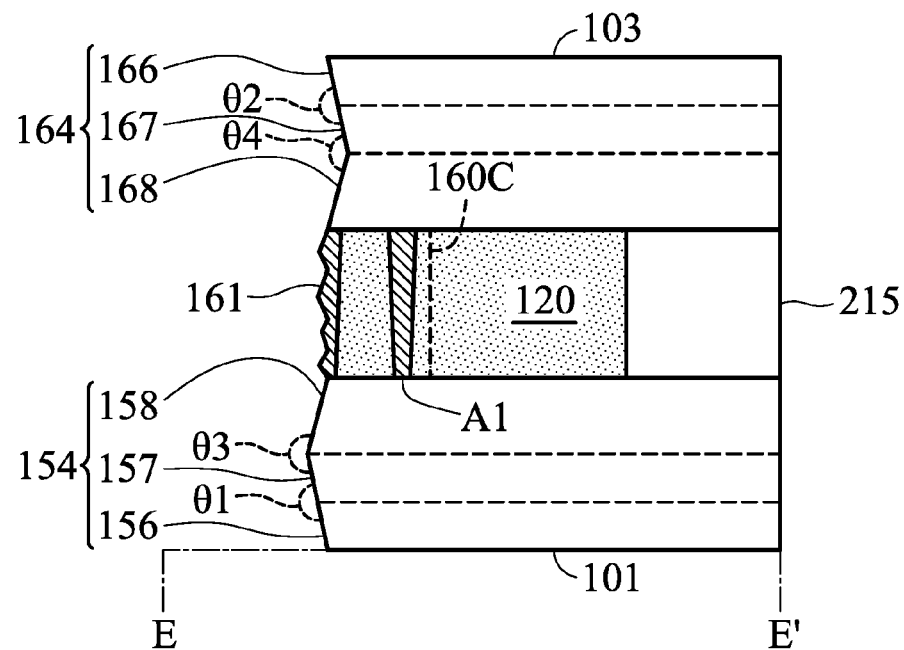
Figure 30D:
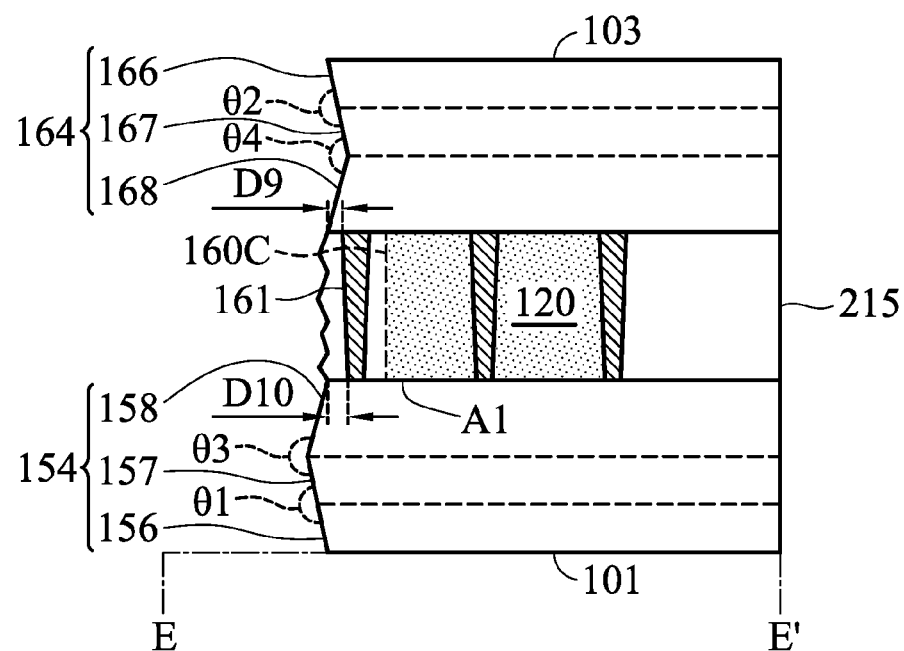

As shown in FIGS. 28 and 30A, the ratio between the area occupied by the spacers 161 and the stable cutting region is from 1% to 5%. Herein, the area occupied by the spacers 161 is the sum of a top surface area A1 of all the spacers 161. In an embodiment of the disclosure, the top surface of the spacer 161 is closer to the first substrate 101, in comparison with the second substrate 103. As shown in FIG. 30B, according to other embodiments of the disclosure, the spacer 161 can be disposed on the first substrate 101 (i.e. the top surface of the spacer 161 is closer to the second substrate 103, in comparison with the first substrate 101). According to embodiments of the disclosure, the plurality of spacers 161 can have the same or different top surface area A1. In addition, according to some embodiments of the disclosure, the spacer 161 within the stable cutting region 160 can be disposed across the predetermined cutting line resulting in remaining a part of the spacer 161 after cutting, as shown in FIG. 30C. According to other embodiments of the disclosure, the spacer 161 can be not overlapped by the sealant 120, as shown in FIG. 30D.

Figure 31:
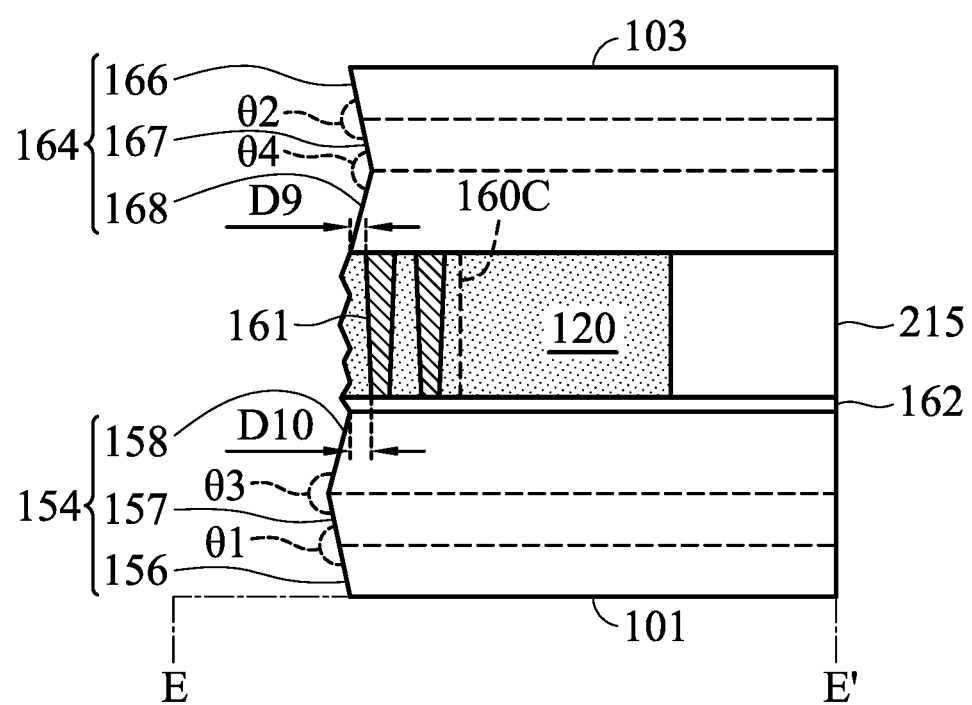
FIG. 31 is a cross-sectional view of the display device according to another embodiment of the disclosure along line E-E' of FIG. 28.

As shown in FIG. 31, according to another embodiment of the disclosure, a planarization layer 162 can be disposed on the first substrate 101 and within the stable cutting region 160. The part of the stable cutting region 160, which is not occupied by the spacer 161 and the planarization layer 162, can be filled with the sealant 120. The plurality of spacers 161 can be disposed between the planarization layer 162 and the second substrate 103. According to some embodiments of the disclosure, the planarization layer 162 can be a patterned layer or have trenches. At least part of the sealant 120 is separated from the first substrate 101 by the planarization layer 162 (the planarization layer 162 is disposed between the first substrate 101 and the sealant 120), and at least part of the second substrate 103 is separated from the planarization layer 162 by the spacers 161 (the spacers 161 are disposed between the second substrate 103 and the planarization layer 162). The planarization layer 162 can be a layer with insulating properties, such as a dielectric material, or photosensitive resin.

Figure 32:
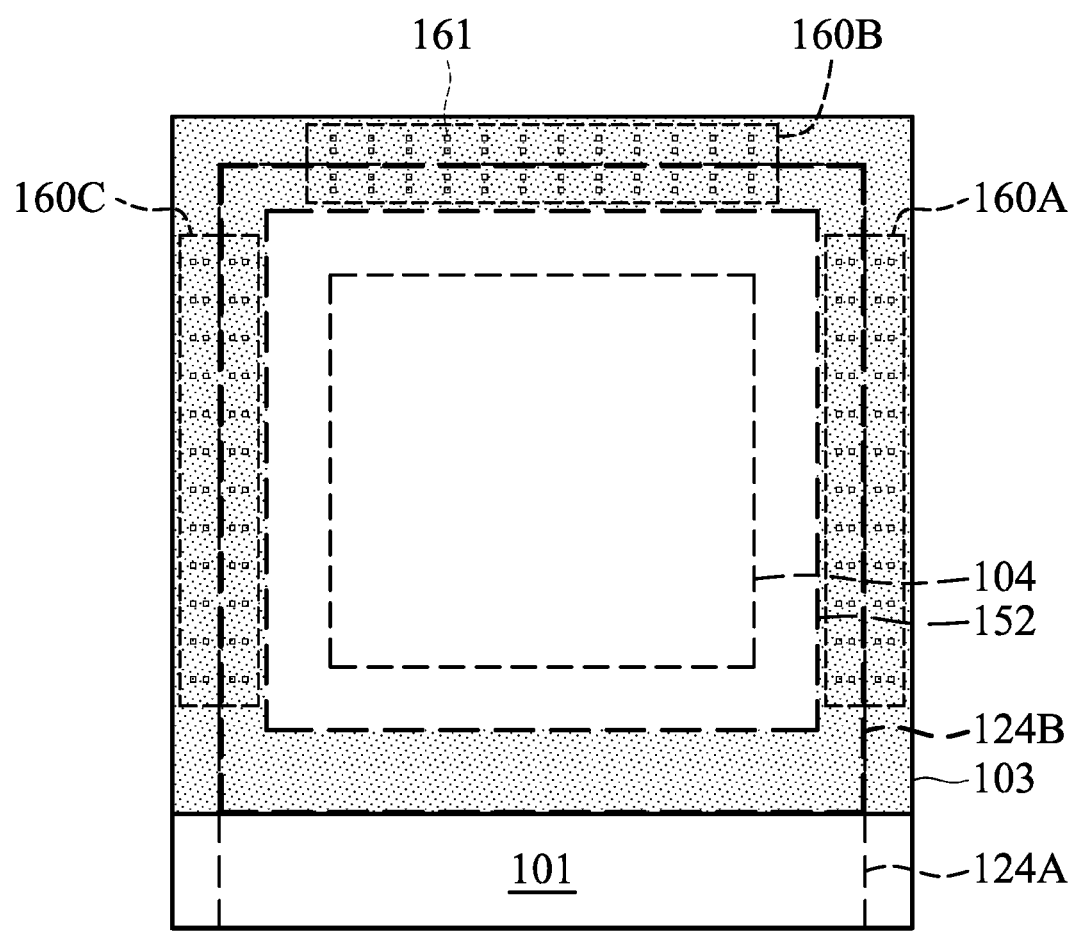
FIG. 32 is a top-view of a display device main substrate according to an embodiment of the disclosure, wherein the display device of FIG. 28 is obtained by cutting the display device main substrate of FIG. 32.

FIG. 32 is a top-view of a display device main substrate according to an embodiment of the disclosure, wherein the display device 100 of FIG. 28 can be obtained by cutting the display device main substrate of FIG. 32. The cutting process can be, for example, a single-tool cutting process, a multi-tool cutting process, or a laser cutting process.

As shown in FIG. 32, the stable cutting region 160 (including the first stable region 160A, the second stable region 160B, and the third stable region 160C) of the display device main substrate 201 is disposed along a predetermined cutting line 124A of the first substrate and a predetermined cutting line 124B of the second substrate. In an embodiment of the disclosure, the predetermined cutting line 124B of the second substrate constitutes a symmetrical axis for the stable cutting region 160 respectively. Namely, two parts of the stable cutting region 160 separated by the predetermined cutting line 124B of the second substrate have the same area and are substantially symmetrical. According to other embodiments of the disclosure, the predetermined cutting line 124B of the second substrate can constitute a non-symmetrical axis for the stable cutting region 160.

According to embodiments of the disclosure, the surface of the spacer 161 within the stable cutting region 160 in contact with the first substrate 101 (or the second substrate 103) can be circular, elliptical, square, rectangular, or a combination thereof. FIGS. 33A to 33F are close-up diagrams of the second stable region 160B of the display device main substrate of FIG. 32.

Figure 33A:
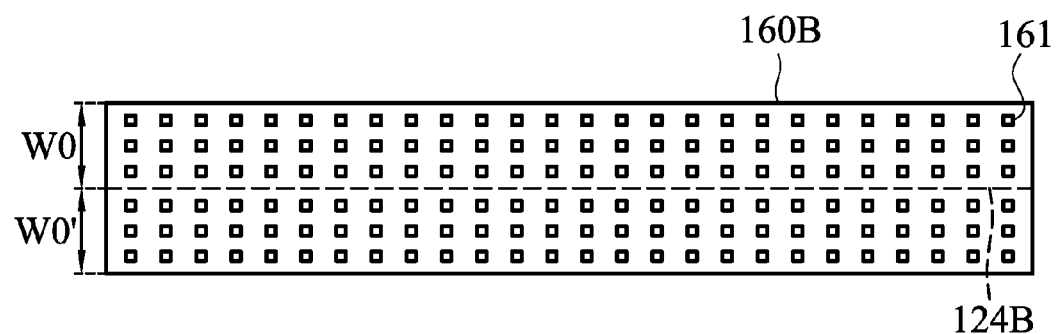
FIGS. 33A to 33F are close-up diagrams of the second stable region 160B of the display device main substrate of FIG. 32.
Figure 33B:
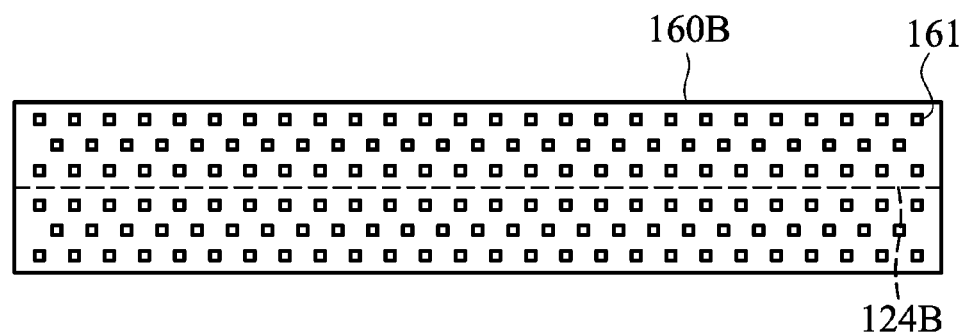
Figure 33C:
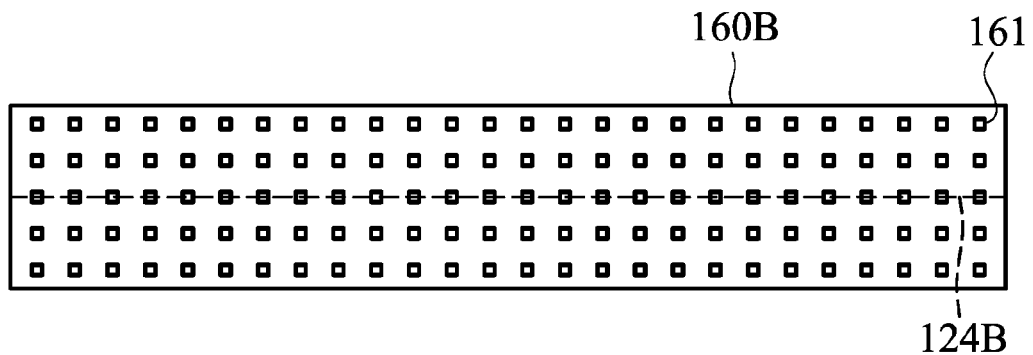

As shown in FIG. 33A, the plurality of spacers 161 can be disposed with the stable cutting region and set in parallel as an aligned array. In addition, the plurality of spacers 161 can be set in a staggered array, as shown in FIG. 33B. According to another embodiment of the disclosure, the predetermined cutting line 124B of the second substrate can pass through the spacers 161, as shown in FIG. 33C. Moreover, as shown in FIG. 33A, the width W0 between one side of the stable cutting region 160 (such as the second stable region 160B) and the predetermined cutting line 124B, and the width W0' between the opposite side of the stable cutting region 160 (such as the second stable region 160B) and the predetermined cutting line 124B are each from 50 µm to 150 µm.

Figure 33D:
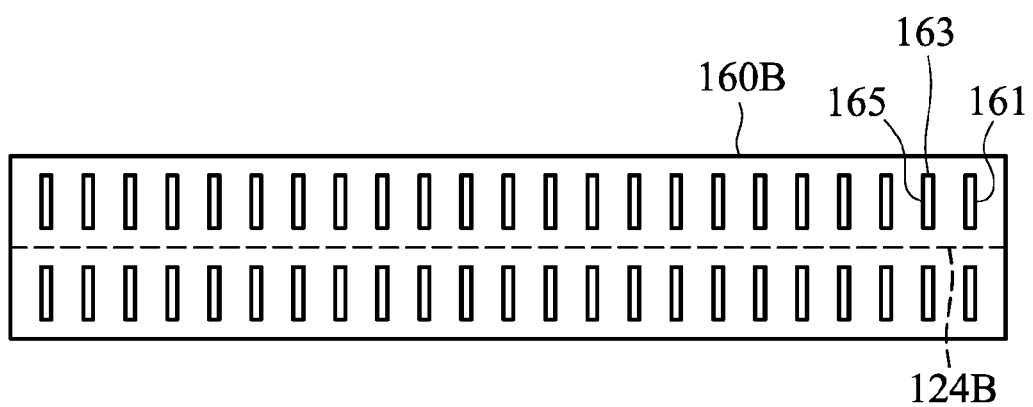
Figure 33:
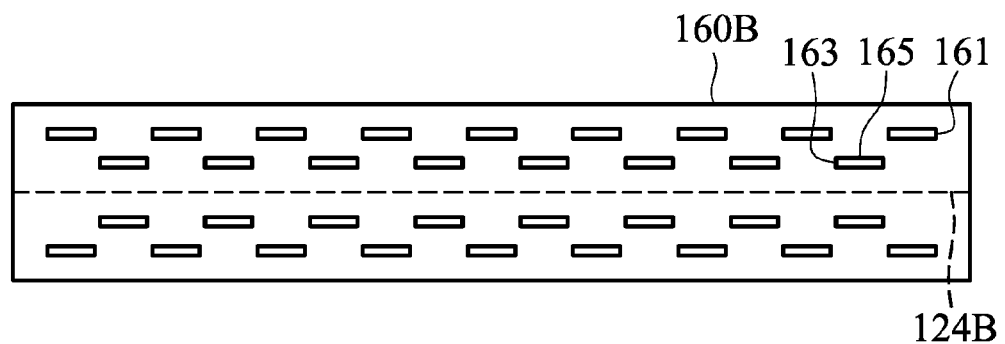
Figure 33:
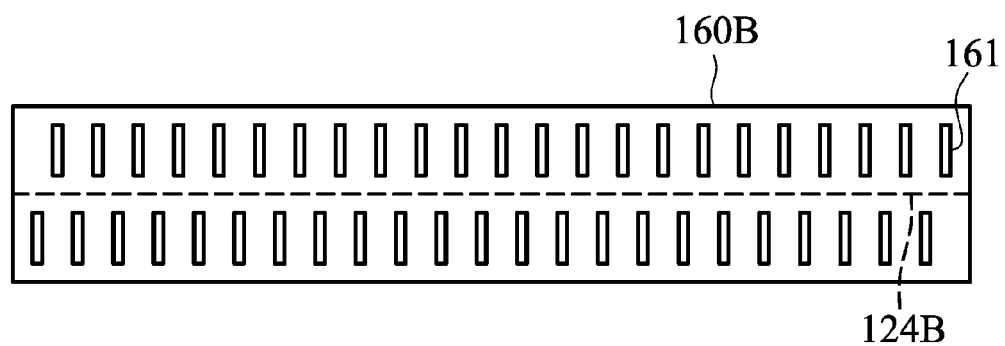

In addition, the surface of the spacer 161 within the stable cutting region 160 in contact with the first substrate 101 (or the second substrate 103) can be a rectangle and have a short edge 163 and a long edge 165. The long edge 165 can be substantially perpendicular to the predetermined cutting line 124B of the second substrate (as shown in FIG. 33D). On the other hand, the long edge 165 can also be parallel to the predetermined cutting line 124B of the second substrate (as shown in FIG. 33E). According to other embodiments of the disclosure, the spacers 161 can be substantially symmetrically disposed within the stable cutting region 160 with reference to the predetermined cutting line 124B of the second substrate. Furthermore, the spacers 161 can be non-symmetrically disposed with the stable cutting region 160, as shown in FIG. 33F. According to other embodiments of the disclosure, the first substrate 101 and the second substrate 103 may be not a rectangle, and the predetermined cutting lines can be modified according to the substrate and not limited to being parallel to or perpendicular to each other.

Figure 34:
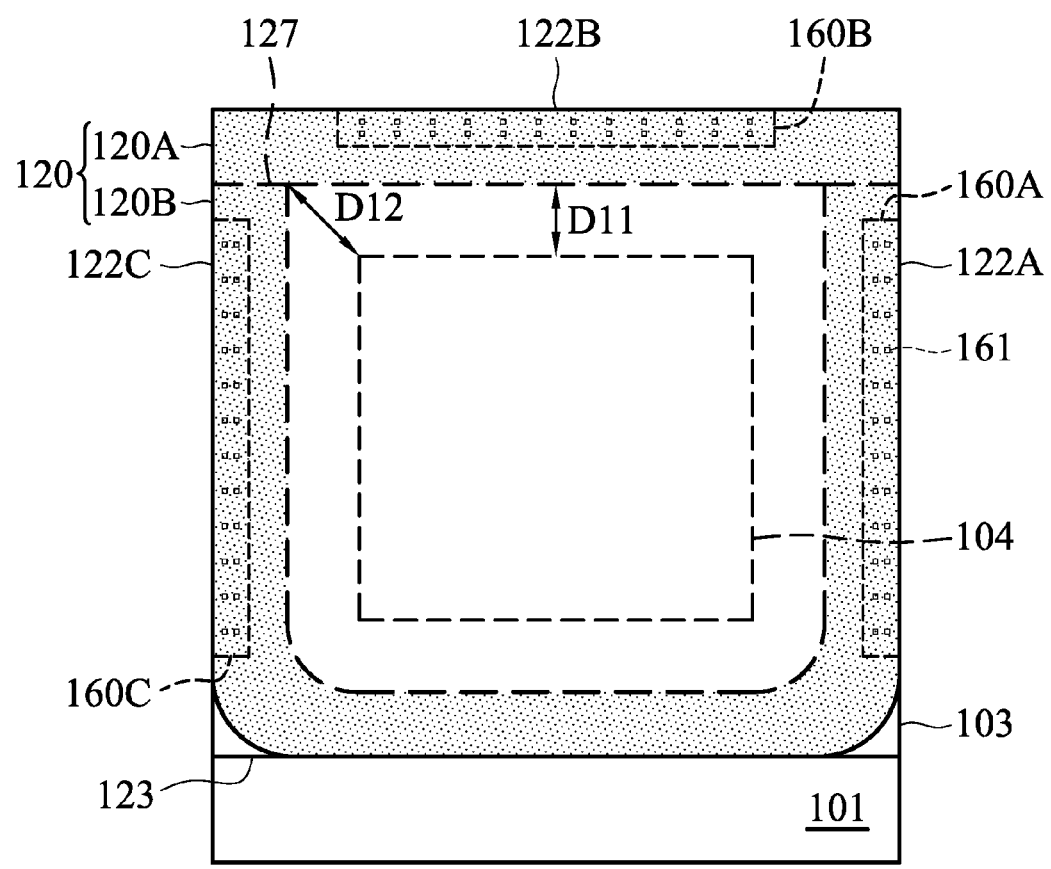
FIG. 34 is a top-view of a display device according to another embodiment of the disclosure.

As shown in FIG. 34, according to an embodiment of the disclosure, in order to narrow the frame of the display device, in addition to the widths of the non-display regions adjacent to the first boundary 122A and the third boundary 122C, the widths of the non-display regions adjacent to the second boundary 122B are also required to be reduced. Therefore, the sealant is closer to the display region. In order to prevent the sealant 120 from coming into contact with the display region 104 near the corner defined by the second boundary 122B and the third boundary 122C, the sealant 120 can be designed to consist of a linear portion 120A and an U-shaped portion 120B. The linear portion 120A is adjacent to the second boundary 122B, and the U-shaped portion 120B is adjacent to the first boundary 122A, the substrate border 123, and the third boundary 122C. Therefore, the distance D12 between the sealant 120 near the corner, which is defined by the second boundary 122B and the third boundary 122C, and the display region 104 is greater than the distance D11 between the sealant 120 adjacent to the second boundary 122B and the display region 104. Namely, the distance D11 is the minimum distance between the linear portion 120A and the display region 104, and the distance D12 is the minimum distance between the sealant border 127 (of the linear portion 120A and the U-shaped portion 120B) and the display region 104. In particular, the distance D12 is greater than or equal to the distance D11.

Figure 35:
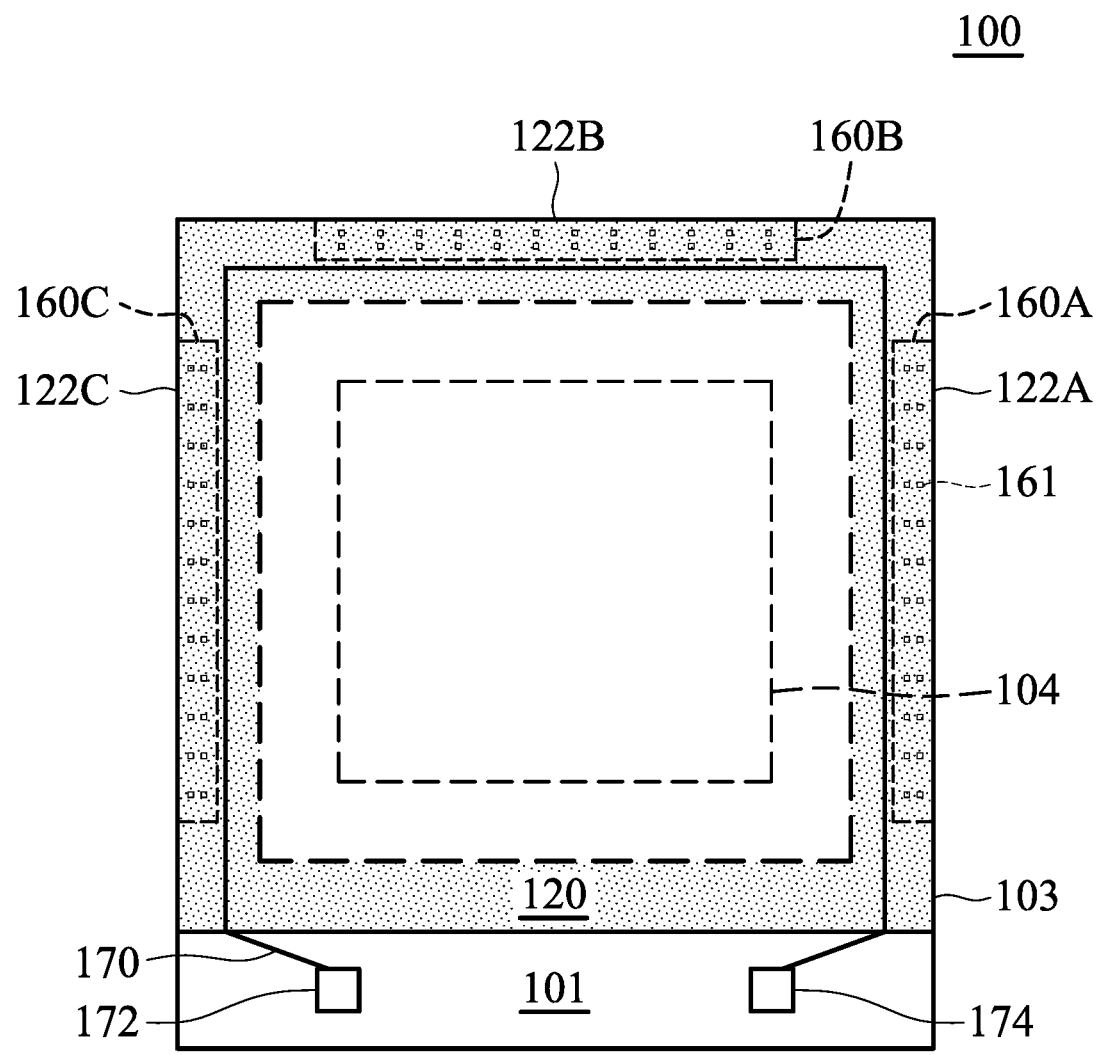
FIG. 35 is a top-view of a display device having a test circuit according to an embodiment of the disclosure.

On the other hand, the display device of the disclosure can further include a test circuit disposed outside the display region. as shown in FIG. 35, the display device 100 can include a first contacting pad 172 and a second contacting pad 174 disposed on the first substrate 101 and outside the display region 104. According to another embodiment, the display device 100 can further include a test circuit 170 substantially disposed along a part of edges of the first substrate, and the part of the edges of the first substrate substantially coincided with a part of edges of the second substrate. In the embodiment, the part of the edges of the first substrate comprises three edges which are the first boundary 122A, the second boundary 122B, and the third boundary 122C. The first contacting pad 172 electrically connects to the second contacting pad 174 via the test circuit 170. As shown in FIG. 35, the test circuit 170 is not disposed along the substrate border 123. As a result, after the cutting process for fabricating the display device 100, the voltage, resistance, or pulse waveform data between the first contacting pad 172 and the second contacting pad 174 can be measured and compared with a reference voltage, resistance, or pulse waveform data, in order to detect whether cutting shift is occurring on the display device.

For example, when cutting shift occurs during the cutting of the display device main substrate, the testing circuit can be damaged by the cutting process, since the test circuit is disposed along the three edges of the first substrate, and the three edges of the first substrate are substantially coincided with the three edges of the second substrate (i.e. the test circuit is disposed between the display region and the predetermined cutting line). Therefore, the resistance between the first contacting pad 172 and the second contacting pad 174 would be increased when the testing circuit is damaged in comparison with a reference resistance, and thus a cutting shift of the display device is detected.

Figure 36:
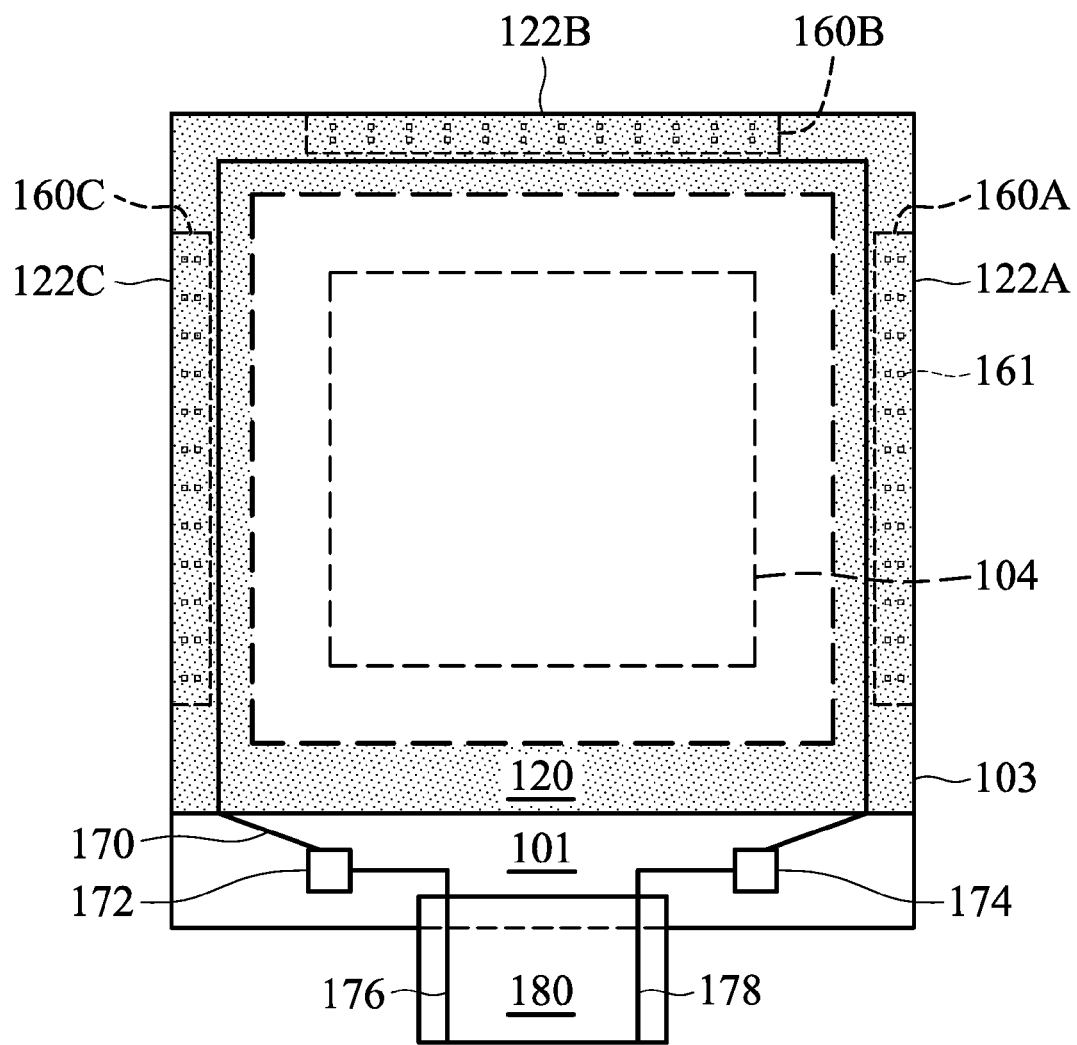
FIGS. 36 and 37 are top-views of display devices having a test circuit according to other embodiments of the disclosure.

Suitable materials for the test circuit 170, the first contacting pad 172, and the second contacting pad 174 include a single layer or multiple layers, and made of metal conductive material (such as aluminum (Al), copper (Cu), molybdenum (Mo), titanium (Ti), platinum (Pt), iridium (Ir), nickel (Ni), chromium (Cr), silver (Ag), gold (Au), tungsten (W), or an alloy thereof), metallic compound conductive material (such as: aluminum-containing compound, copper-containing compound, molybdenum-containing compound, titanium-containing compound, platinum-containing compound, iridium-containing compound, nickel-containing compound, chromium-containing compound, silver-containing compound, gold-containing compound, tungsten-containing compound, magnesium-containing compound, or a combination thereof), or a combination thereof. The material of the test circuit 170 and the material of the first contacting pad 172 (or the second contacting pad 174) can be the same or different. In addition, a passivation layer (not shown) can be formed on the test circuit 170, in order to prevent the test circuit 170 from coming into contact with and being deteriorated by the sealant 120. The passivation layer can be organic insulating materials (such as photosensitive resins) or inorganic insulating materials (such as silicon nitride, silicon oxide, silicon oxynitride, silicon carbide, aluminum oxide, or a combination thereof). as shown in FIG. 36, according to another embodiment of the disclosure, a circuit board 180 having a first circuit 176 and a second circuit 178 can be provided. Since the first circuit 176 and the second circuit 178 electrically connect to the first contacting pad 172 and the second contacting pad 174, respectively, a testing signal can be provided to the test circuit 170 via the first contacting pad 172 and the second contacting pad 174 in order to detect whether cutting shift is occurring on the display device. The circuit board 180 can be a flexible substrate, a rigid substrate, or a metal core PCB.

Figure 37:
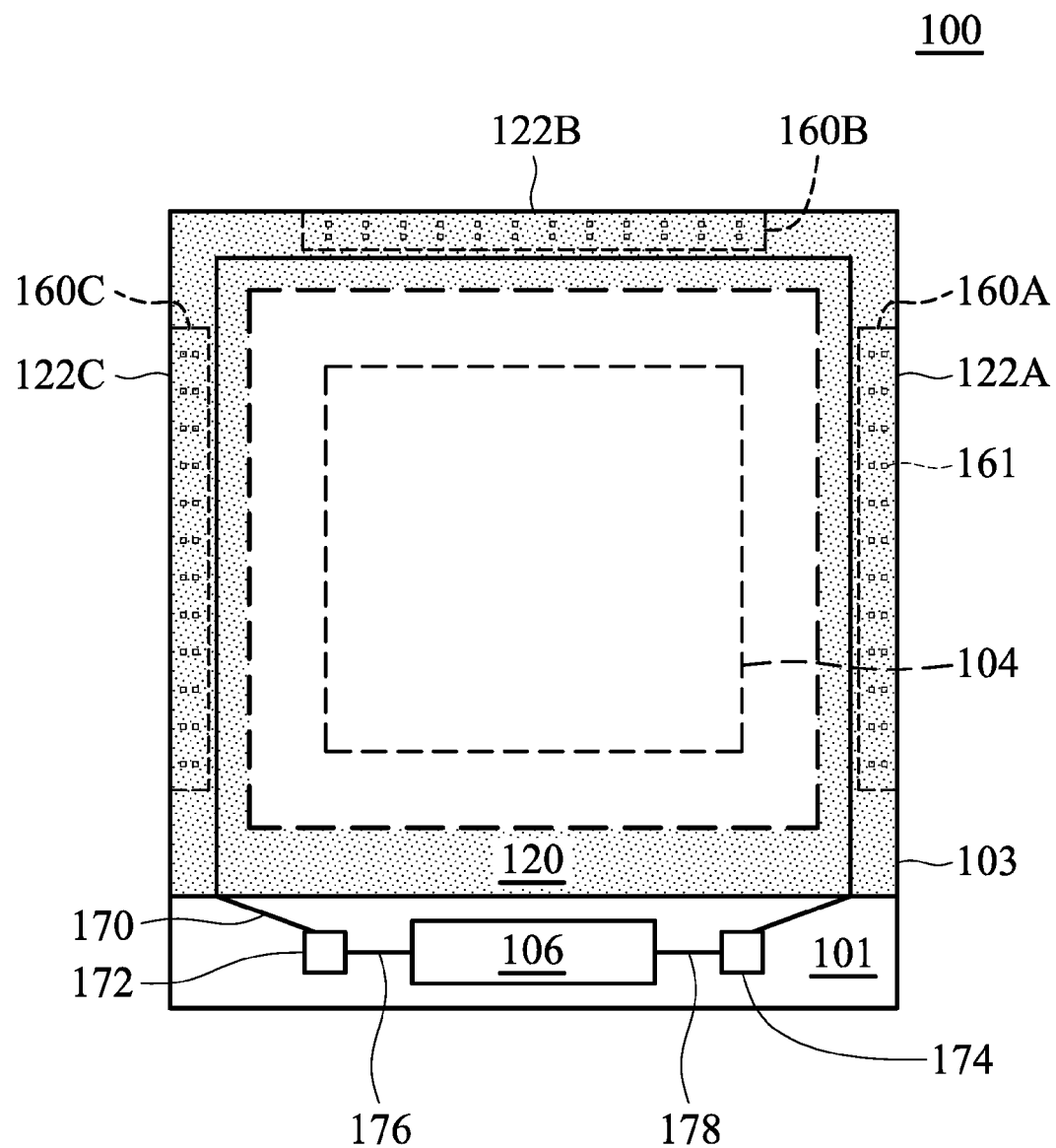

In addition, as shown in FIG. 37, according to other embodiments of the disclosure, a driving unit 106 can be disposed on the first substrate 101 outside the display region 104. Since the driving unit 106 can electrically connect to the first contacting pad 172 and the second contacting pad 174 via the first circuit 176 and the second circuit 178, a testing signal provided by the driving unit 106 can be provided to the test circuit 170 via the first contacting pad 172 and the second contacting pad 174 in order to detect whether cutting shift is occurring on the display device. It should be noted that the testing signal can be a common electrode voltage signal, or a ground voltage signal. The driving unit 106 can electrically connect to the display region 104 via a plurality of signal lines (not shown) to provide signals to the plurality of pixels (not shown) for displaying images. The driving unit 106 can be an integrated circuit (IC).

According to embodiments of the disclosure, the display device has spacers disposed on the stable cutting region in order to increase the structural stability during a cutting process, improve the cutting and breaking performance, and reduce the substrate breakage rate. As a result, the yield of the display device can be improved. In addition, according to embodiments of the disclosure, the display device of the disclosure includes a test circuit disposed along predetermined cutting lines. Therefore, after the cutting process, the test circuit can be used to detect whether cutting shift is occurring on the display device.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A display device, comprising:
a first substrate;
a light shielding layer disposed on the first substrate, comprising:
a first matrix portion, having a first side and a second side respectively located at two opposite sides of the first matrix portion;
a second matrix portion intersecting with the first matrix portion to form an intersection; and an enlarged portion disposed corresponding to the intersection, wherein the enlarged portion has a first region, a second region, a third region, and a fourth region, wherein the first region and the third region locate at the first side, the second region and the fourth region locate at the second side, the first region has a first curved edge, and the second region has a second curved edge; and a spacer located corresponding to the intersection, wherein a first distance is a distance between the spacer and the first curved edge, and a second distance is a distance between the spacer and the second curved edge, wherein the first distance is different from the second distance.

2. The display device as claimed in claim 1, wherein a first surface of the spacer is adjacent to the light shielding layer, a first tangent line is a tangent line of the first curved edge of the first region, a second tangent line is a tangent line of the first surface of the spacer, the first tangent line is parallel to the second tangent line, the second tangent line is adjacent to the first curved edge of the first region, and the first distance is a distance between the first tangent line and the second tangent line, a third tangent line is a tangent line of the second curved edge of the second region, a fourth tangent line is a tangent line, the fourth tangent line is adjacent to the second curved edge of the second region, and the second distance is a distance between the third tangent line and the fourth tangent line.

3. The display device as claimed in claim 2, wherein the third tangent line is parallel to the first tangent line, and the second tangent line is parallel to the fourth tangent line, a third distance is a distance between the first tangent line and the third tangent line, a fourth distance is a distance between the second tangent line and the fourth tangent line, and the third distance is greater than the fourth distance.

4. The display device as claimed in claim 1, wherein the first distance is less than the second distance.

5. The display device as claimed in claim 1, further comprising a second substrate located opposite to the first substrate, wherein the spacer is located between the first substrate and the second substrate.

6. The display device as claimed in claim 1, wherein a first segment of the second matrix portion is located at the first side, a second segment of the second matrix portion is located at the second side, the first segment extends along a first inclined direction, the second segment extends along a second inclined direction, the first inclined direction is different from the second inclined direction.

7. The display device as claimed in claim 1, wherein the first region is corresponding to a first color filter layer, and the second region is corresponding to a second color filter layer.

8. The display device as claimed in claim 7, wherein a color of the first color filter layer is different from a color of the second color filter layer.

9. The display device as claimed in claim 7, wherein a color of the first color filter layer is the same with a color of the second color filter layer.

10. The display device as claimed in claim 1, wherein the first region is corresponding to a first sub-pixel, the second region is corresponding to a second sub-pixel, the third region is corresponding to a third sub-pixel, and the fourth region is corresponding to a fourth sub-pixel.

11. The display device as claimed in claim 1, wherein a range of the first distance is between 5 μm to 10 μm, and a range of the second distance is between 5 μm to 10 μm.

12. An element substrate, comprising:
a first substrate;
a light shielding layer disposed on the first substrate, comprising:
a first matrix portion, having a first side and a second side respectively located at two opposite sides of the first matrix portion;
a second matrix portion intersecting with the first matrix portion to form an intersection; and
an enlarged portion disposed corresponding to the intersection, wherein the enlarged portion has a first region, a second region, a third region, and a fourth region, wherein the first region and the third region locate at the first side, the second region and the fourth region locate at the second side, the first region has a first curved edge, and the second region has a second curved edge; and a spacer located corresponding to the intersection, wherein a first distance is a distance between the spacer and the first curved edge, and a second distance is a distance between the spacer and the second curved edge, wherein the first distance is different from the second distance.

13. The element substrate as claimed in claim 12, wherein a first surface of the spacer is adjacent to the light shielding layer, a first tangent line is a tangent line of the first curved edge of the first region, a second tangent line is a tangent line of the first surface of the spacer, the first tangent line is parallel to the second tangent line, the second tangent line is adjacent to the first curved edge of the first region, and the first distance is a distance between the first tangent line and the second tangent line, a third tangent line is a tangent line of the second curved edge of the second region, a fourth tangent line is a tangent line of the first surface of the spacer, the third tangent line is parallel to the fourth tangent line, the fourth tangent line is adjacent to the second curved edge of the second region, and the second distance is a distance between the third tangent line and the fourth tangent line.

14. The element substrate as claimed in claim 13, wherein the third tangent line is parallel to the first tangent line, and the second tangent line is parallel to the fourth tangent line, a third distance is a distance between the first tangent line and the third tangent line, a fourth distance is a distance between the second tangent line and the fourth tangent line, and the third distance is greater than the fourth distance.

15. The display device as claimed in claim 12, wherein the first distance is less than the second distance.

16. The element substrate as claimed in claim 12, wherein a first segment of the second matrix portion is located at the first side, a second segment of the second matrix portion is located at the second side, the first segment extends along a first inclined direction, the second segment extends along a second inclined direction, the first inclined direction is different from the second inclined direction.

17. The element substrate as claimed in claim 12, wherein the first region is corresponding to a first sub-pixel, the second region is corresponding to a second sub-pixel, the third region is corresponding to a third sub-pixel, and the fourth region is corresponding to a fourth sub-pixel.

18. The element substrate as claimed in claim 12, wherein a range of the first distance is between 5 μm to 10 μm, and a range of the second distance is between 5 μm to 10 μm.

* * * * *